United States Patent
Adachi

(10) Patent No.: US 9,063,253 B2
(45) Date of Patent: Jun. 23, 2015

(54) IMAGING LENS

(71) Applicant: Tamron Co., Ltd., Saitama-shi, Saitama (JP)

(72) Inventor: Nobuyuki Adachi, Tokyo (JP)

(73) Assignee: Tamron Co., Ltd., Saitama (JP)

( * ) Notice: Subject to any disclaimer, the term of this patent is extended or adjusted under 35 U.S.C. 154(b) by 164 days.

(21) Appl. No.: 13/709,945

(22) Filed: Dec. 10, 2012

(65) Prior Publication Data

US 2013/0148214 A1 Jun. 13, 2013

(30) Foreign Application Priority Data

Dec. 12, 2011 (JP) .................................. 2011-271638
Dec. 12, 2011 (JP) .................................. 2011-271639

(51) Int. Cl.
*G02B 9/12* (2006.01)
*G02B 3/00* (2006.01)
*G02B 15/173* (2006.01)

(52) U.S. Cl.
CPC ................ *G02B 3/00* (2013.01); *G02B 15/173* (2013.01)

(58) Field of Classification Search
CPC ................................. G02B 15/173; G02B 3/00
USPC ........................... 359/749–753, 716, 784–792
See application file for complete search history.

(56) References Cited

U.S. PATENT DOCUMENTS

| | | | | |
|---|---|---|---|---|
| 4,653,877 A | * | 3/1987 | Hamanishi | ..................... 359/766 |
| 5,680,259 A | * | 10/1997 | Yamada | ......................... 359/753 |
| 7,295,384 B1 | * | 11/2007 | Sato et al. | ..................... 359/716 |
| 7,586,690 B2 | | 9/2009 | Yamada | |
| 8,305,692 B2 | | 11/2012 | Shimizu et al. | |
| 2008/0231962 A1 | | 9/2008 | Yamada | |
| 2011/0286116 A1 | | 11/2011 | Shimizu et al. | |

FOREIGN PATENT DOCUMENTS

| | | |
|---|---|---|
| CN | 101122673 A | 2/2008 |
| JP | 03-278012 A | 12/1991 |
| JP | 08-5906 A | 1/1996 |
| JP | 08-76012 A | 3/1996 |
| JP | 2000-171698 A | 6/2000 |

(Continued)

OTHER PUBLICATIONS

Chinese Office Action dated Sep. 3, 2014, issued in corresponding Chinese Application No. 201210537436.5. (6 pages).

(Continued)

*Primary Examiner* — Thomas K Pham
*Assistant Examiner* — Vipin Patel
(74) *Attorney, Agent, or Firm* — Westerman, Hattori, Daniels & Adrian, LLP

(57) ABSTRACT

The present invention is directed to an imaging lens with an optical system that comprises the foremost lens group closest to an object and of positive refractivity, the succeeding middle lens group, and the rearmost lens group closest to an image plane and of negative refractivity where the middle lens group, having the first, second, and third lens subgroups disposed in series, is moved axially along the optical axis for focusing, and the foremost lens group includes at least three or more convex lens pieces and a single concave lens piece and meets predetermined requirements defined in formulae. The imaging lens has a quality image stabilizing system in which a light-weight lens piece(s) is moved in directions perpendicular to the optical axis.

10 Claims, 72 Drawing Sheets

(56) References Cited

FOREIGN PATENT DOCUMENTS

| | | |
|---|---|---|
| JP | 2005-284101 A | 10/2005 |
| JP | 2009-288384 A | 12/2009 |
| JP | 2010-181634 A | 8/2010 |
| JP | 4590900 B2 | 12/2010 |
| JP | 2011-013357 A | 1/2011 |
| JP | 2011-013358 A | 1/2011 |
| JP | 2011-048232 A | 3/2011 |
| WO | 2010/090281 A1 | 8/2010 |

OTHER PUBLICATIONS

Office Action dated Mar. 2, 2015, issued in corresponding Japanese Application No. 2011-271638. (5 pages).

* cited by examiner

FIG.30
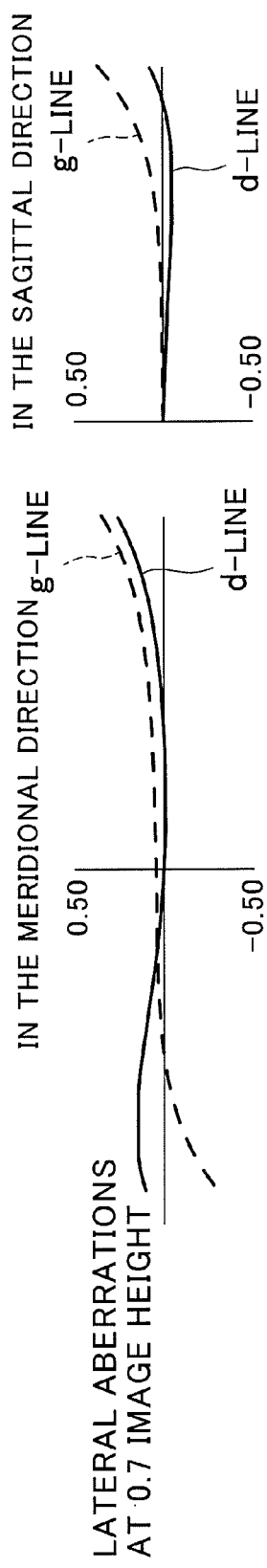
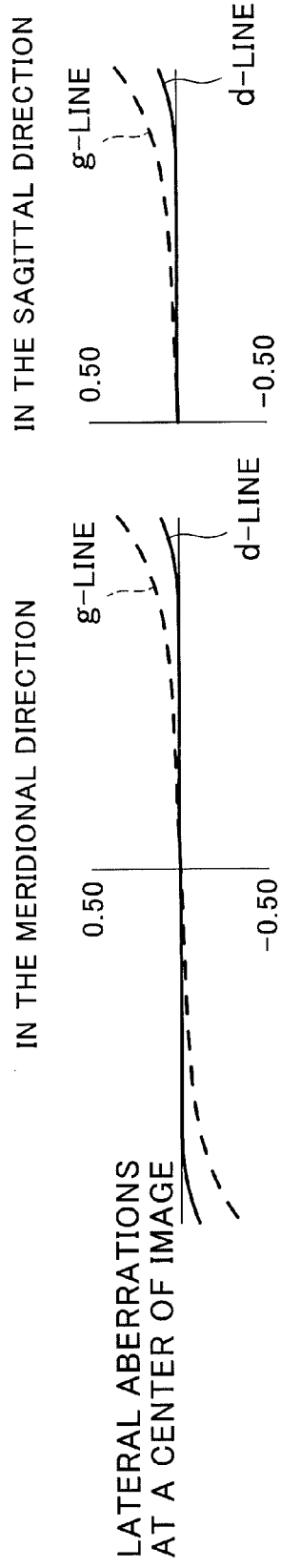

FIG.50
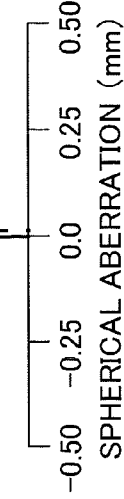
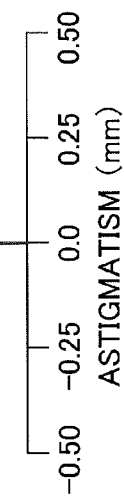
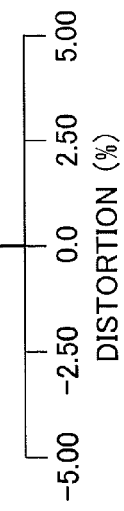
INFINITY

FIG.53
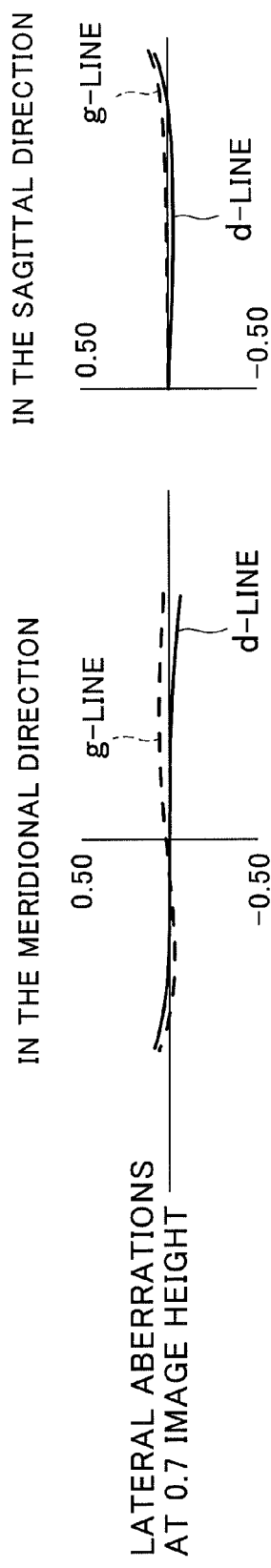
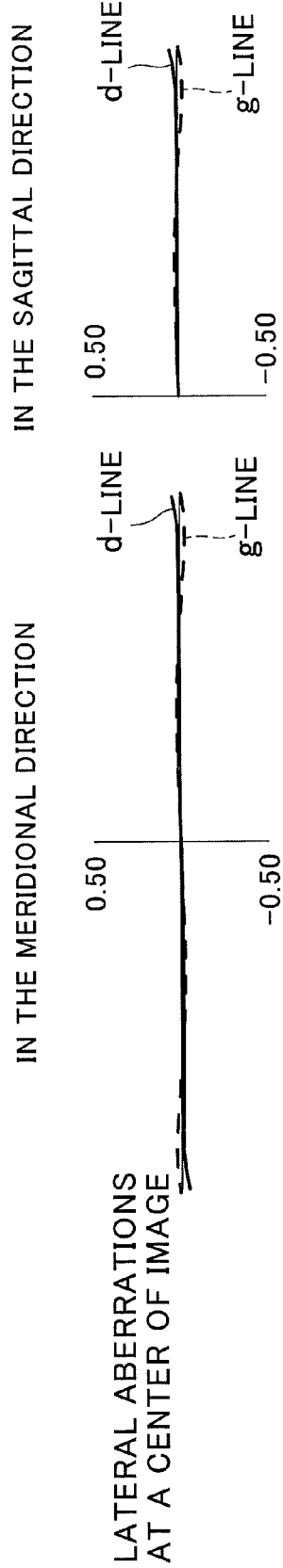
FOCUSED ON INFINITY   NO VIBRATION

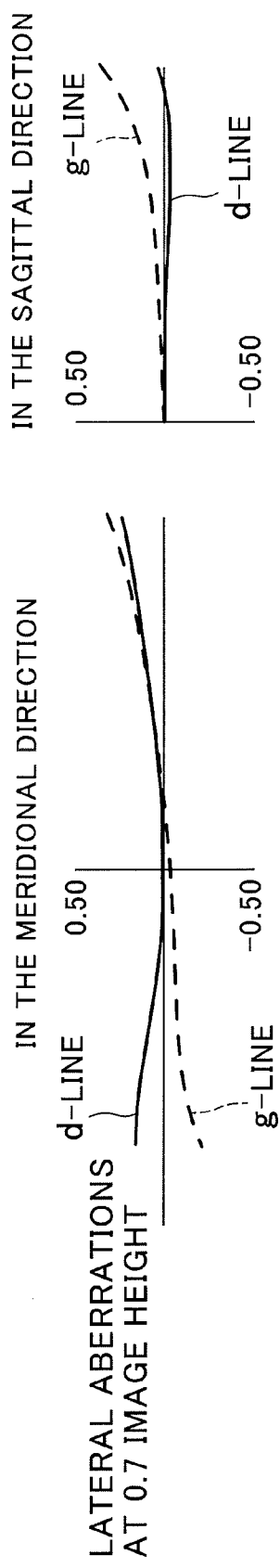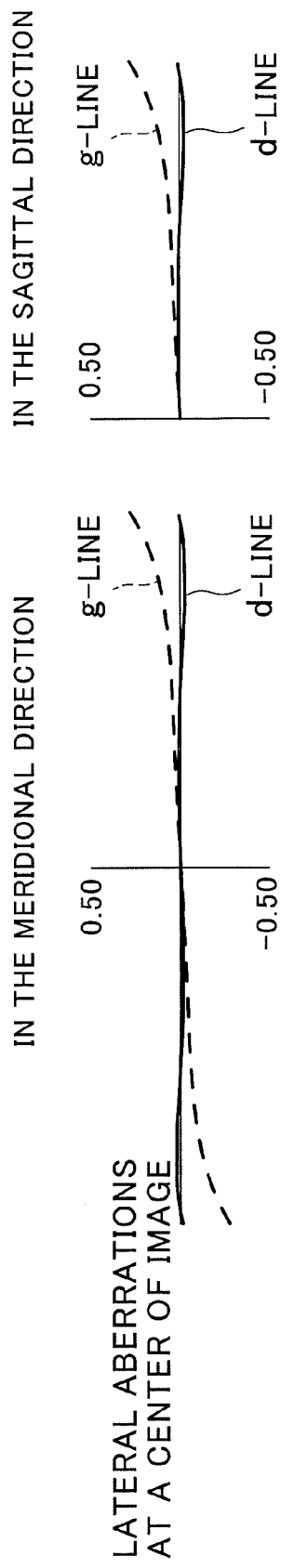
FIG.54
1:1 MAGNIFICATION RATIO    NO VIBRATION

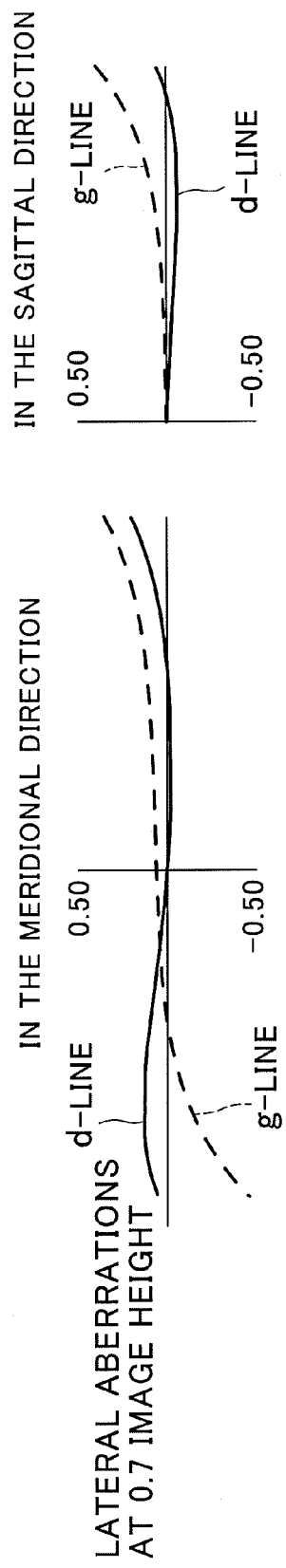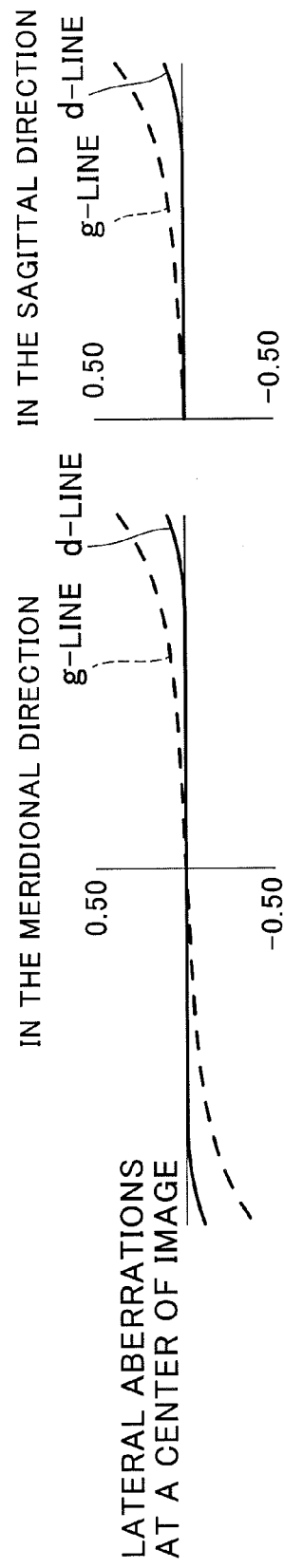
FIG.62
1:1 MAGNIFICATION RATIO    NO VIBRATION

FIG.72
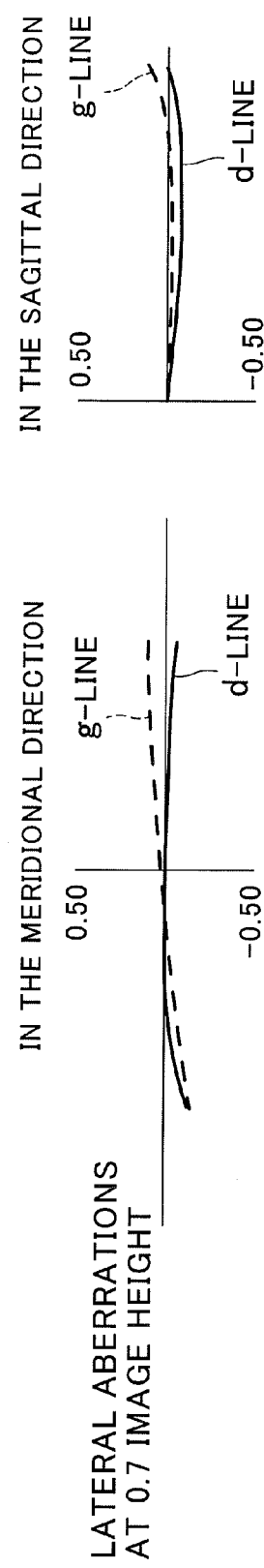
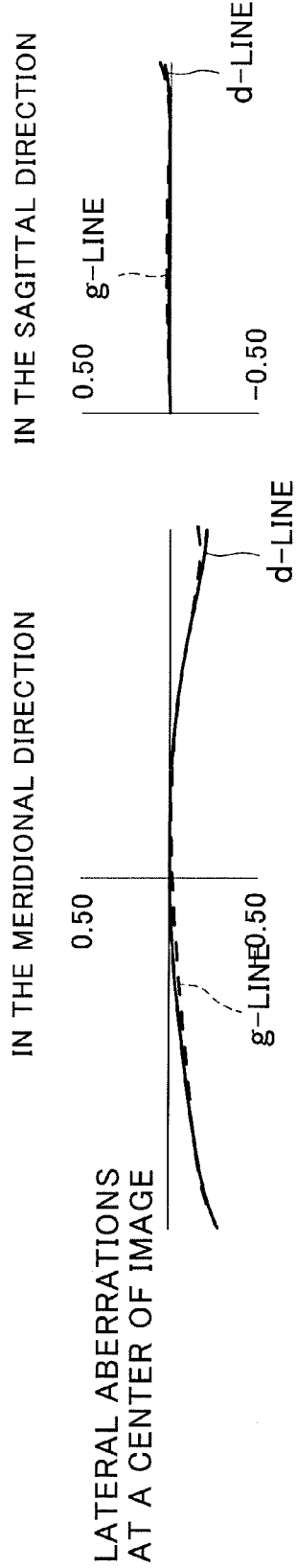

US 9,063,253 B2

IMAGING LENS

FIELD OF THE INVENTION

The present patent application claims priority from Japanese Application No. 2011-271638, filed Dec. 12, 2012 and from Japanese Application No. 2011-271639, filed Dec. 12, 2012, which are incorporated herein by reference in their entirety.

The present invention relates to an imaging lens, and more particularly, to an optical system capable of macro-photographing and -filming an object as high as an equi-magnification and to an imaging lens suitable for photograph cameras, video cameras, electronic still cameras, and the like.

BACKGROUND OF THE INVENTION

In general, a macro-photographing or -filming lens experiences difficulties in compensating for aberration since a variation in the aberration becomes greater as a magnification is higher. To cope with it, there has been developed a lens of the so-called floating system in which more than one groups of lens pieces are moved during focusing.

One of a variety of lenses suitable for macro-photographing or -filming in the prior art is that which has the foremost lens group closest to an object that stay still during focusing, the succeeding middle lens groups at least two or more of which are moved for focusing, the further succeeding image stabilization lens group of negative refractivity that are moved to points indicated by coordinates along an axis perpendicular to the optical axis to shift a position of imaging in directions perpendicular to the optical axis, and the rearmost lens group closest to the image plane and of positive refractivity; and the rearmost lens group includes a plurality of lens pieces of positive and negative refractivities. The imaging lens meets the requirements as follows:

$$1.7 < Nbna$$

$$Nbpa < 1.7$$

$$1.85 < |fa/f| < 2.80$$

where Nbpa is the average of refractive indices of the lens pieces of positive refractivity, Nbna is the average of refractive indices of the lens pieces of negative refractivity, fa is a composite focal length from the foremost lens group to the anti-vibration lens group, and f is a focal length of the entire optical system (see Patent Document 1 listed below).

Another of the prior art lenses suitable for macro-photographing or -filming is that which includes the foremost or first lens group closest to an object and of positive refractivity, the second foremost lens group of negative refractivity, the succeeding third lens group of positive refractivity, the fourth lens group of positive refractivity, and the rearmost or fifth lens group of negative refractivity. During focusing on the object from a point at infinity to a close range, the first lens group stays still, the second lens group is moved toward the image plane, the third lens group is moved toward the object, the fourth lens group is moved toward the object along a trajectory different from that of the third lens group, and the fifth lens group stays still. The imaging lens meets the requirements as defined in the following formulae:

$$0.89 \leq f4/f3 < 2.0$$

where f3 is a focal length of the third lens group, and f4 is a focal length of the fourth lens group (see Patent Document 2).

An additional one of the prior art lenses suitable for macro-photographing or -filming is an optical system capable of photographing the object at a close range, which has its first focusing lens group moved along the optical axis for focusing on the object from a point of infinity to a close range, its second focusing lens group moved by a displacement different from that of the first focusing lens group during focusing, and its third focusing lens group moved by a displacement different from those of the first and second focusing lens groups during focusing; and at least one of the focusing lens groups has a single lens piece (see Patent Document 3).

LIST OF CITED DOCUMENTS

[PATENT DOCUMENT 1]
JP-A-2009-288384
[PATENT DOCUMENT 2]
Japanese Patent No. 4590900
[PATENT DOCUMENT 3]
JP-A-2011-48232

OUTLINES OF THE INVENTION

Problems to be Solved by the Invention

The imaging lens disclosed in Patent Document 1 is prone to suffer from longitudinal chromatic aberration where chromatic distortion due to the wavelength varied from C-line to g-line spreads the greatest along the optical axis when the object distance is infinite. In the closest range in photo shooting, the longitudinal chromatic aberration remains significant with upper zonal rays relative to an effective aperture (i.e., a height of incident beams) ranging from 0.7 to 1.0. Also, since comatic aberration varies greatly from the magnification of approximately 1:2 to the closest range in photo shooting, a high performance of imaging cannot be obtained throughout the entire focusing range. Moreover, monochromatic comatic flare is caused to a great extent at an abaxial height of image, and, in some imaging circumstances, this is prone to various troubles such as purple fringe (purple flare).

As to the imaging lens disclosed in Patent Document 2, variations in distortion aberration and curvature of field become greater from the object distance of infinity to the closest range in photo shooting. Quite a few number of lens pieces in the first lens group are used for compensation for aberrations especially in order to alleviate longitudinal chromatic aberration with the upper zonal rays relative to the effective aperture diameter (i.e., the height of incident beams) ranging from 0.7 to 1.0 in the closest range in photo shooting, and this makes the lens unavoidably have a complicated configuration. As a consequence, the first lens group has a greater diameter and a lens barrel also has a greater diameter. It is also disadvantageous that the longitudinal chromatic aberration is significant with the object distance of infinity. At the closest range in photo shooting, and especially, around 70% of the full height of image, chromatic aberration of magnification becomes adversely considerable.

As to the optical system disclosed in Patent Document 3, compensation for the longitudinal chromatic aberration is insufficiently effective from the object distance of infinity to the closest range in photo shooting so that the resultant image still has its adverse effect. At the closest range in photo shooting, the longitudinal chromatic aberration is especially conspicuous with the upper zonal rays (the height of incident beams) ranging from 0.7 to 1.0. Distortion aberration is also considerable at the closest range in photo shooting. Since movable ones of the lens groups are disposed immediately behind the aperture stop, the lens groups to be moved during focusing are apt to increase in weight, thereby failing to accomplish a focusing mechanism of reduced energy consumption and quicker response.

Objects of the Invention

The present invention is made to overcome the aforementioned disadvantages in the prior art lenses capable of macro-photographing and -filming, and accordingly, it is an object of the present invention to provide an imaging lens capable of alleviating various aberrations of longitudinal chromatic aberration, chromatic aberration of magnification, curvature of field, and distortion and attaining an enhanced performance of imaging throughout the entire focusing range from an object distance of infinity to the closest range in photo shooting almost as powerful as 1:1 equi-magnification.

It is another object of the present invention to provide an imaging lens adapted to move light-weight lens groups during focusing so that quick automatic focusing can be carried out with reduced energy consumption.

It is still another object of the present invention to provide an imaging lens adapted to move a light-weight lenses in directions perpendicular to the optical axis so that it is suitable for serving as an enhanced performance image stabilization system.

SUMMARY OF THE INVENTION

<The First Present Invention>

An optical system comprises the foremost lens group closest to an object and of positive refractivity, the succeeding middle lens group, and the rearmost lens group closest to an image plane and of negative refractivity; and the middle lens group having the first, second, and third lens subgroups is moved axially along the optical axis for focusing.

The foremost lens group has at least three or more convex lens pieces and a single concave lens piece, and an imaging lens with the optical system meet the requirements as defined in the following formulae:

$$(Rn1-Rn2)/(Rn1+Rn2)<0 \quad (1)$$

$$nd1<1.6, vd1>67.5 \quad (2)$$

where Rn1 is a curvature of radius of a front surface of a concave lens piece the closest to the object of all in the foremost lens group, Rn2 is a curvature of radius of a rear surface of the concave lens piece the closest to the object of all in the foremost lens group, nd1 is the average of refractive indices of convex lens pieces in the foremost lens group relative to d-line, and vd1 is the average of Abbe numbers of the convex lens pieces in the foremost lens group.

<Effects of the First Present Invention>

In accordance with the first present invention, the imaging lens is capable of effectively alleviating various aberrations of longitudinal chromatic aberration, chromatic aberration of magnification, curvature of field, and distortion and attaining an enhanced performance of imaging throughout the entire focusing range from an object distance of infinity to the closest range in photo shooting almost as powerful as 1:1 equi-magnification.

The imaging lens of the present invention is adapted to move light-weight lens groups during focusing to attain an effect of quick automatic focusing with reduced energy consumption.

<Operation of the First Present Invention>

As has been described, the imaging lens according to the present invention comprises the foremost lens group of positive refractivity, the middle lens group having the first lens subgroup of negative refractivity, the second lens subgroup of positive refractivity, and the third lens subgroup of positive refractivity, and the rearmost lens group of negative refractivity; and during focusing, the foremost and rearmost lens groups stay still while, for focusing on the object from an object distance of infinity to the closest range in photo shooting, the middle lens group has its first lens subgroup moved from a position closer to the object toward the image plane, its second lens subgroup moved axially along the optical axis, and its third lens subgroup moved from a position closer to the image plane toward the object.

It is advantageous as detailed below that during focusing, as mentioned above, the foremost and rearmost lens groups stay still while, from the object distance of infinity to the closest range in photo shooting, the middle lens group has its first lens subgroup moved from a position closer to the object toward the image plane, its second lens subgroup moved axially along the optical axis, and its third lens subgroup moved from a position closer to the image plane toward the object.

In comparison with a lens of which foremost lens group is moved for focusing, the lens having its foremost lens group kept at a standstill during focusing can avoid varying a distance toward the object upon focusing, and thus, a user who is trying to shoot the object is less prone to inadvertently bumping the lens against the object during shooting the object. In addition, a necessity to let out the massive and heavy lens groups closer to the object during focusing brings about an increased burden on an actuator and an increase in dimensions of a lens barrel, but the lens of the present invention can avoid such a disadvantage. Furthermore, the lens of the invention can attain an enhanced performance of imaging throughout the entire focusing range.

The aperture stop is disposed in a fixed position in the middle lens group, and this enables movable ones of the lens groups to be reduced in weight and simplified in mechanical configuration of the lens.

It is preferable for the aperture stop to be reduced in diameter from the object distance of infinity to the closest range in photo shooting. By virtue of the aperture stop adapted to define Fno beams, namely, the highest abaxial beams, the foremost lens group can keep its outer diameter from increasing.

Keeping the rearmost lens group always at a standstill is desirable in view of preventing contaminants from entering the lens barrel and simplifying the mechanical configuration.

The foremost lens group includes at least three or more convex lens pieces and at least a single concave lens piece. Such a lens design is desired to satisfactorily compensate for comatic aberration around the closest range in photo shooting.

<The Second Present Invention>

An optical system comprises the foremost or first lens group closest to an object and of positive refractivity, the succeeding or second lens group of negative refractivity, the third lens group of positive refractivity, the fourth lens group of positive refractivity, the fifth lens group of negative refractivity moved in directions almost perpendicular to the optical axis for image stabilization, and the rearmost or sixth lens group closest to an image plane and of positive refractivity. During focusing, the first, fifth, and sixth lens groups stay still while, for focusing on the object from an object distance of infinity to the closest range in photo shooting, the second lens group is moved from a position closer to the object toward the image plane, the third lens group is moved axially along the optical axis forward and backward, and the fourth lens group is moved axially from a position closer to the image plane toward the object. The first lens group includes at least three or more convex lens pieces and at least a single concave lens piece, the third lens group includes a single convex lens piece, and the fourth lens group includes a pair of cemented lens pieces; and an imaging lens with the optical system meets the requirements as defined in the following formulae:

$$(Rn1-Rn2)/(Rn1+Rn2)<0 \quad (1)$$

$$nd1<1.6, vd1<67.5 \quad (2)$$

where Rn1 is a curvature of radius of a front surface of a concave lens piece the closest to the object of all the lens pieces in the foremost lens group, Rn2 is a curvature of radius of a rear surface of the concave lens piece the closest to the object in the first lens group, nd1 is the average of refractive indices of convex lens pieces in the first lens group relative to d-line, and vd1 is the average of Abbe numbers of the convex lens pieces in the first lens group.

<Operation and Effects of the Second Present Invention>

The imaging lens in the second present invention attains an enhanced performance of imaging throughout the entire focusing range from the object distance of infinity to the closest range in photo shooting as powerful as 1:1 equi-magnification; and specifically, it is capable of minimizing various aberrations of longitudinal chromatic aberration, chromatic aberration of magnification, curvature of field, and distortion and attaining tan enhanced performance of imaging.

The imaging lens in the second present invention is adapted to move light-weight lens groups during focusing so as to attain an effect of quick automatic focusing.

The imaging lens according to the present invention has its light-weight lens piece(es) moved in directions perpendicular to the optical axis and is suitable to serving as an enhanced performance image stabilization system.

In the imaging lens in the second aspect of the invention, the lens groups the closest to the object and the image plane keep at standstill and instead three of the remaining middle lens groups are moved for focusing. Configured in this manner, the imaging lens is advantageous as mentioned below. Specifically, in comparison with a lens that has its foremost lens group moved for focusing, the imaging lens according to the present invention, which has its foremost lens group kept at a standstill during focusing, can (1) avoid varying a distance between the lens and the object upon focusing, and thus, a user who is trying to shoot the object is less prone to inadvertently bumping the lens against the object, (2) avoid increasing in burden on an actuator and in dimensions of a lens barrel that result from a necessity to let out the massive and heavy lens groups closer to the object during focusing, and (3) attain an enhanced performance of imaging throughout the entire focusing range.

Keeping the rearmost lens group at a standstill is desirable in view of preventing contaminants from entering the lens barrel and simplifying the mechanical configuration.

In the imaging lens in the second present invention, the aperture stop is disposed between the second and third lens groups in a fixed position, and this is useful in simplifying the mechanical configuration. In addition, the imaging lens according to the present invention has its aperture stop reduced in diameter consistently from the object distance of infinity to the closest range in photo shooting, and this also is advantageous in downsizing the imaging lens.

Also, in the imaging lens in the second present invention, Fno beams, namely, the outermost incident beams are defined by the aperture stop, which is useful to avoid increasing in dimensions of the first lens group and to facilitate downsizing the imaging lens.

The first lens group of the imaging lens in the second present invention may include, for instance, the simplest combination of a convex lens piece, a cemented lens of a front convex lens piece and a rear concave lens piece, and a convex lens piece arranged in this order. This enables a satisfactory compensation for comatic aberration around the closest range in photo shooting. With the first lens group arranged in this manner, more than one lens pieces are serves as a lens complex to cope with eccentricity of the image plane and the resultant variation in curvature of field by dispersing such an adverse effect and allotting part of the effect to each.

In the imaging lens in the second present invention, the third lens group includes a single convex lens piece while the fourth lens group includes a pair of cemented lens pieces. With the optical system in which the aperture stop disposed in the fixed position behind a series of the foremost and succeeding lens groups of positive and negative refractivities, the photographing/filming lens has the one of the remaining lens groups immediately behind the fixed aperture stop unavoidably increased in diameter of each lens piece, which resultantly tends to increase in weight of each lens piece. This is because the third lens group to be moved for focusing should be of a single lens piece in order to reduce the total weight of the third lens group.

Similar to the third lens group, the fourth lens group is desired to have a reduced number of lens pieces, and in accordance with the present invention, the fourth lens group is of a single pair of cemented lens pieces. With regard to the number of the lens pieces, it is desirable that the movable lens groups immediately before and behind the aperture stop have the same number of lens pieces since these lens groups are axially moved in the directions opposite to each other along the optical axis during focusing. With three lens pieces before the aperture stop and three lens pieces behind it, the desired weight balance can be obtained since as a focusing link is revolved during focusing, one of the couple of the triplets go down as the gravity forces them to while the other resist the gravity and go up.

In the second present invention, the fourth lens group preferably has the cemented lens of a front concave lens piece combined with a rear convex lens piece. Compared with an arrangement with a cemented lens of a front convex lens piece combined with a rear concave lens piece, the cemented lens of the present invention is more effective in reducing variation in curvature of field during focusing.

The imaging lens designed to be based on the so-called floating system in the second present invention permits curvature of field to show characterizing behavior; that is, as the object distance is varied from a point of infinity to the closest range in photo shooting, the curvature of field, once noticeable under the paraxial image point (on the side of under-compensation), shifts above the paraxial image point (to the side of over-compensation), and around the object distance as close as to enable photo shooting with 1:1 equi-magnification, it is recurrently prominent under the paraxial image point. Incorporating the cemented lens of the front concave lens piece combined with the rear convex lens piece permits the curvature of field to reduce its recurrent transition from over to under.

The imaging lens in the second present invention has its fifth lens group as an image stabilization lens kept at a standstill during focusing. In the second present invention, handshake effected on a camera body is assumed as much as 0.3 degrees, and the fifth lens group is moved in directions almost perpendicular to the optical axis so as to effect image stabilization.

<Description of Formula (1)>

The optical system meets the requirement as defined in Formula (1) as follows:

$$(Rn1-Rn2)/(Rn1+Rn2)<0 \quad (1)$$

where Rn1 is the curvature of radius of the front surface of the concave lens piece, and Rn2 is the rear surface of the same.

In the macro-photographing or -filming lens designed to be based on the floating system in which the foremost lens group stays still and instead the one(s) of the succeeding inner lens groups are moved similar to the present invention, the foremost lens group plays an important role to determine the performance of imaging especially in macro shooting range. The formula (1) defines a shape of a meniscus lens of negative refractivity of which component concave lens piece has its rear surface closer to the image plane shaped in convexity and has its front surface closer to the object shaped to be smaller in curvature of radius than the rear surface. Configured in this manner, the imaging lens according to the present invention, especially around the closest range in photo shooting, compensates for spherical aberration somewhat to the over side and comatic aberration to the under side.

If the term (Rn1−Rn2)/(Rn1+Rn2) exceeds the upper limit defined in the formula (1), the lens around the closest range in photo shooting causes the spherical aberration to be excessively prominent under the paraxial image point and suffers from the comatic aberration above the paraxial image point, which is not desirable since the lens fails to attain the satisfactory performance of imaging.

The foremost lens group preferably includes three or more convex lens pieces, which enables the remnant spherical aberration to further be alleviated. In addition, the foremost lens group with a plurality of lens pieces in combination is desirable since it is to cope with eccentricity of the image plane and the resultant variation in curvature of field by dispersing such an adverse effect and allotting part of the effect to each.

<Description of Formula (2)>

In order to improve compensation for chromatic aberration of magnification at the closest range in photo shooting, the average of refractive indices of the convex lens pieces in the foremost lens group and the average of Abbe numbers of the same preferably meet the requirements as defined in the following formulae:

$$nd1<1.6, vd1>67.5 \quad (2)$$

When the terms nd1 and vd1 fail to satisfy the requirements defined in the formulae (2), the resultant lens cannot attain the performance of imaging as desired in the present invention. For instance, as to the third and fourth embodiments in Patent Document 2 and the third embodiment in Patent Document 1, when the imaging lens in each of the embodiment is at the closest range in photo shooting and the second lens subgroup transmits C-line and g-line at the height of 70% of the effective diameter of the entrance pupil and converged into its center, the chromatic distortion due to the wavelength varied from C-line to g-line spreads so great as to be up to 0.030 mm, 0.049 mm, and 0.024 mm, respectively in those embodiments. The present invention is designed to reach the target figure of the chromatic distortion of 0.02 mm or shorter, which cannot be achieved at all by any of the prior art embodiments.

<Aspect 1 of the Present Invention>

The imaging lens according to the present invention further meets the requirements as defined in the following formulae:

$$55<vd3<75 \quad (3)$$

$$1.55<nd3<1.65 \quad (4)$$

where nd3 is a refractive index of the convex lens piece of the second lens subgroup in the middle lens group relative to d-line, and vd3 is an Abbe number of the convex lens piece of the second lens subgroup in the middle lens group.

The formula (3) defines the requirements to satisfactorily compensate for longitudinal chromatic aberration at the object distance of infinity.

If the Abbe number exceeds the upper limit, the lens suffers from the longitudinal chromatic aberration of g-line shifted above the paraxial image point to the side of over-compensation, which causes g-line flare to increase around the closest range in photo shooting, resulting in the trouble of purple fringe that the color green of leaves of a tree turns to purple in the image produced.

If the Abbe number is smaller to go beyond the lower limit defined in the formula (3), the longitudinal chromatic aberration is increased, which brings about decrease in modulation transfer function (MTF) values to have a poor image contrast at the object distance of infinity.

The formula (4) aims at defining refractive indices so that minute inaccuracies such as machining errors of an marginal area of the surface of any convex lens piece of the second lens subgroup in the middle lens group cannot give adverse effects on spherical aberration (referred to as 'machining inaccuracy sensitivity'). The second lens subgroup in the middle lens group especially tends to make a beam flux thick, and a lens design in anticipation of such inaccuracies due to the machining is advantageous in the course of product development.

If the refractive index becomes greater to exceed the upper limit as defined in the formula (4), the accuracy sensitivity increases, which results in the spherical aberration caused by the inaccuracies due to the machining being varied more greatly, and this eventually brings about a significant degradation of resolution in the image center at the object distance of infinity.

Reversely, if the refractive index becomes excessively smaller to go far beyond the lower limit as defined in the formula (4), the resultant lens has its surface reduced in curvature of radius and instead gains an extra weight.

The present invention is directed to reduction in weight of all the three lens groups that are moved during floating for focusing. For that purpose, it is preferable that the third lens group that makes the beam flux the thickest has a small number of the lens pieces. The number of the lens pieces is determined in conformity with the desired performance of imaging; for instance, it may be more preferable that the third lens group has a single lens piece.

The third lens subgroup in the middle lens group also preferably has a single lens piece. In the present invention, the third lens subgroup in the middle lens group has a single cemented lens of the front concave lens piece combined with the rear convex lens piece. In contrast with an arrangement with a cemented lens of the front convex lens piece combined with the rear concave lens piece, the arrangement of the present invention is effective in minimizing variation in curvature of field.

The imaging lens designed to be based on the so-called floating system in the present invention permits curvature of field to show characterizing behavior; that is, as the object distance is varied from a point of infinity to the closest range in photo shooting, the curvature of field, once noticeable under the paraxial image point (in the side of under-compensation), shift above the paraxial image point (to the side of over-compensation), and around the object distance as close as to enable photo shooting with 1:1 equi-magnification, it is recurrently prominent under the paraxial image point. Incorporating the cemented lens of the front concave lens piece combined with the rear convex lens piece permits the curvature of field to reduce its recurrent transition from over to under.

<Aspect 2 of the Present Invention>

The imaging lens according to the present invention meets the requirements as defined in the following formulae:

$$-0.58 < f2/f < -0.36 \quad (5)$$

where f is a focal length of the entire optical system, and f2 is a focal length of the first lens subgroup in the middle lens group.

If the term f2/f becomes smaller to go beyond the lower limit defined in the formula (5), a displacement of the first lens subgroup in the middle lens group during focusing is increased while those of the second and third lens subgroups in the middle lens group for focusing are decreased.

When the focal length becomes shorter to exceed the upper limit defined in the formula (5), a displacement of the first lens subgroup in the middle lens group during focusing is decreased while those of the second and third lens subgroups in the middle lens group for focusing are increased during focusing.

Both the first lens subgroup of negative refractivity in the middle lens group, and the second and third lens subgroups of positive refractivity in the middle lens group come closer to the aperture stop disposed between the first and second lens subgroups in the middle lens group. In developing a lens barrel, for example, when it is intended to use a cam barrel to move three of the lens groups, the lens barrel is designed to keep balance of the cam barrel to which work load is variably applied depending upon a posture of the camera; in other words, an excessive load must not be applied to an actuator. For instance, when a user turns the camera face up, the first lens subgroup in the middle lens group tends to go down as the gravity forces to while, accordingly, the second and third lens subgroups in the middle lens group are urged to go up resisting the gravitational force. When the force exerted on these lens groups is out of balance, an undesirable load is applied to the actuator that activates the cam barrel.

If the term f2/f exceeds either of the upper and lower limits defined in the formulae (5), the related lens groups lose their appropriate mutual balance of displacement and weight, and a trouble is caused with operability of the lens.

<Aspect 3 of the Present Invention>

The imaging lens according to the present invention meets the requirements as defined in the following formulae:

$$0.28 < f4/f3 < 1.95 \quad (6)$$

where f3 is a focal length of the second lens subgroup in the middle lens group, and f4 is a focal length of the third lens subgroup in the middle lens group.

The formulae define a ratio of the focal length of the second lens subgroup in the middle lens group with that of the third lens subgroup in the middle lens group.

If the ratio becomes smaller to go beyond the lower limit defined in the formula (6), aberration compensation effected by virtue of the displacement of the second lens subgroup in the middle lens group recess is deteriorated, which adversely leads to a greater variation in the imaging field around the closest range in photo shooting.

If the ratio exceeds the upper limit defined in the formula (6), the aberration compensation effected by virtue of the displacement of the third lens subgroup in the middle lens group is deteriorated, which adversely leads to a greater variation in the imaging field around the closest range in photo shooting.

<Aspect 4 of the Present Invention>

In the imaging lens according to the present invention, the rearmost lens group includes a concave lens piece the closest to the image plane of all, and a convex lens piece adjacent to the concave lens piece on the side closer to the object; and the imaging lens meets the requirements as defined in the following formulae:

$$-0.23 < D/FR < -0.01 \quad (7)$$

where FR is a focal length of the concave lens piece the closest to the image plane, and D is a distance between the concave lens piece the closest to the image plane and the convex lens piece adjacent to it on the side closer to the object, the distance being filled with air without any lens medium.

In general, the so-call bright lens having an F number as small as 2.8 similar to the embodiments of the present invention has a convex lens piece the closest to the image plane and a concave lens piece adjacent to it. This is because the spherical aberration still remaining prominent under the paraxial image point (on the side of under-compensation) even after compensated by the foremost lens group is to be cancelled by using the front surface of the concave lens piece to overcompensate the remaining spherical aberration so as to be prominent above the paraxial image point.

Unlike this, with the imaging lens according to the present invention, the remnant spherical aberration can be reduced by the foremost lens group, and hence, an additional aberration cancelation element behind it is unnecessary. This permits the concave lens piece to be placed in the rearmost position the closest to the image plane.

If the term D/FR becomes smaller to go beyond the lower limit defined in the formula (7), the machining inaccuracy sensitivity is increased to the distance between the lens groups/lens pieces that is adjustable to compensate for the spherical aberration and the comatic aberration, and this brings about difficulties in producing the lens.

If the term D/FR exceeds the upper limit defined in the formula (7), the imaging lens suffers from reduction in back focus and excessively acute angle of abaxial incident beams upon the image plane, which in turn is prone to varied light quantity in the marginal area of the image, that is, the so-called shading.

Instead, meeting the requirements, the imaging lens of the present invention is advantageous in that the rearmost lens piece the closest to the image plane can be reduced in outer diameter to facilitate designing the mechanical system, that when assembled in a finished product, the lens groups/lens pieces are arranged with a controlled distance from one to the other to enlarge a degree of freedom in a style of production-related adjustment of back focus, spherical aberration, and the like, and that such a controlled distance between the lens groups/lens pieces in themselves can serve like an optical component to add a choice in optical design, which in turn enlarges a degree of freedom in a style of compensation for the spherical aberration and the comatic aberration.

BRIEF DESCRIPTION OF THE DRAWINGS

FIG. 30 depicts graphs illustrating lateral aberration the seventh embodiment of the imaging lens suffers from at the closest range in photo shooting;

FIG. 50 depicts graphs illustrating longitudinal aberration the tenth embodiment of the imaging lens suffers from in focus at infinity;

FIG. 53 depicts graphs illustrating lateral aberration the tenth embodiment of the imaging lens suffers from in focus at infinity;

FIG. 54 depicts graphs illustrating lateral aberration the tenth embodiment of the imaging lens suffers from at the closest range in photo shooting;

FIG. 62 depicts graphs illustrating lateral aberration the eleventh embodiment of the imaging lens suffers from at the closest range in photo shooting;

FIG. 72 depicts graphs illustrating lateral aberration the twelfth embodiment of the imaging lens suffers from in focus at infinity with vibration in −direction.

The graphs of the longitudinal aberrations in each of the accompanying drawings are related to spherical aberration (in millimeters), astigmatism (in millimeters), and distortion (%), respectively, in this order from left to right. In the graphs of the spherical aberration, a vertical axis is a scale for F numbers (denoted by F in the accompanying drawings), and solid line depicts properties of d-line while broken line depicts those of g-line.

In the graphs of the astigmatism, a vertical axis is a scale for degrees of half an angle of view, and solid line depicts properties of the sagittal plane (denoted by s in the accompanying drawings) while broken line depicts those of the meridional plane (denoted by m in the accompanying drawings).

In the graphs of distortion, a vertical axis is a scale for degrees of half an angle of view while a horizontal axis is a scale for percentages of the distortion.

EMBODIMENTS OF THE FIRST PRESENT INVENTION

In tables providing parameters in relation with embodiments of the present invention, Fno is an F number, f is a focal length of the entire optical system, W is a half of an angle of view (in degrees), fB is a back focus, R is a curvature of radius, D is a thickness of a lens piece, d is a thickness of a lens piece, Nd is a refractive index relative to d-line, and vd is an Abbe number relative to the d-line reference wavelength.

Figure 1:
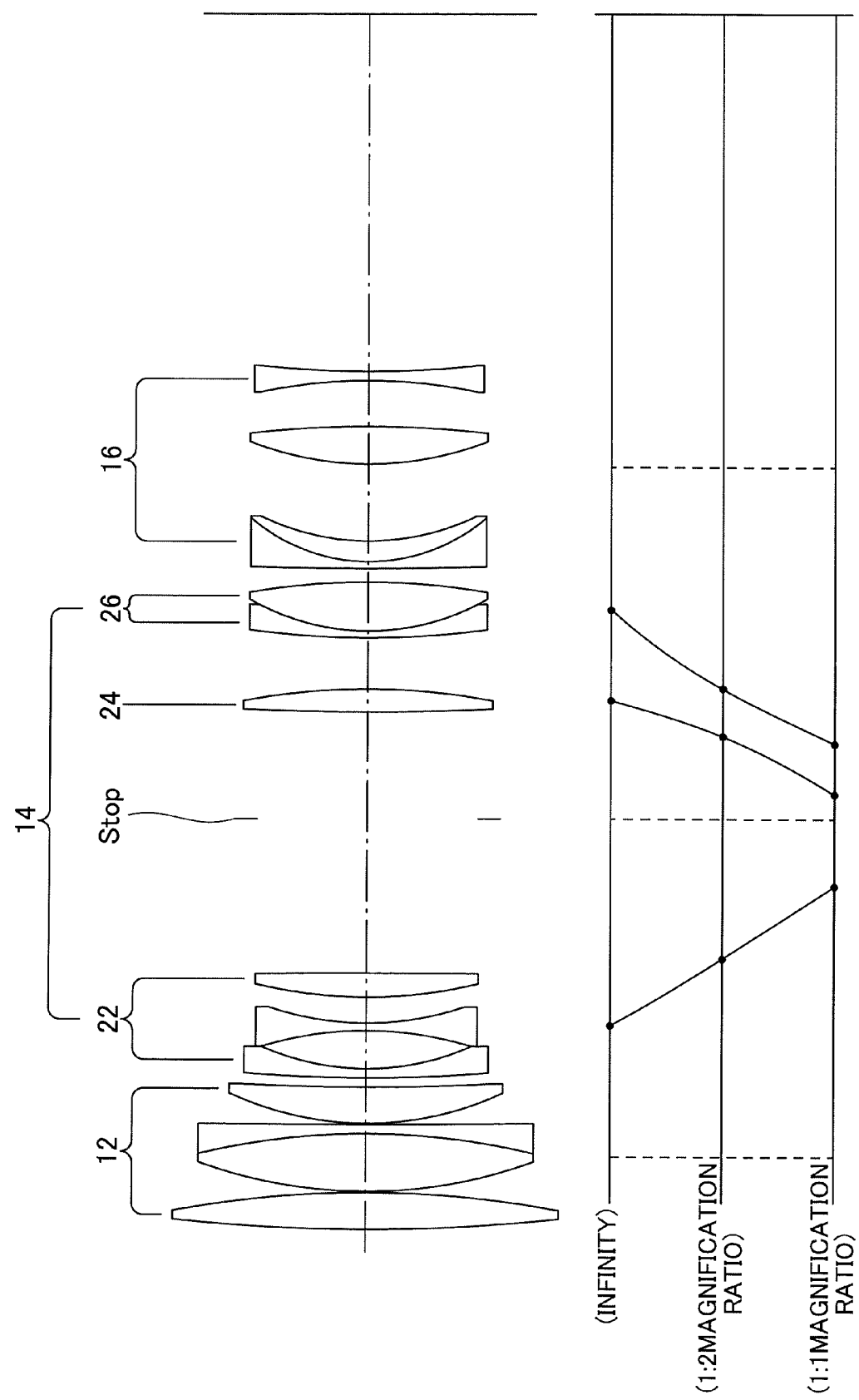
FIG. 1 is a sectional view illustrating a first embodiment of an imaging lens according to the present invention in focus at infinity where a trajectory of each of lens groups from the closest range to the macro in photo shooting is depicted by solid line.
Figure 2:
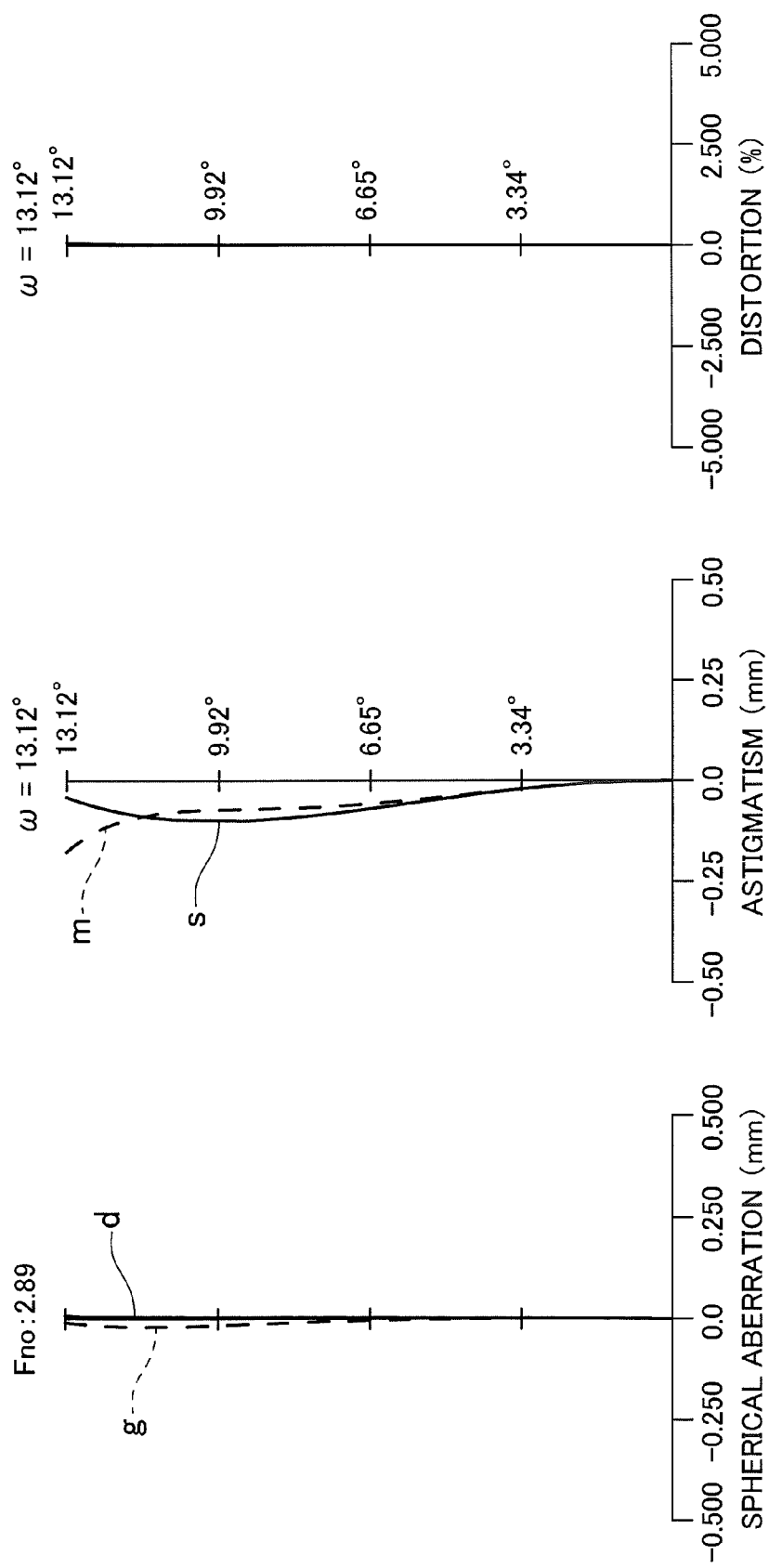
FIG. 2 depicts graphs illustrating longitudinal aberration the first embodiment of the imaging lens suffers from in focus at infinity.
Figure 3:
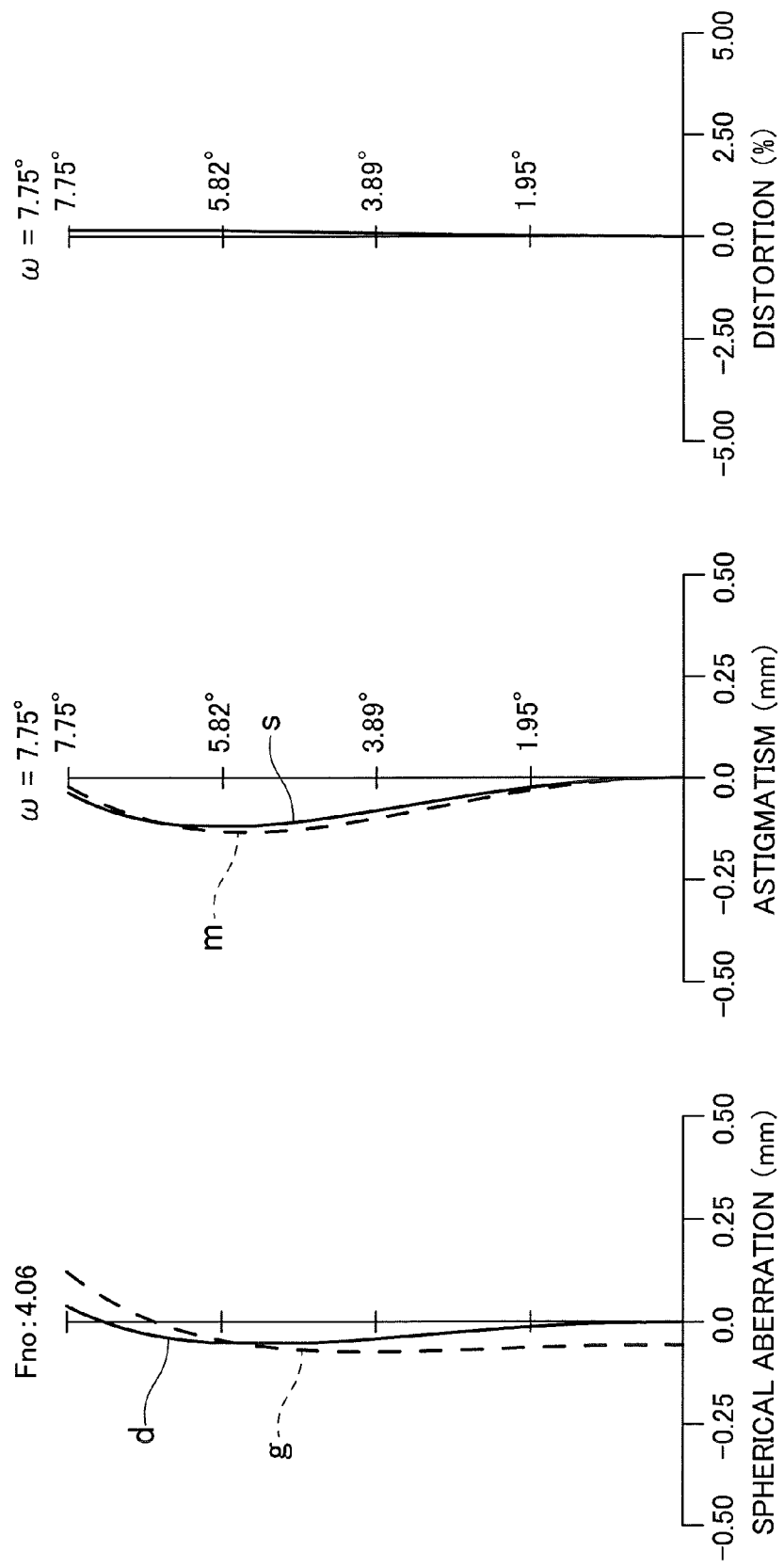
FIG. 3 depicts graphs illustrating longitudinal aberration the first embodiment of the imaging lens suffers from with 1:2 magnification ratio.
Figure 4:
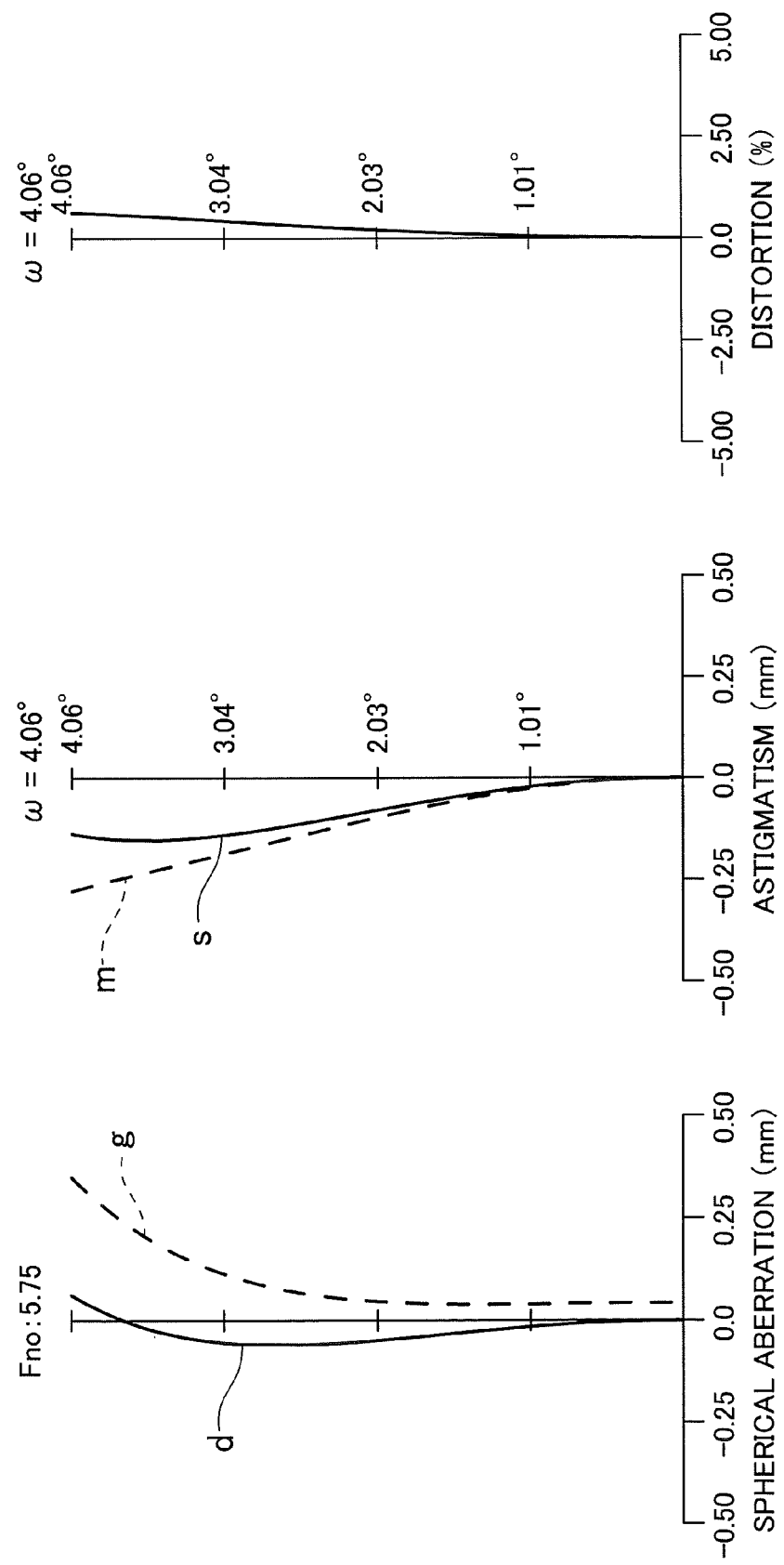
FIG. 4 depicts graphs illustrating longitudinal aberration the first embodiment of the imaging lens suffers from with 1:1 magnification ratio.
Figure 5:
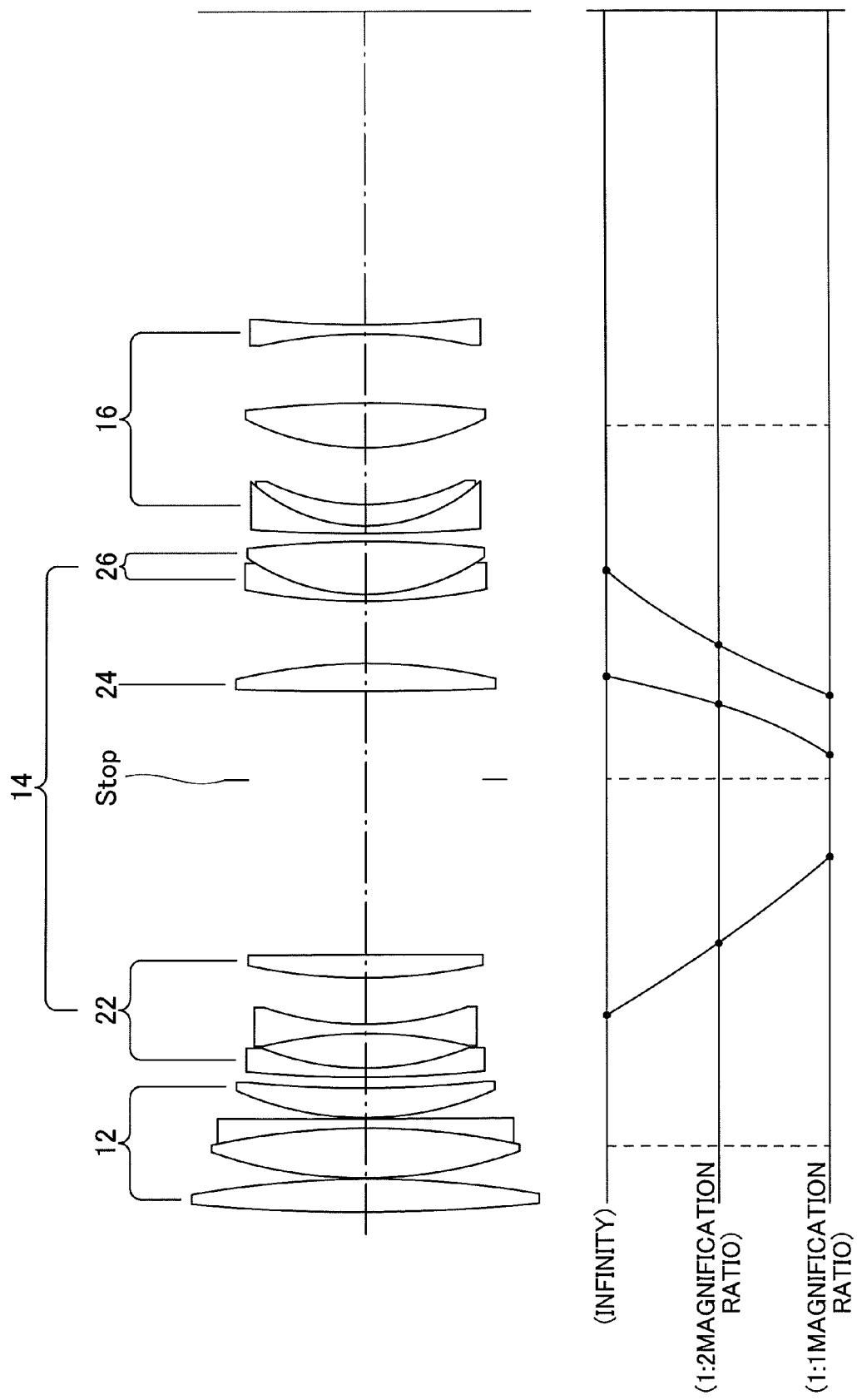
FIG. 5 is a sectional view illustrating a second embodiment of an imaging lens according to the present invention in focus at infinity where the trajectory of each of lens groups from the closest range to the macro in photo shooting is depicted by solid line.
Figure 6:
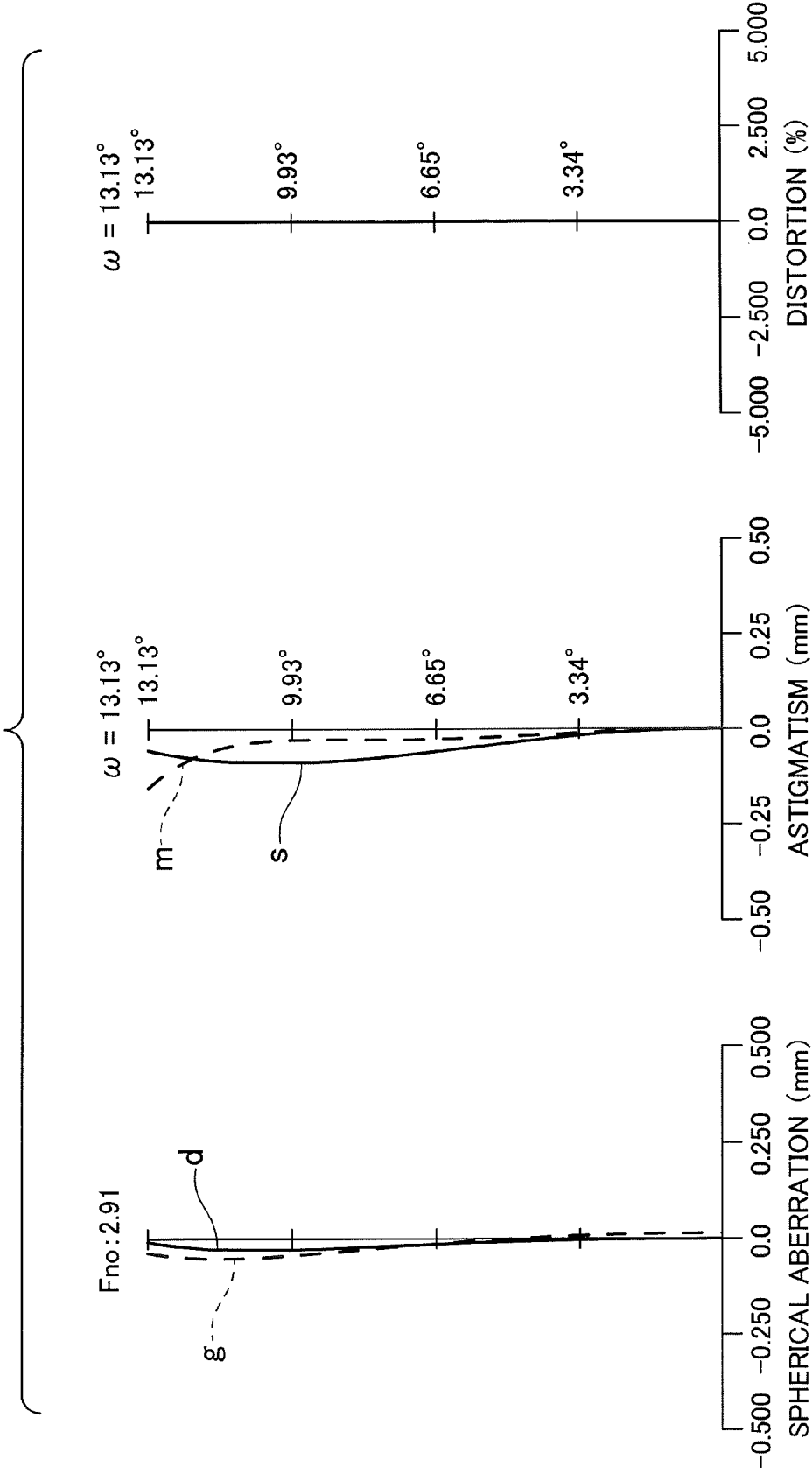
FIG. 6 depicts graphs illustrating longitudinal aberration the second embodiment of the imaging lens suffers from in focus at infinity.
Figure 7:
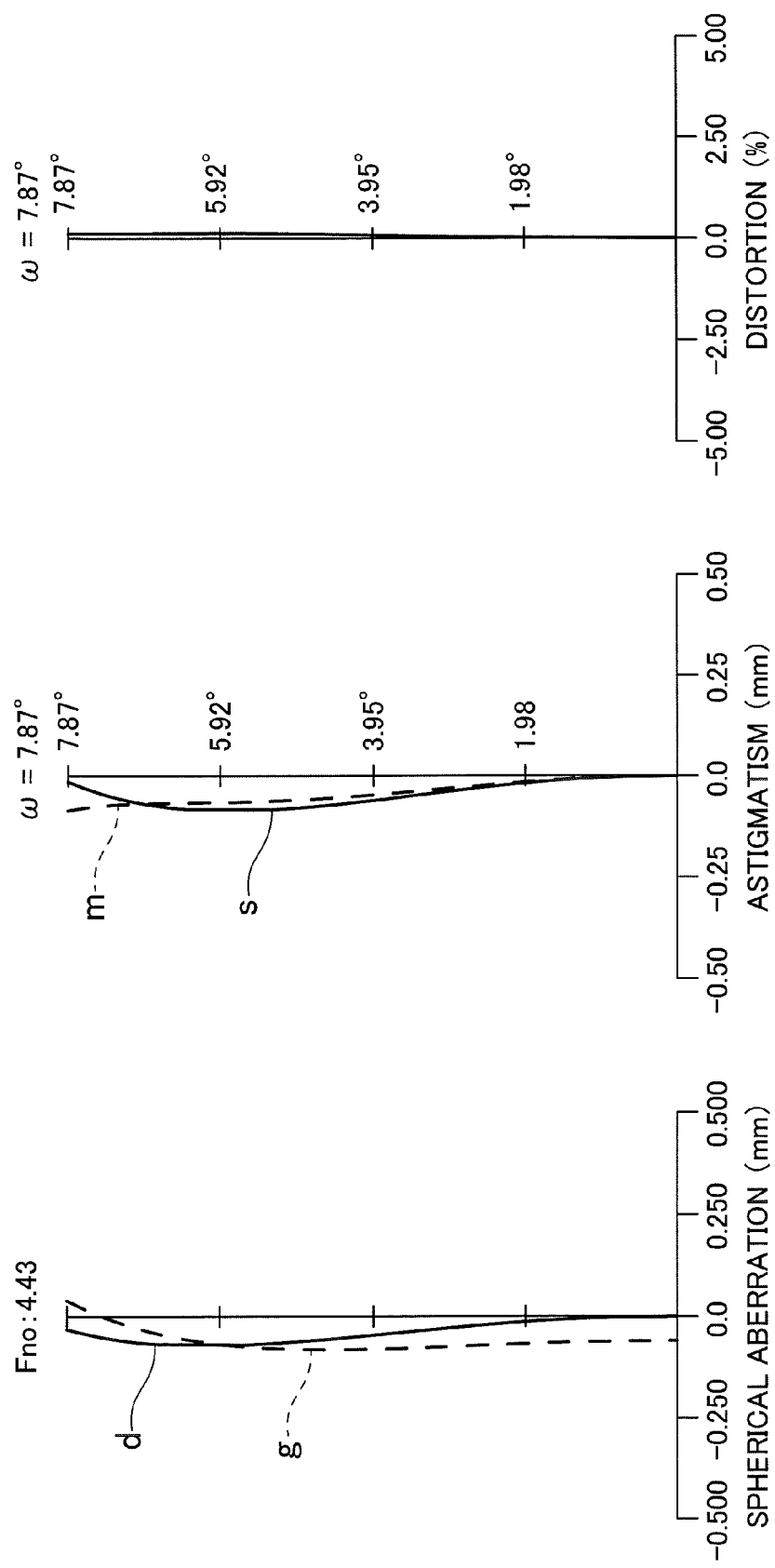
FIG. 7 depicts graphs illustrating longitudinal aberration the second embodiment of the imaging lens suffers from with 1:2 magnification ratio.
Figure 8:
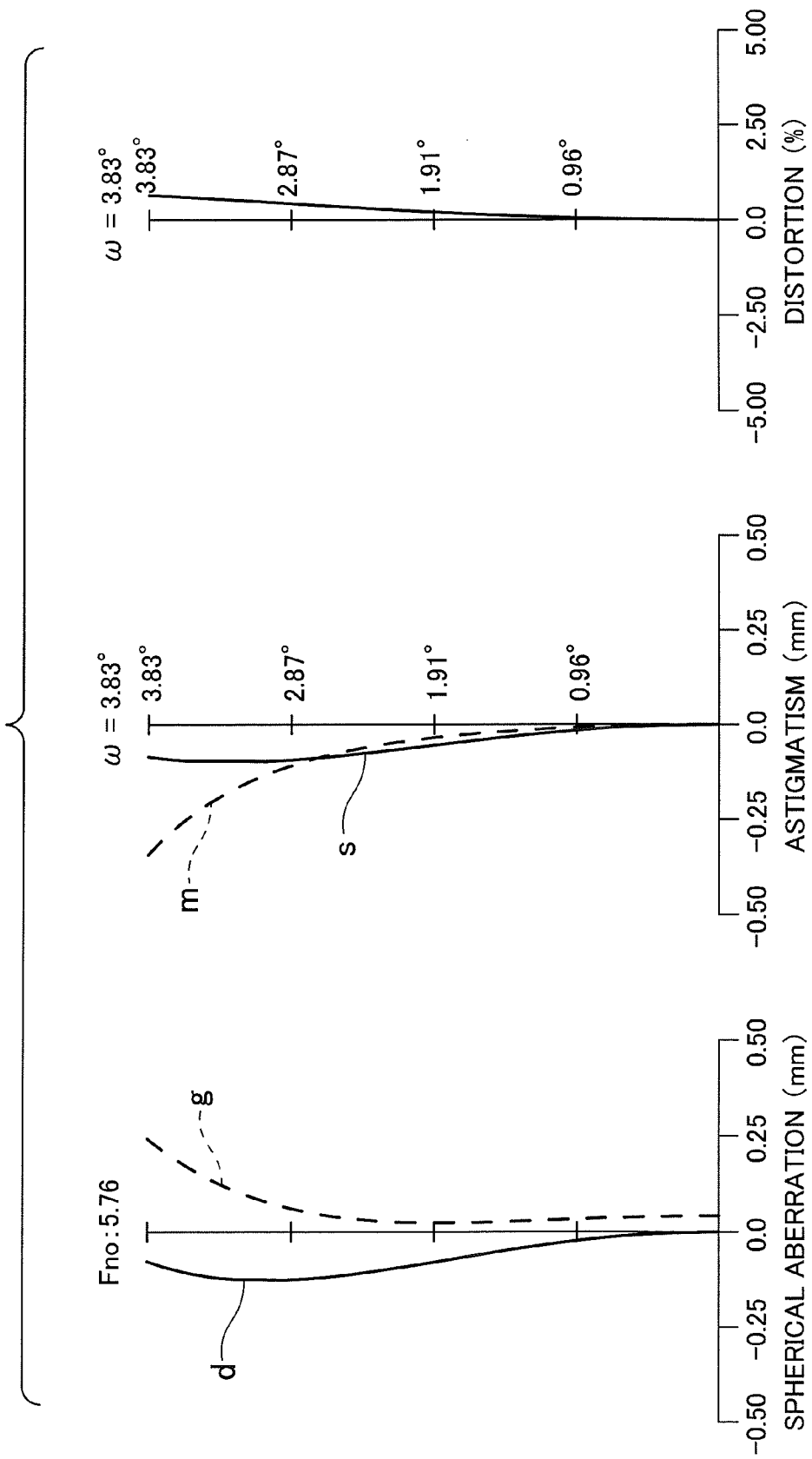
FIG. 8 depicts graphs illustrating longitudinal aberration the second embodiment of the imaging lens suffers from with 1:1 magnification ratio.
Figure 9:
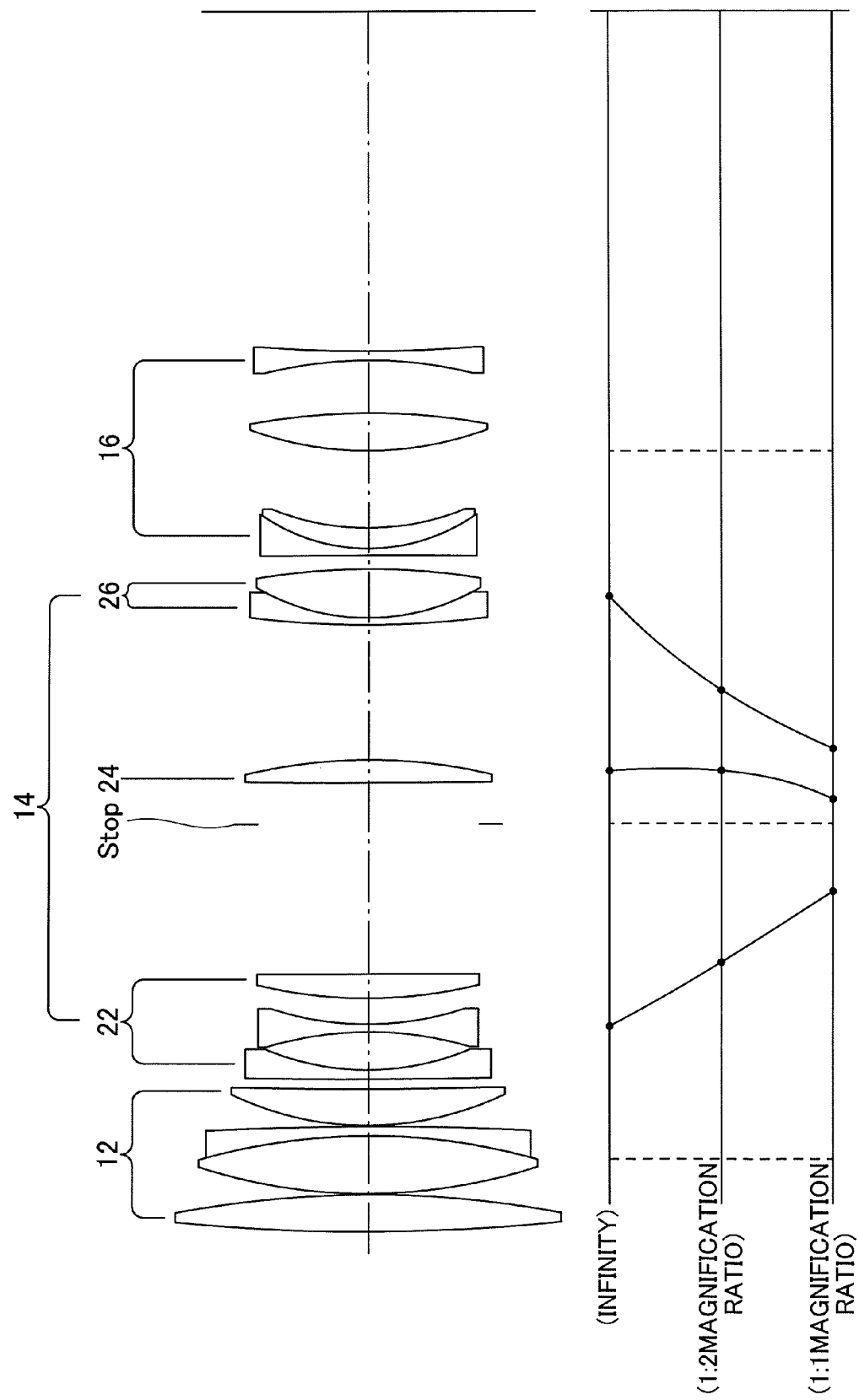
FIG. 9 is a sectional view illustrating a third embodiment of an imaging lens according to the present invention in focus at infinity where the trajectory of each of lens groups from the closest range to the macro in photo shooting is depicted by solid line.
Figure 10:
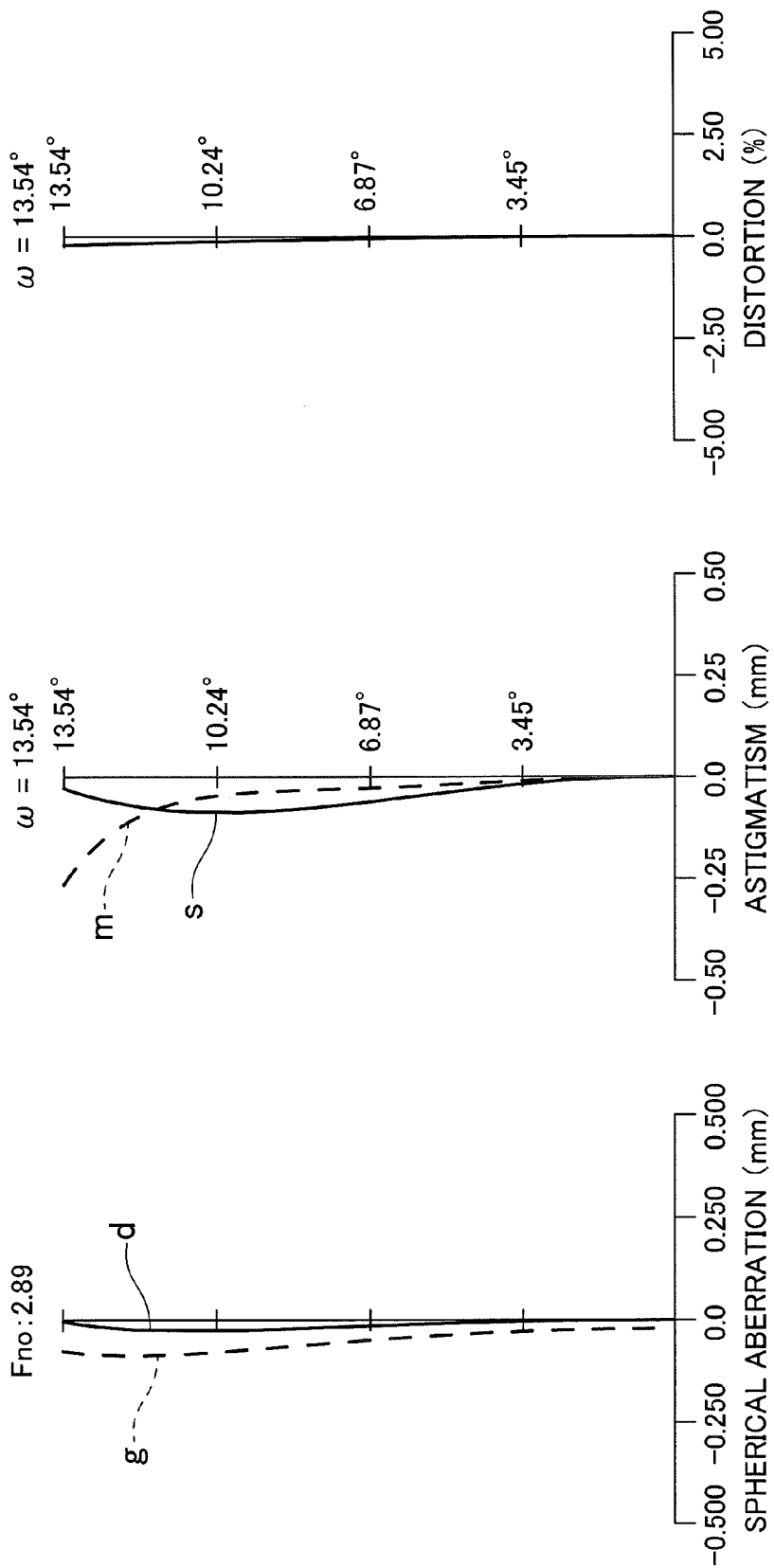
FIG. 10 depicts graphs illustrating longitudinal aberration the third embodiment of the imaging lens suffers from in focus at infinity.
Figure 11:
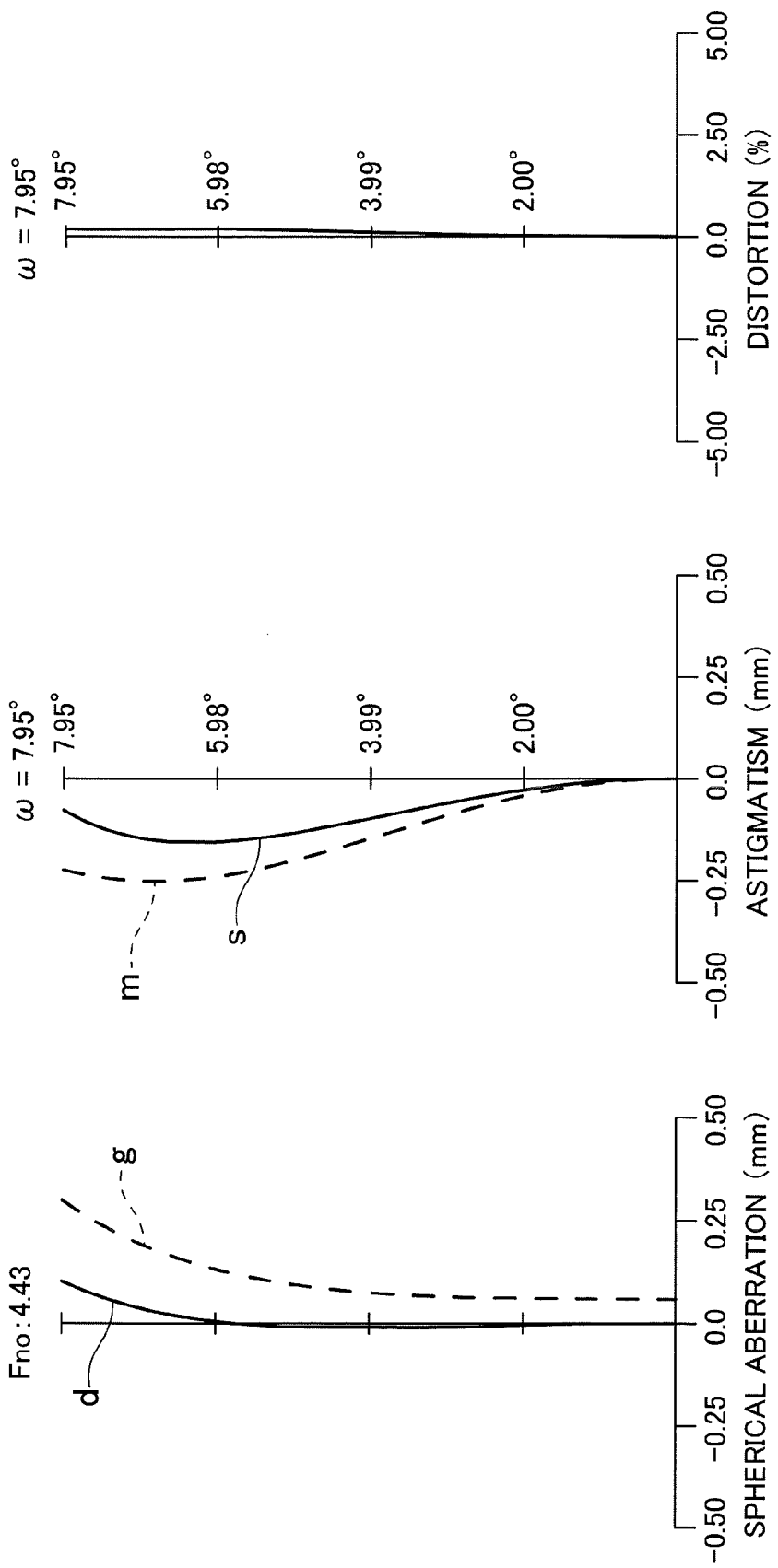
FIG. 11 depicts graphs illustrating longitudinal aberration the third embodiment of the imaging lens suffers from with 1:2 magnification ratio.
Figure 12:
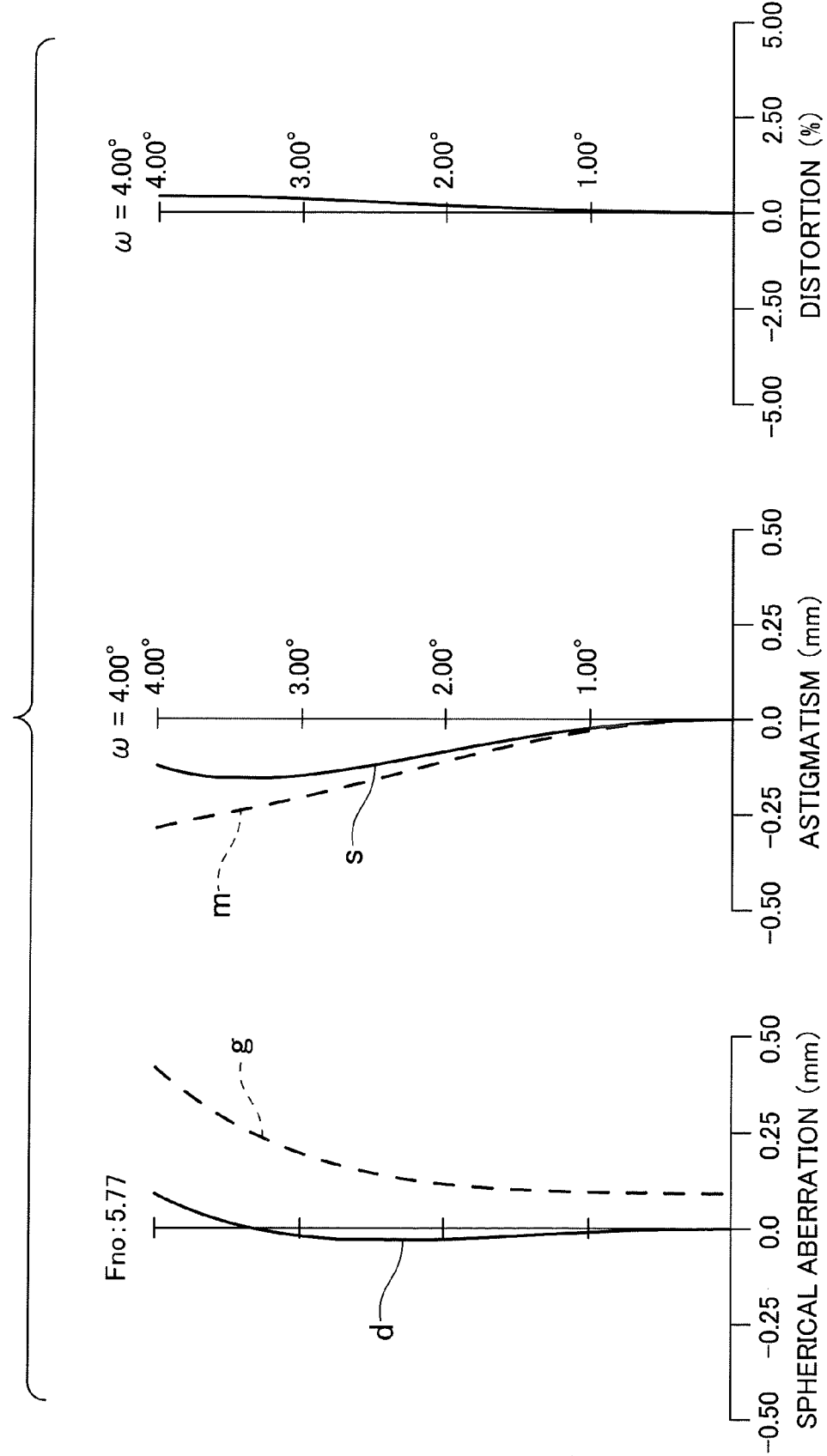
FIG. 12 depicts graphs illustrating longitudinal aberration the third embodiment of the imaging lens suffers from with 1:1 magnification ratio.
Figure 13:
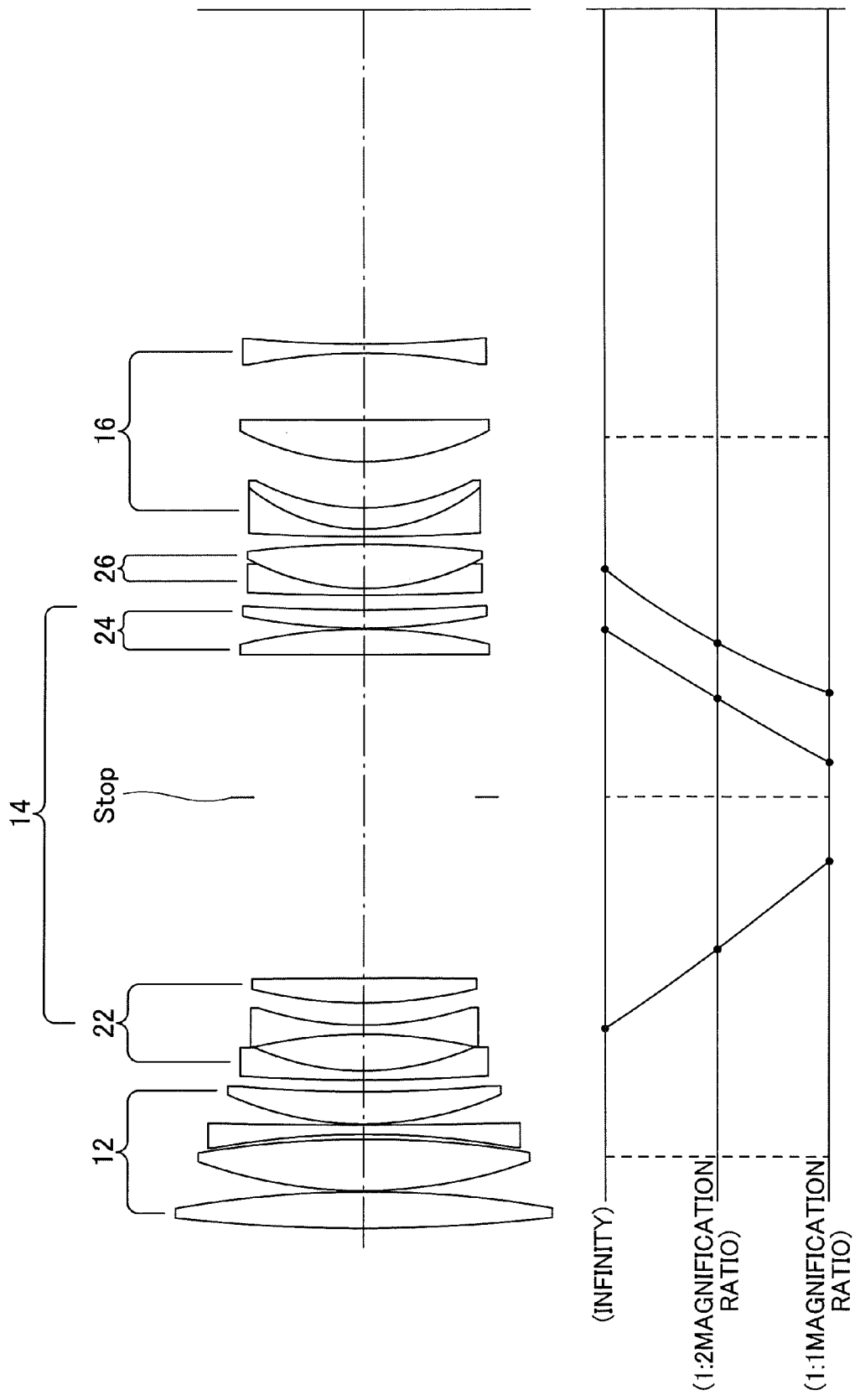
FIG. 13 is a sectional view illustrating a fourth embodiment of an imaging lens according to the present invention in focus at infinity where the trajectory of each of lens groups from the closest range to the macro in photo shooting is depicted by solid line.
Figure 14:
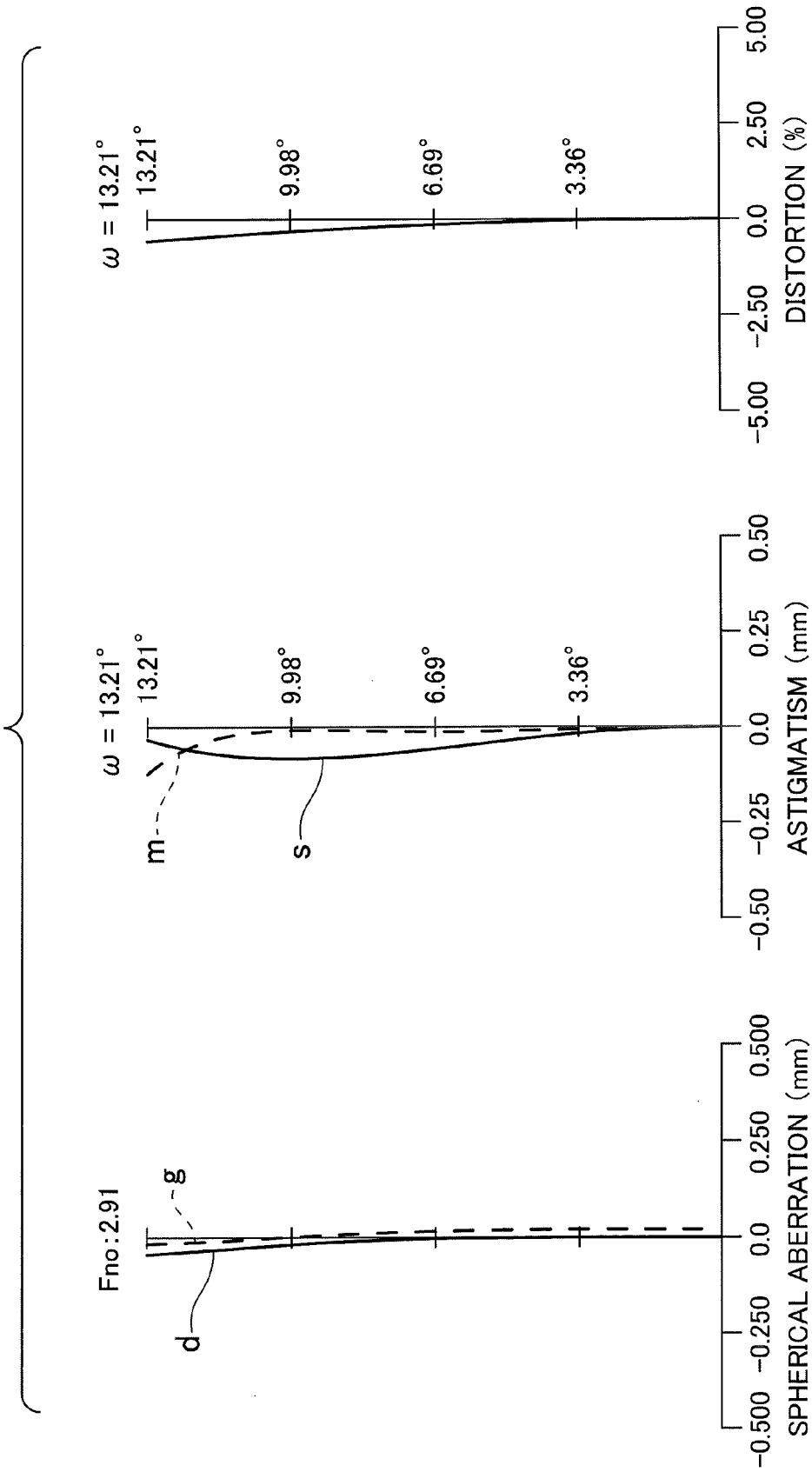
FIG. 14 depicts graphs illustrating longitudinal aberration the fourth embodiment of the imaging lens suffers from in focus at infinity.
Figure 15:
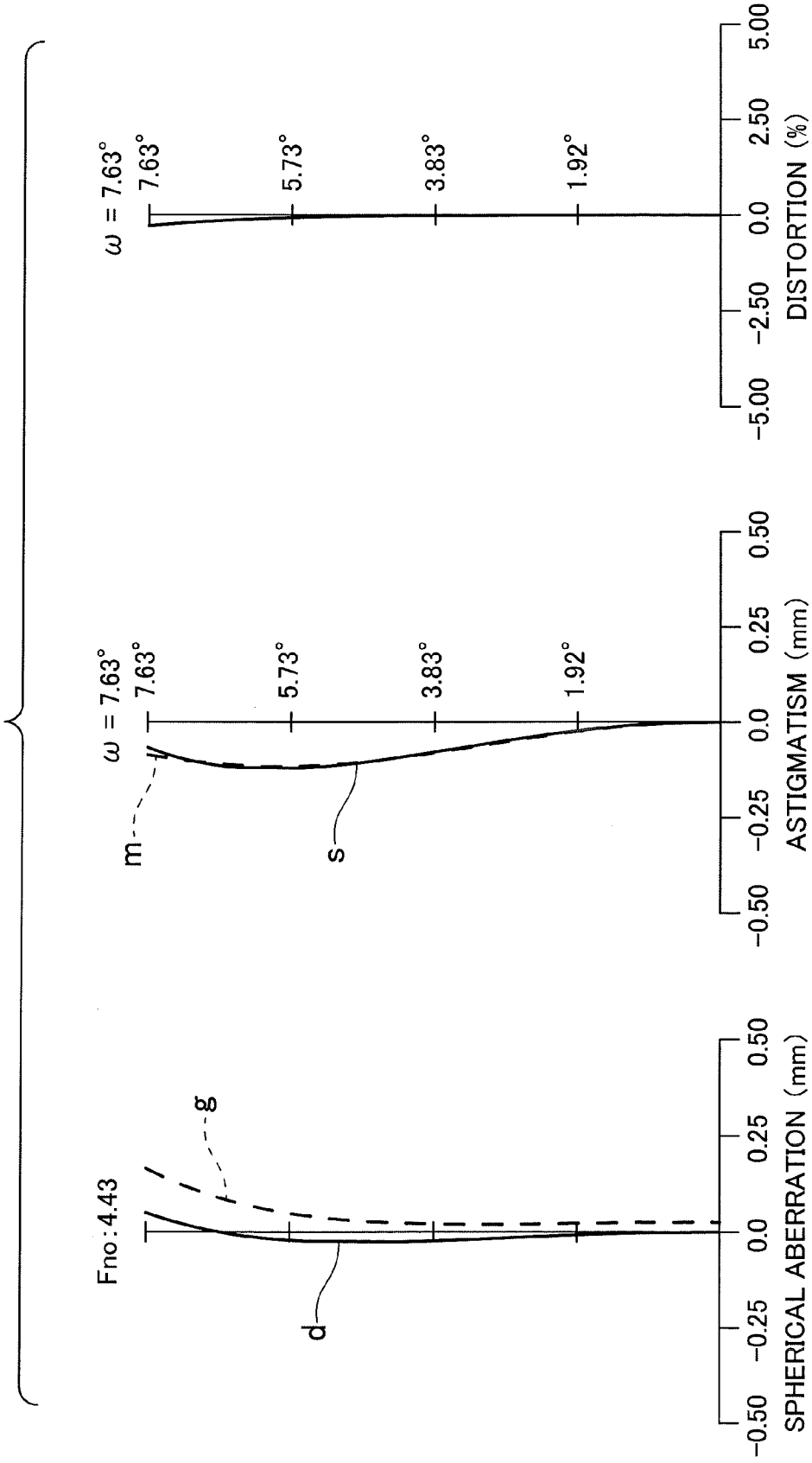
FIG. 15 depicts graphs illustrating longitudinal aberration the fourth embodiment of the imaging lens suffers from with 1:2 magnification ratio.
Figure 16:
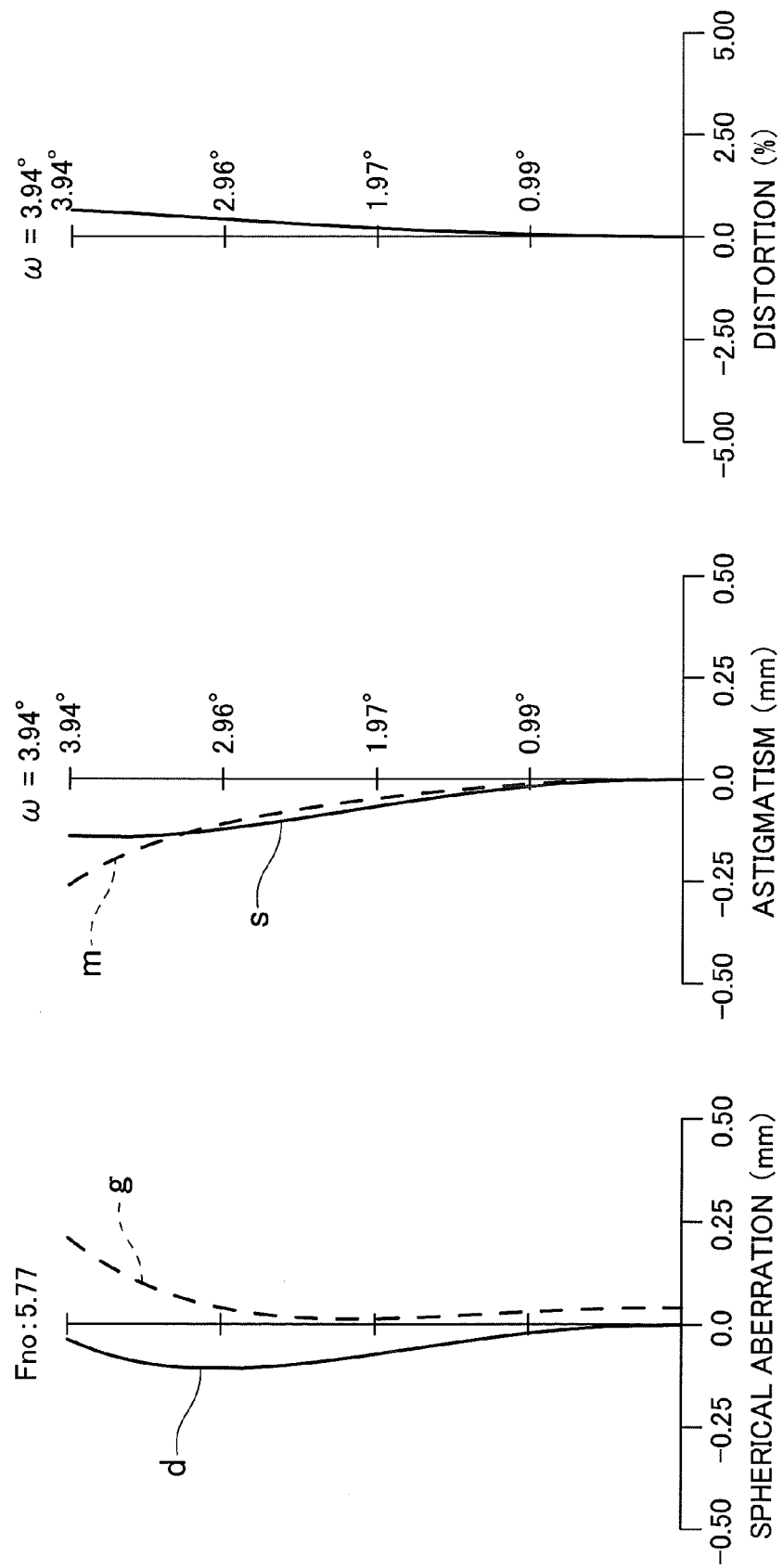
FIG. 16 depicts graphs illustrating longitudinal aberration the fourth embodiment of the imaging lens suffers from with 1:1 magnification ratio.
Figure 17:
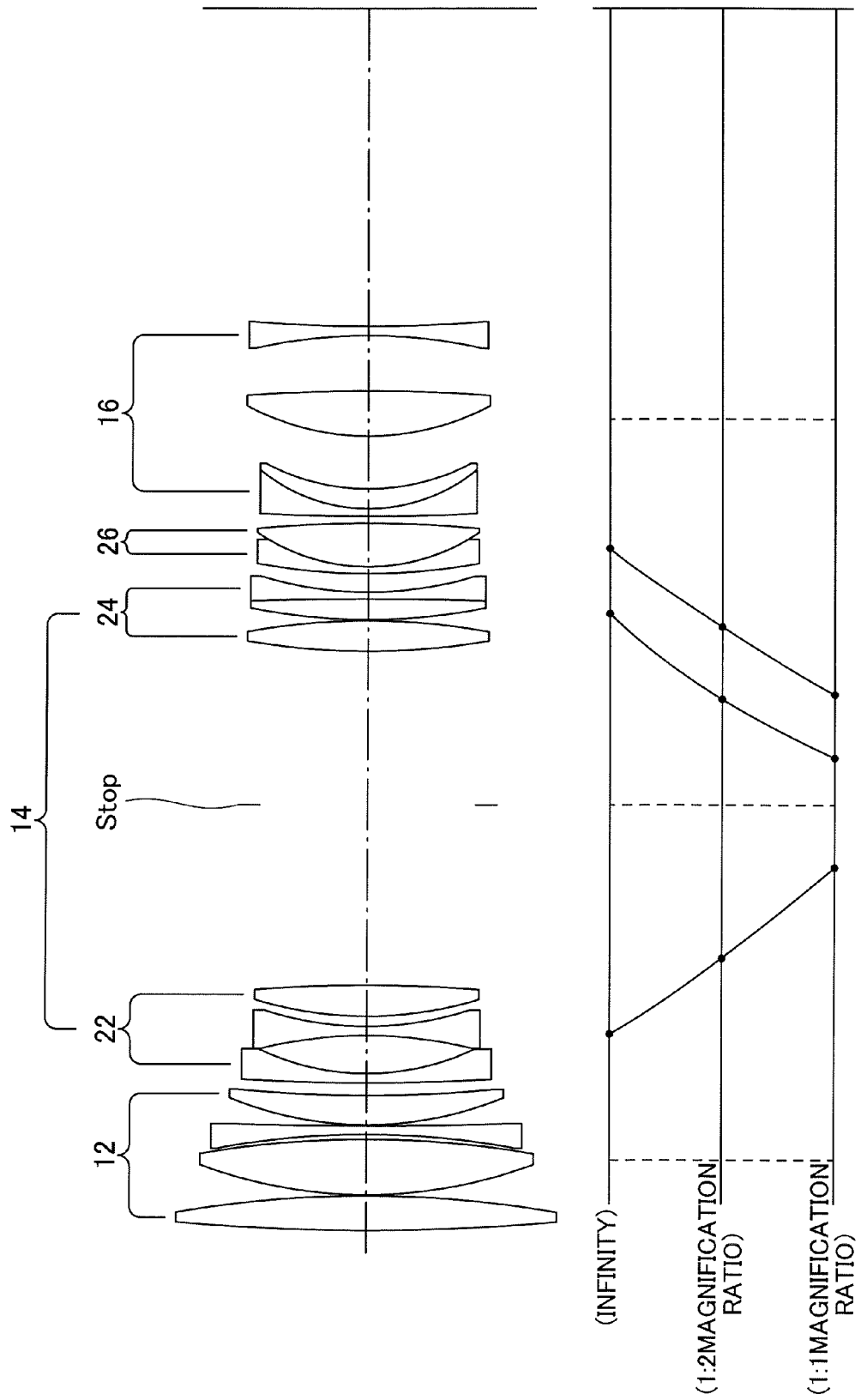
FIG. 17 is a sectional view illustrating a fifth embodiment of an imaging lens according to the present invention in focus at infinity where the trajectory of each of lens groups from the closest range to the macro in photo shooting is depicted by solid line.
Figure 18:
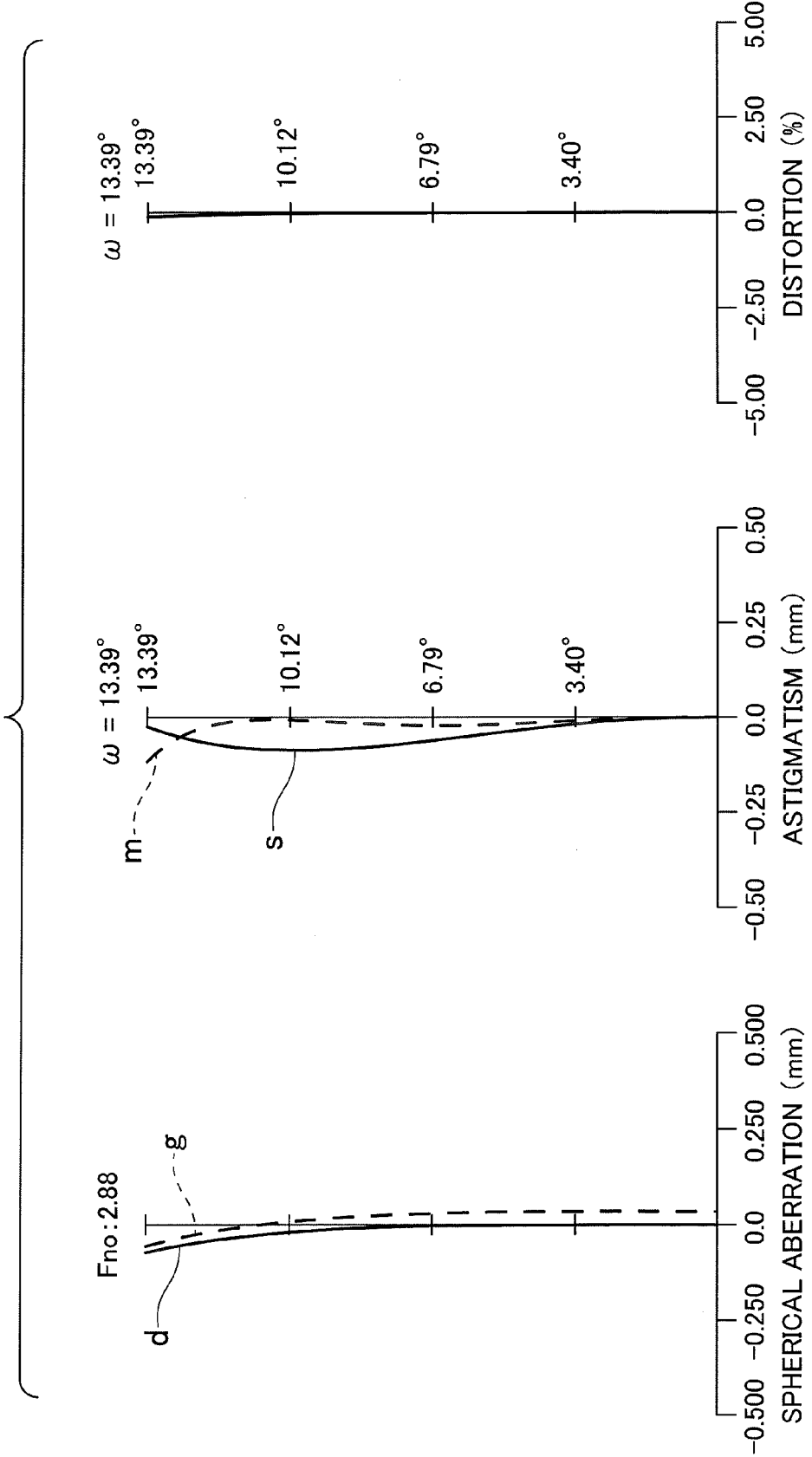
FIG. 18 depicts graphs illustrating longitudinal aberration the fifth embodiment of the imaging lens suffers from in focus at infinity.
Figure 19:
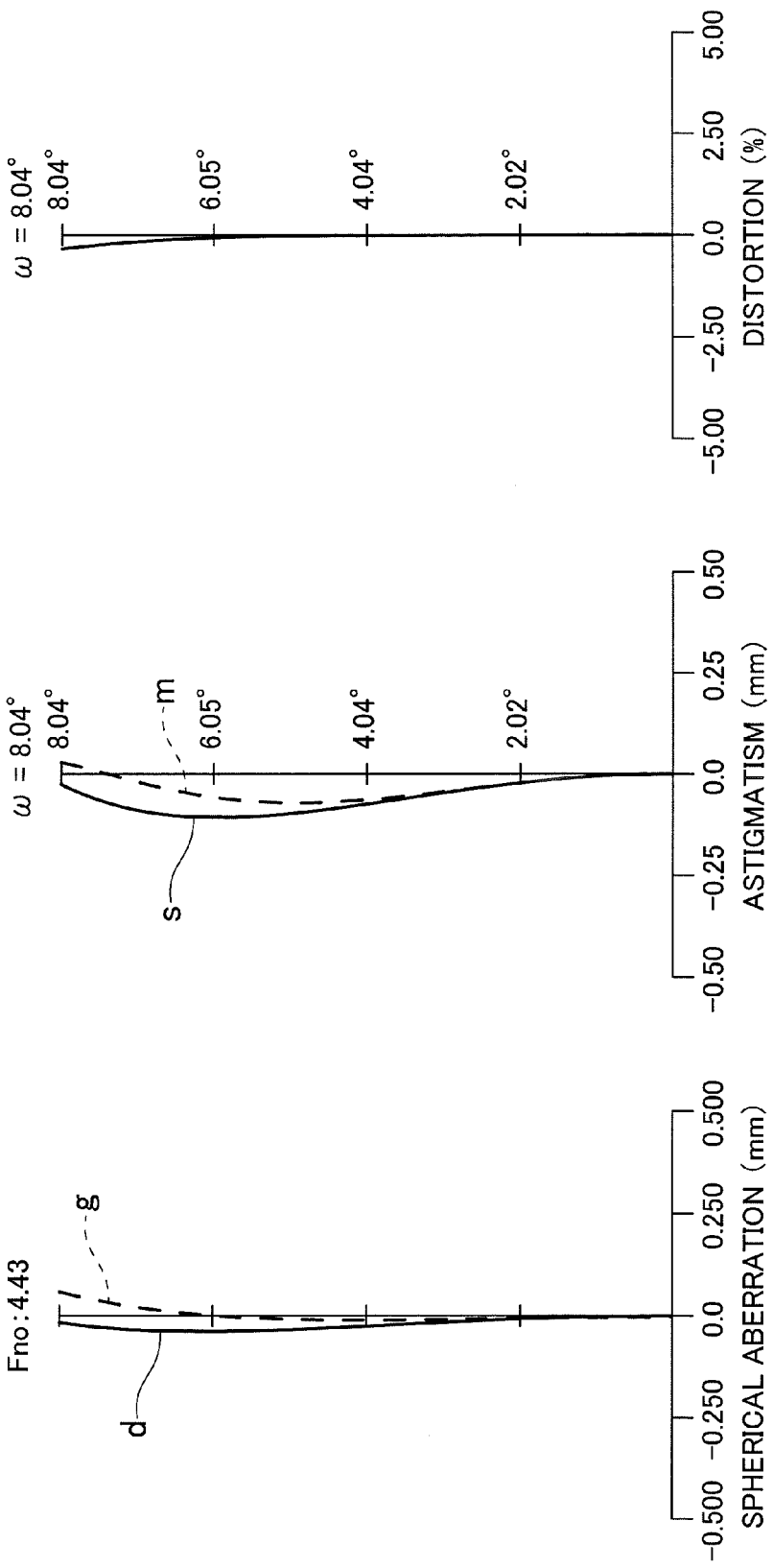
FIG. 19 depicts graphs illustrating longitudinal aberration the fifth embodiment of the imaging lens suffers from with 1:2 magnification ratio.
Figure 20:
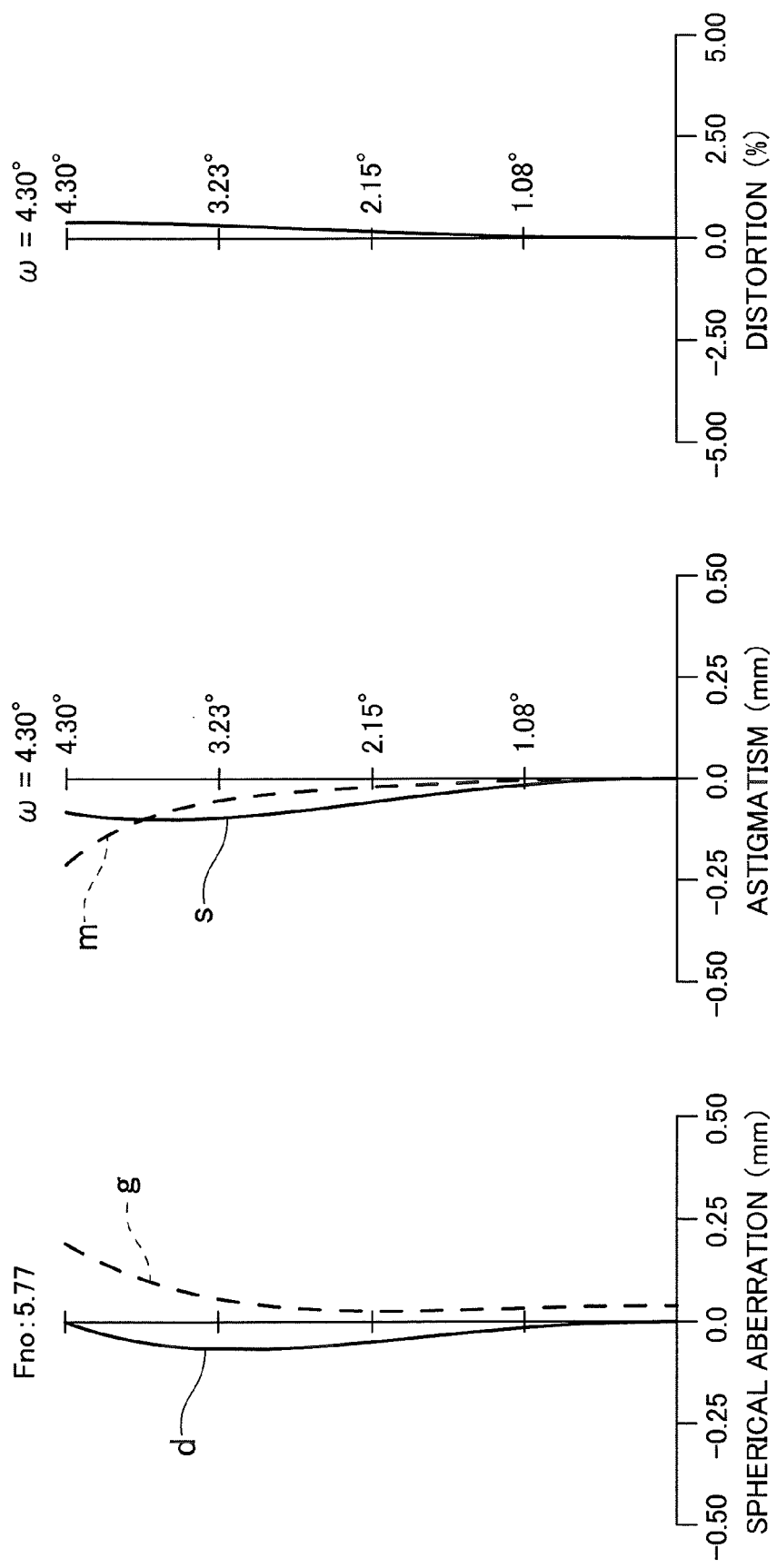
FIG. 20 depicts graphs illustrating longitudinal aberration the fifth embodiment of the imaging lens suffers from with 1:1 magnification ratio.
Figure 21:
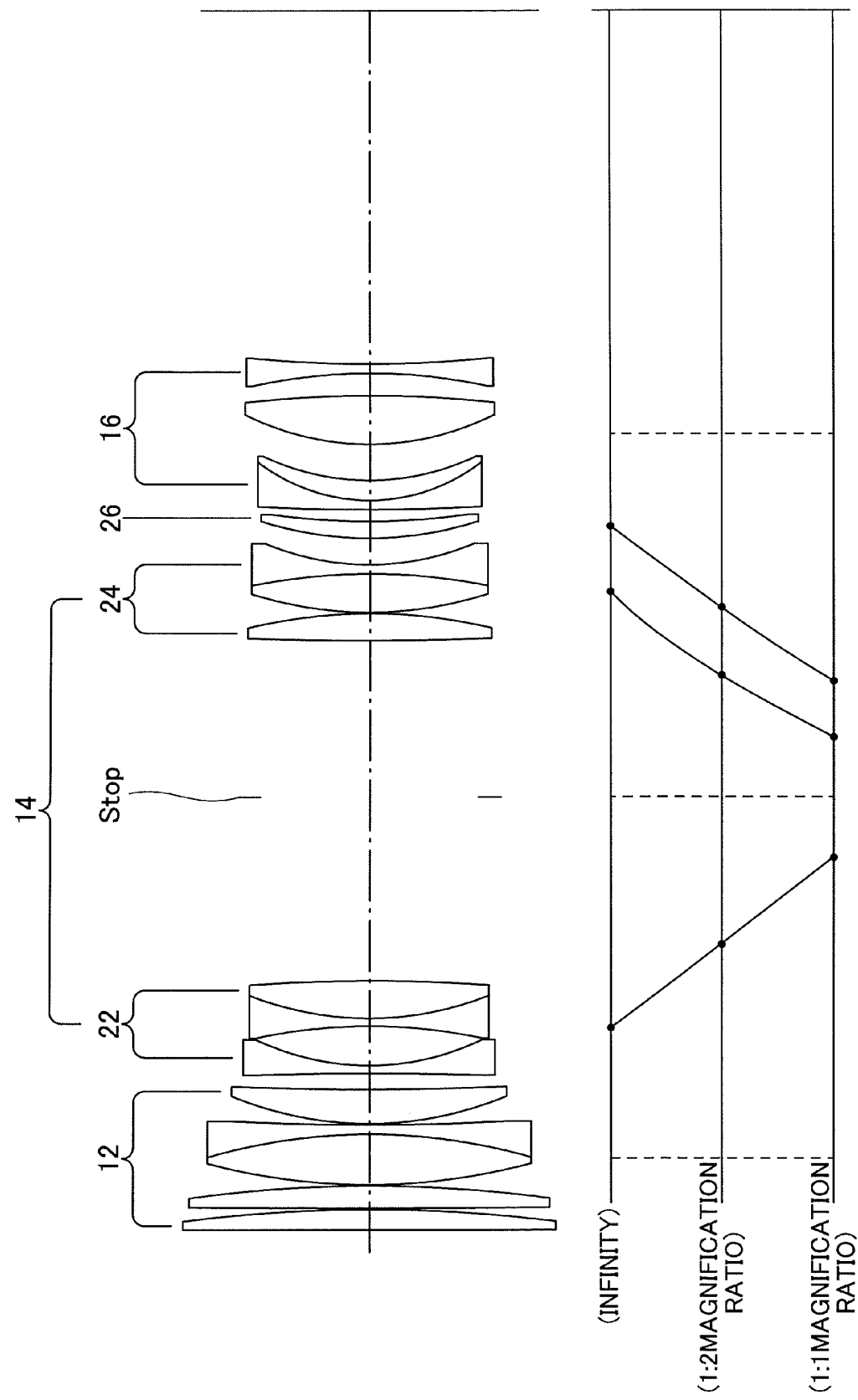
FIG. 21 is a sectional view illustrating a sixth embodiment of an imaging lens according to the present invention in focus at infinity where the trajectory of each of lens groups from the closest range to the macro in photo shooting is depicted by solid line.
Figure 22:
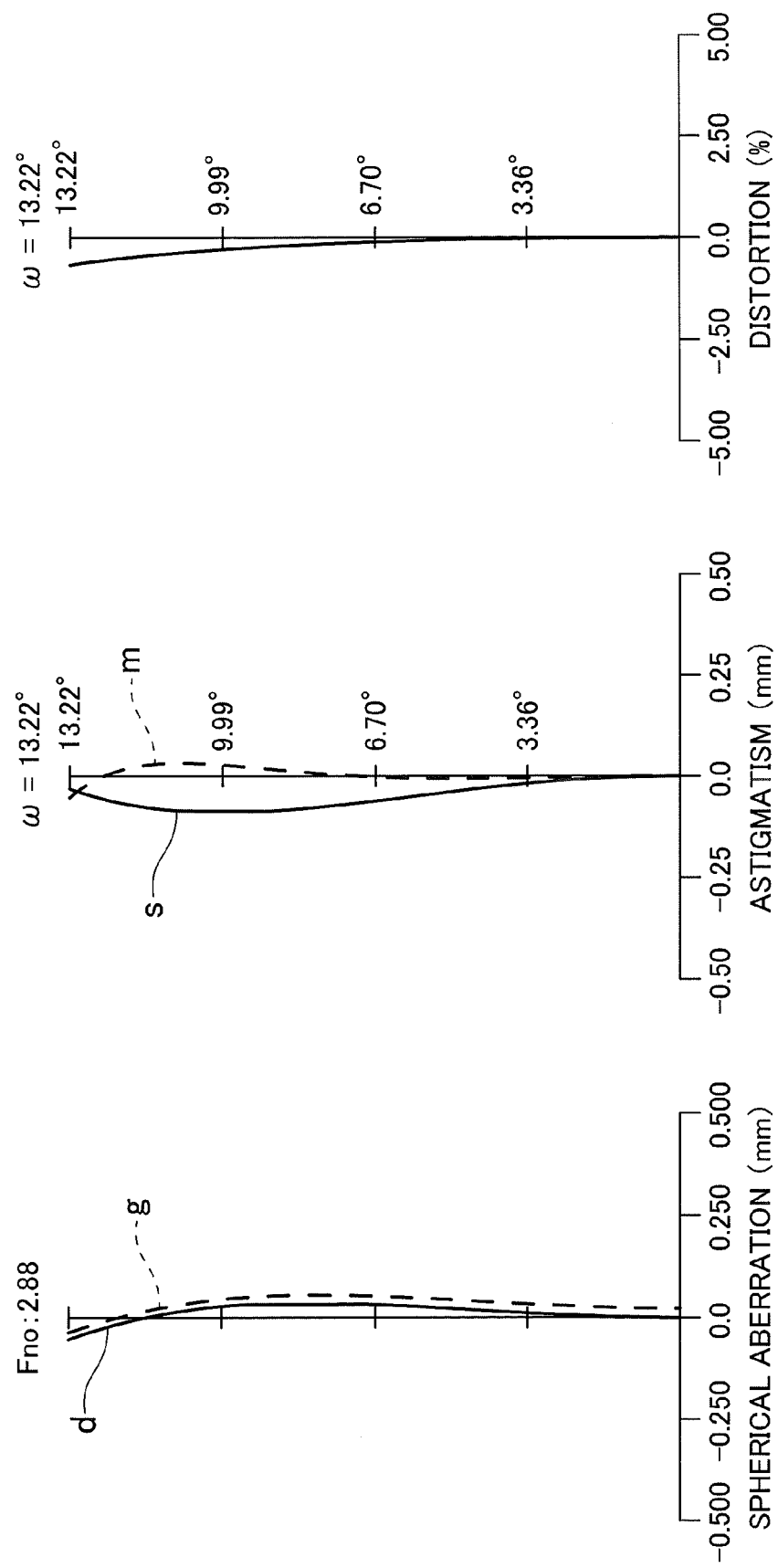
FIG. 22 depicts graphs illustrating longitudinal aberration the sixth embodiment of the imaging lens suffers from in focus at infinity.
Figure 23:
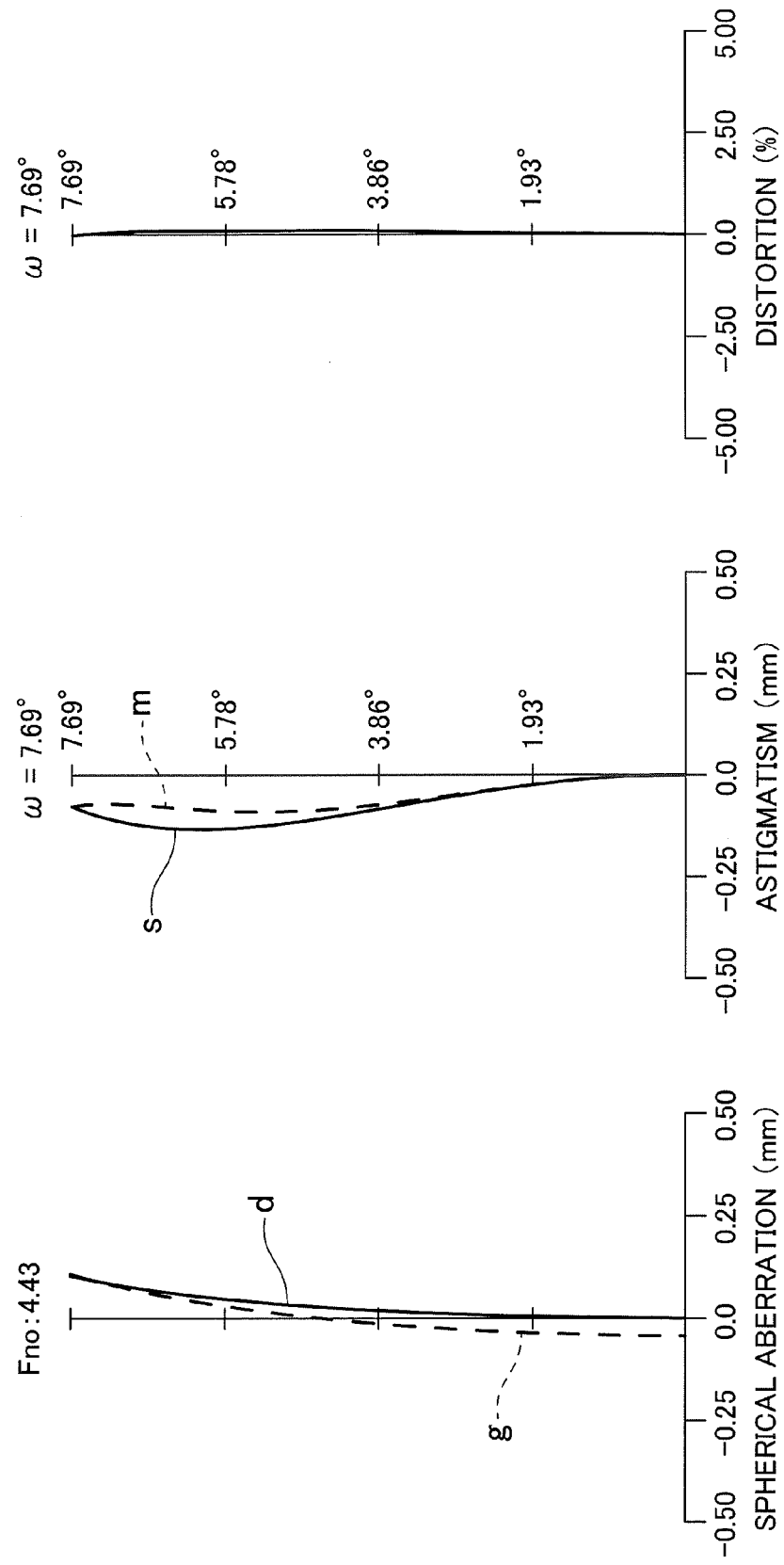
FIG. 23 depicts graphs illustrating longitudinal aberration the sixth embodiment of the imaging lens suffers from with 1:2 magnification ratio.
Figure 24:
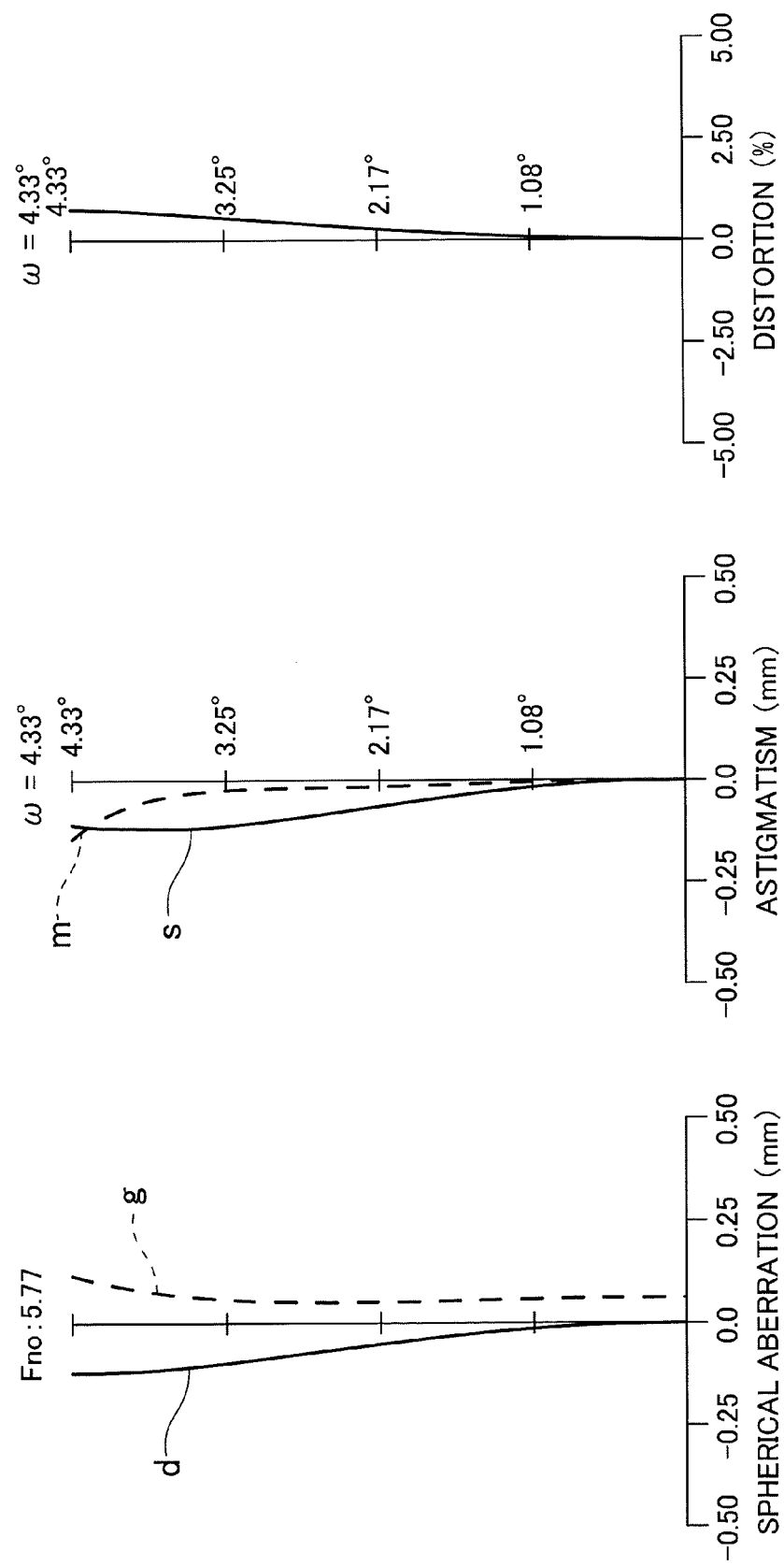
FIG. 24 depicts graphs illustrating longitudinal aberration the sixth embodiment of the imaging lens suffers from with 1:1 magnification ratio.
Figure 26:
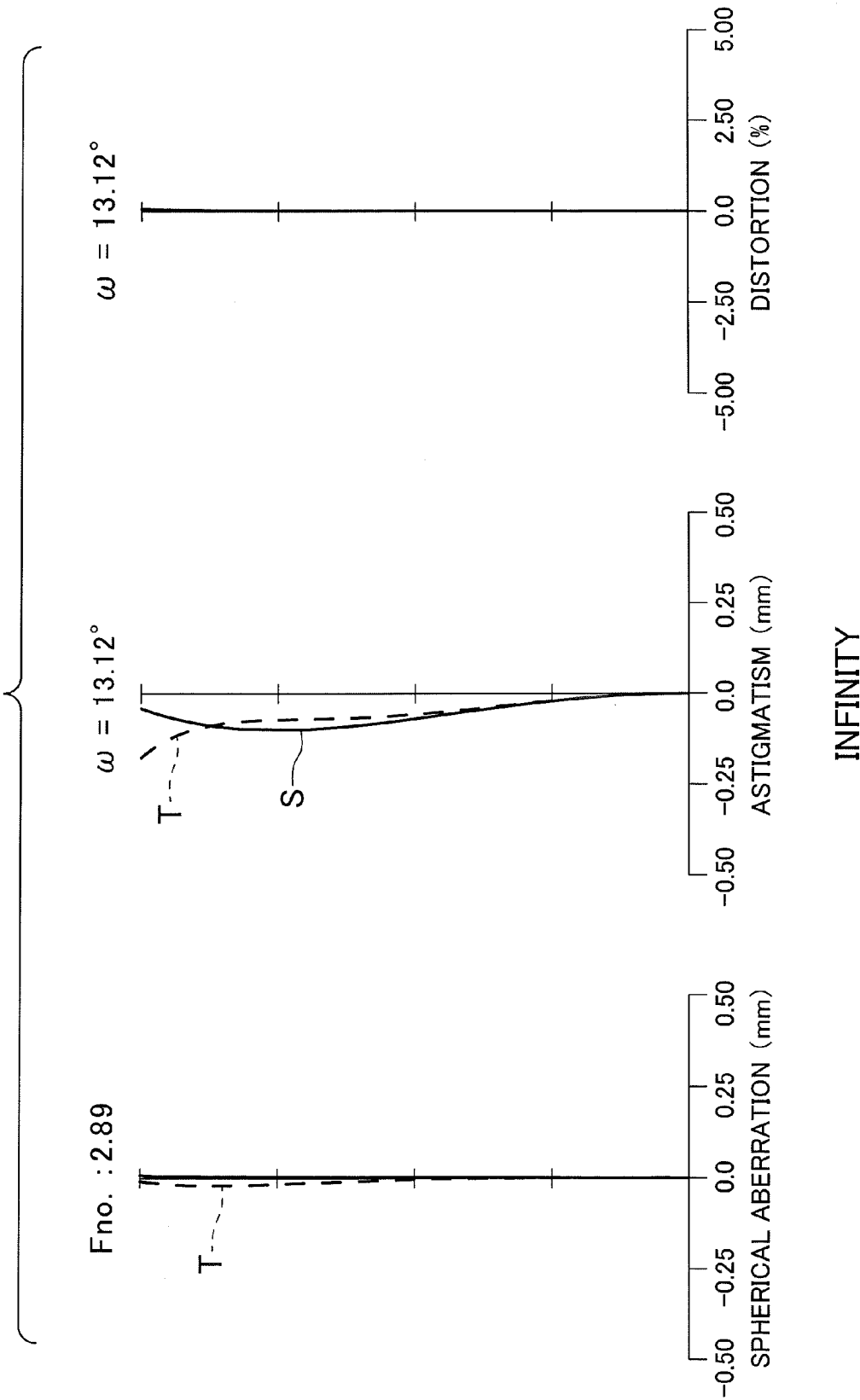
FIG. 26 depicts graphs illustrating longitudinal aberration the seventh embodiment of the imaging lens suffers from in focus at infinity.
Figure 27:
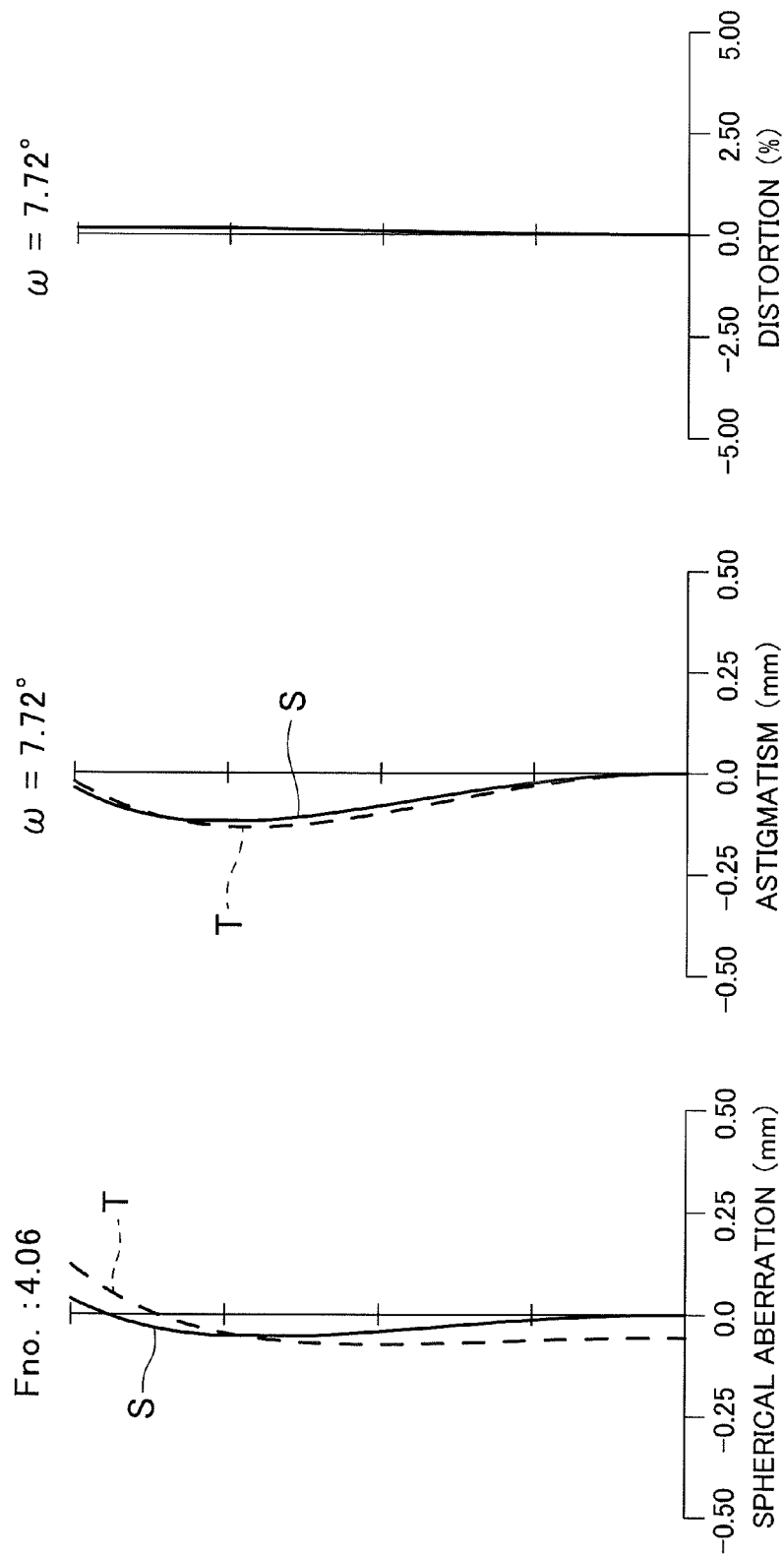
FIG. 27 depicts graphs illustrating longitudinal aberration the seventh embodiment of the imaging lens suffers from with 1:2 magnification ratio.
Figure 28:
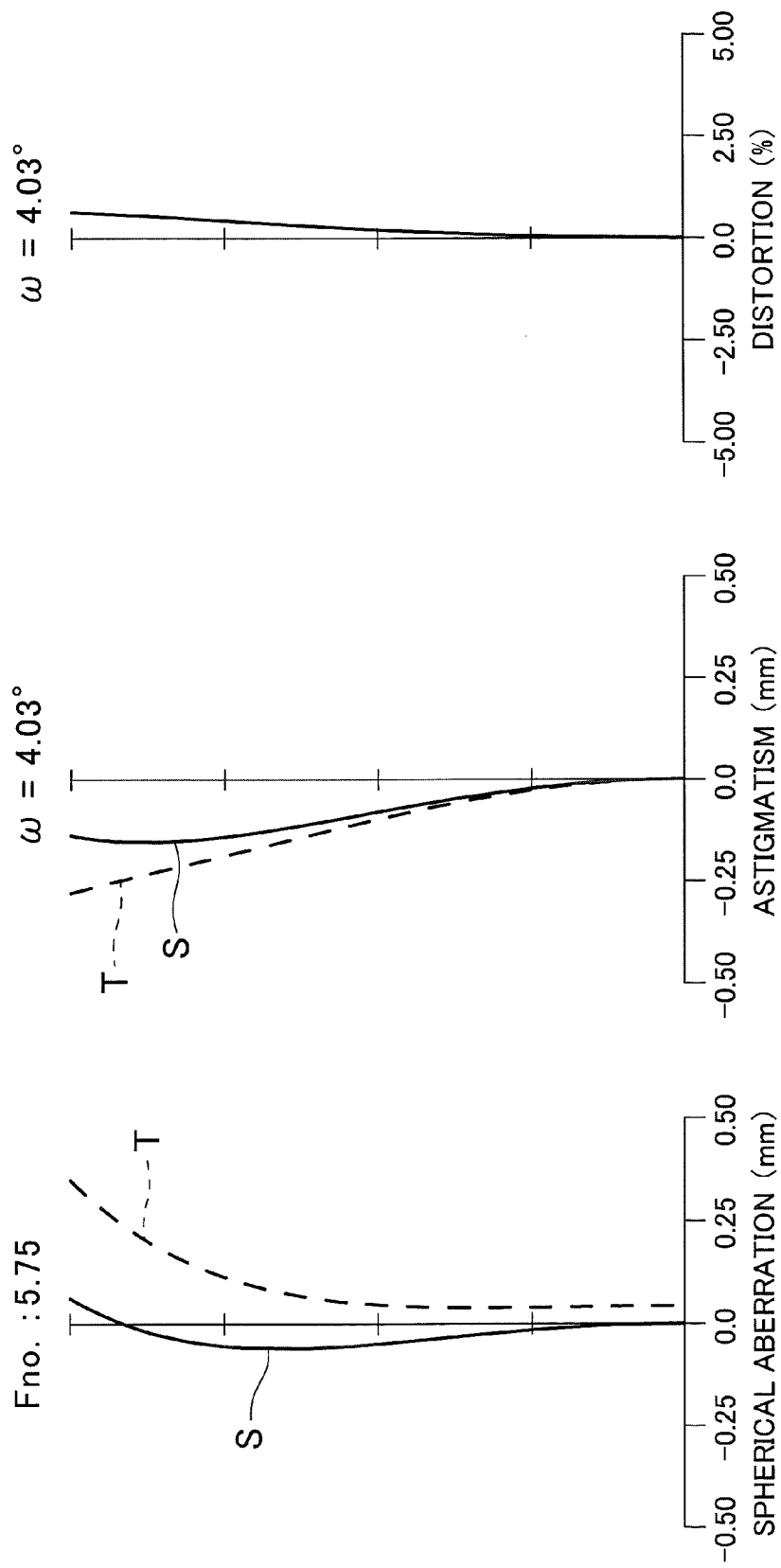
FIG. 28 depicts graphs illustrating longitudinal aberration the seventh embodiment of the imaging lens suffers from with 1:1 magnification ratio.
Figure 29:
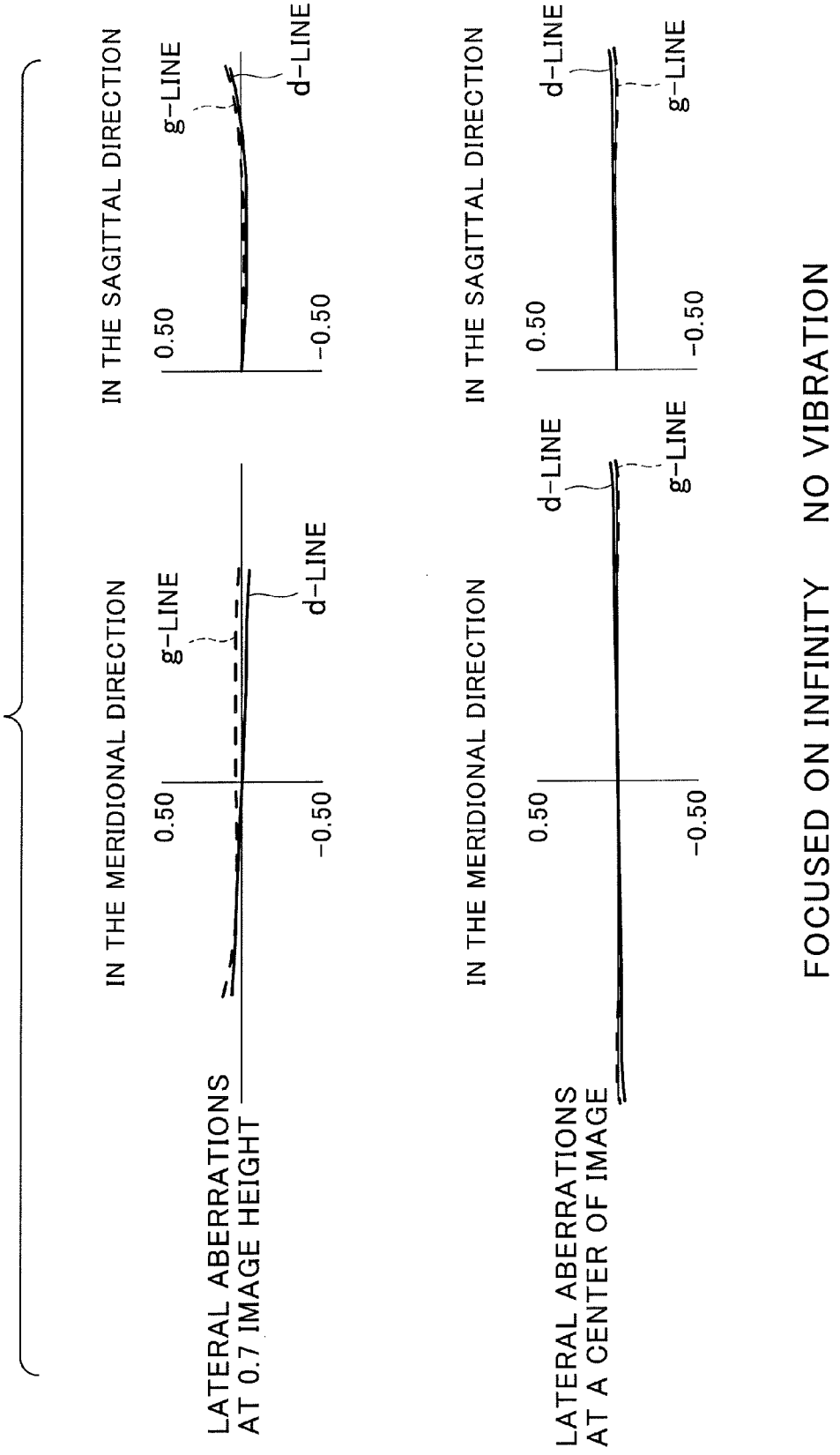
FIG. 29 depicts graphs illustrating lateral aberration the seventh embodiment of the imaging lens suffers from in focus at infinity.
Figure 31:
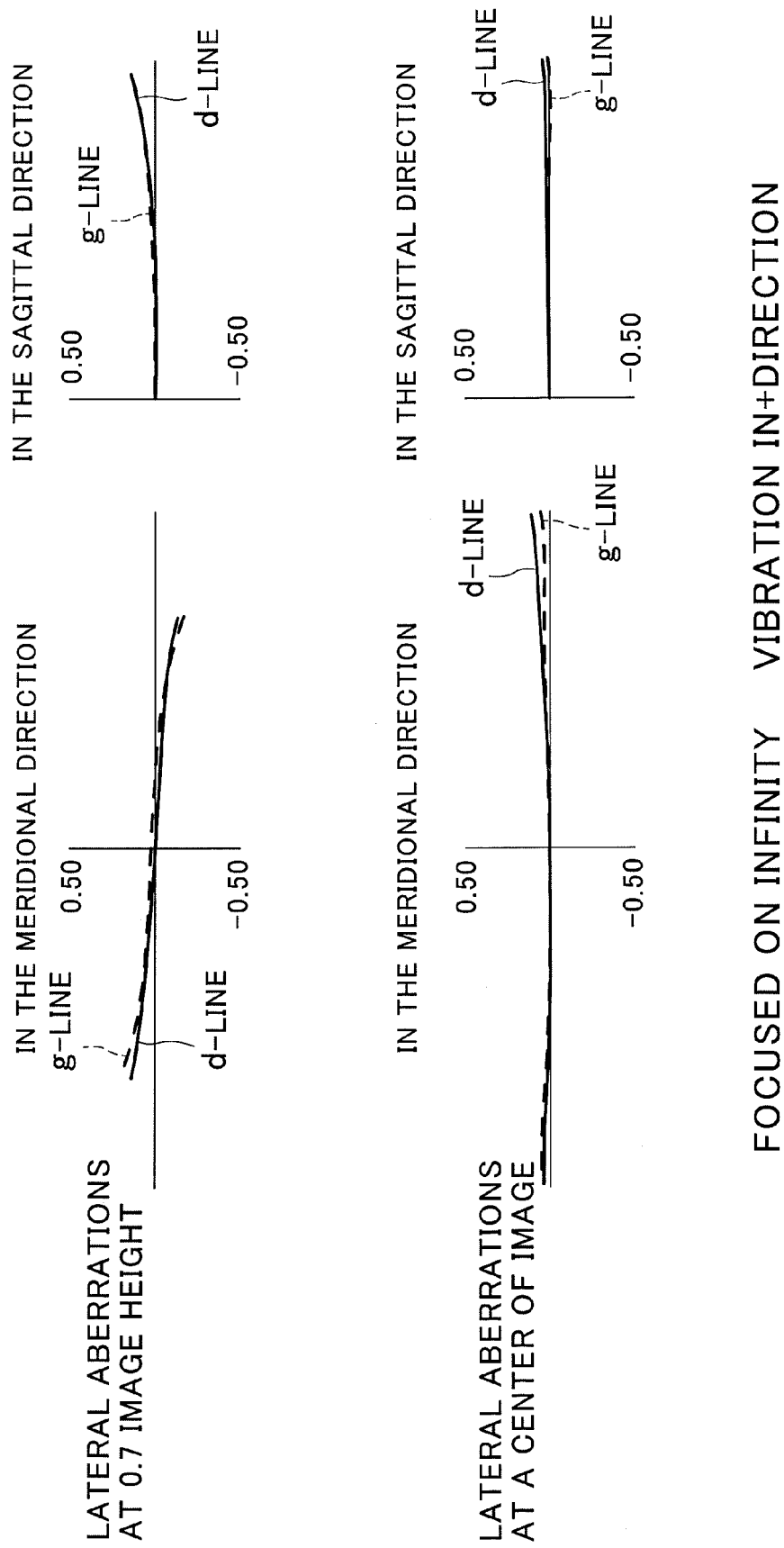
FIG. 31 depicts graphs illustrating lateral aberration the seventh embodiment of the imaging lens suffers from in focus at infinity with vibration in +direction.
Figure 32:
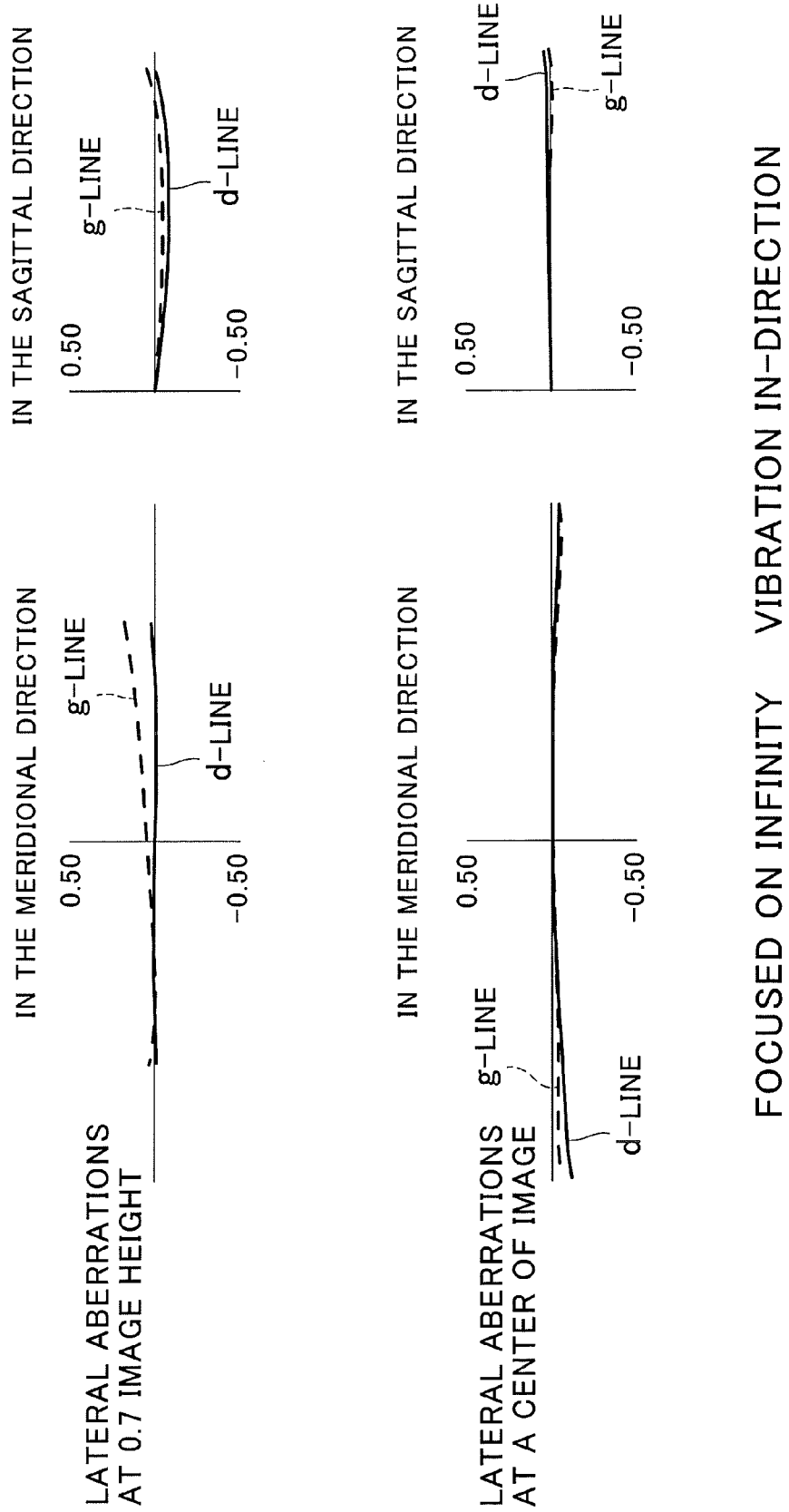
FIG. 32 depicts graphs illustrating lateral aberration the seventh embodiment of the imaging lens suffers from in focus at infinity with vibration in −direction.

An imaging lens 10 embodying the present invention, as depicted in sectional views of FIGS. 1, 6, 11, 16, 21, and 26, comprises the foremost lens group 12 the closest to an object and of positive refractivity, the succeeding intermediate lens group 14, and the rearmost lens group 16 the closest to an image plane and of negative refractivity; and for focusing, the intermediate lens group 14, with the foremost or first lens subgroup 22, the second lens subgroup 24, and the third lens subgroup 26, is used.

Any of the lens groups/subgroups depicted in the sectional views of FIGS. 1, 6, 11, 16, 21, and 26 has its trajectory illustrated by broken line when it stay still during focusing and illustrated by solid line when it is moved during focusing.

EMBODIMENT 1

| Magnification | INF | X0.5 | X1.0 |
|---|---|---|---|
| Focal Length | 92.74 | 81.62 | 64.66 |
| Fno | 2.89 | 4.06 | 5.75 |
| Angle of View ω | 13.12 | 7.72 | 4.03 |
| Full Length of Optical Sys. | 158.72 | | |

| | R | D | Nd | vd |
|---|---|---|---|---|
| 1 | 236.1724 | 4.7932 | 1.77250 | 49.60 |
| 2 | −134.3107 | 0.1500 | | |
| 3 | 63.0015 | 7.5198 | 1.43700 | 95.10 |
| 4 | −90.2962 | 1.1920 | 1.84666 | 23.78 |
| 5 | 1612.2365 | 0.1500 | | |
| 6 | 41.7672 | 4.6981 | 1.43700 | 95.10 |
| 7 | 305.1013 | D(7) | | |
| 8 | 192.1000 | 1.2000 | 1.81600 | 46.62 |
| 9 | 33.5120 | 4.9120 | | |
| 10 | −46.9417 | 1.0000 | 1.48749 | 70.24 |
| 11 | 39.8523 | 3.3499 | | |
| 12 | 60.8772 | 3.1000 | 1.84666 | 23.78 |
| 13 | −1857.9250 | D(13) | | |
| 14 STOP | 0.0000 | D(14) | | |
| 15 | 344.4750 | 3.0050 | 1.59282 | 68.62 |
| 16 | −85.8423 | D(16) | | |
| 17 | 110.2146 | 0.9000 | 1.72825 | 28.46 |
| 18 | 30.5835 | 6.4230 | 1.67790 | 55.35 |
| 19 | −90.2521 | D(19) | | |
| 20 | 541.4261 | 0.8952 | 1.58913 | 61.13 |
| 21 | 23.2442 | 2.7112 | 1.80518 | 25.42 |
| 22 | 31.7632 | 10.1125 | | |
| 23 | 42.0889 | 4.9125 | 1.72000 | 50.23 |
| 24 | −136.0043 | 6.0015 | | |
| 25 | −67.7129 | 1.2000 | 1.84666 | 23.78 |
| 26 | 131.5116 | 44.5749 | | |
| 27 | 0.0000 | D(27) | | |

Distance between Lens Groups

| F | INF | x0.5 | x1.00 |
|---|---|---|---|
| D(7) | 1.2000 | 9.8415 | 19.2488 |
| D(13) | 20.0500 | 11.4085 | 2.0012 |
| D(14) | 14.0000 | 9.2987 | 1.7000 |
| D(16) | 6.7201 | 1.0992 | 1.4506 |
| D(19) | 1.7996 | 12.1217 | 19.3690 |
| D(27) | 2.1644 | 2.2044 | 2.1892 |

EMBODIMENT 2

| Magnification | INF | X0.5 | X1.0 |
|---|---|---|---|
| Focal Length | 92.73 | 74.97 | 57.92 |
| Fno | 2.91 | 4.43 | 5.76 |
| Angle of View ω | 13.13 | 7.84 | 3.80 |
| Full Length of Optical Sys. | 156.32 | | |

| | R | D | Nd | vd |
|---|---|---|---|---|
| 1 | 41.5144 | 4.2726 | 1.72000 | 50.23 |
| 2 | −129.6424 | 0.1500 | | |
| 3 | 59.9675 | 6.4700 | 1.43700 | 95.10 |
| 4 | −92.5070 | 1.2000 | 1.84666 | 23.78 |
| 5 | 3566.5773 | 0.1500 | | |
| 6 | 41.0671 | 3.8356 | 1.43700 | 95.10 |
| 7 | 147.1464 | D(7) | | |
| 8 | 154.7009 | 1.2000 | 1.81600 | 46.62 |
| 9 | 35.6258 | 4.4490 | | |
| 10 | −55.5172 | 1.2000 | 1.48749 | 70.24 |
| 11 | 40.2303 | 6.0000 | | |
| 12 | 72.1068 | 2.9819 | 1.84666 | 23.78 |
| 13 | −2112.6158 | D(13) | | |
| 14 STOP | 0.0000 | D(14) | | |
| 15 | 523.1207 | 3.6276 | 1.59282 | 68.62 |
| 16 | −70.8459 | D(16) | | |
| 17 | 80.6914 | 0.9000 | 1.72825 | 28.46 |
| 18 | 26.9485 | 6.9234 | 1.67790 | 55.34 |
| 19 | −135.8048 | D(19) | | |
| 20 | 200.3439 | 1.0000 | 1.58913 | 61.13 |
| 21 | 21.9232 | 2.8000 | 1.80518 | 25.42 |
| 22 | 28.4436 | 7.4243 | | |
| 23 | 34.0850 | 5.8369 | 1.51742 | 52.43 |
| 24 | −131.4842 | 8.9993 | | |
| 25 | −63.6030 | 1.2000 | 1.84666 | 23.78 |
| 26 | 134.1138 | 40.5142 | | |
| 27 | 0.0000 | D(27) | | |

Distance between Lens Groups

| F | INF | x0.5 | x1.00 |
|---|---|---|---|
| D(7) | 1.3987 | 10.6803 | 21.8457 |
| D(13) | 22.6922 | 13.4106 | 2.2452 |
| D(14) | 11.5705 | 7.9380 | 1.3000 |
| D(16) | 8.1557 | 2.0183 | 2.0219 |
| D(19) | 1.0481 | 10.8182 | 17.4525 |
| D(27) | 0.3526 | 0.4017 | 0.4082 |

EMBODIMENT 3

| Magnification | INF | X0.5 | X1.0 |
|---|---|---|---|
| Focal Length | 90.03 | 80.99 | 65.94 |
| Fno | 2.89 | 4.43 | 5.77 |
| Angle of View ω | 13.54 | 7.93 | 3.99 |
| Full Length of Optical Sys. | 158.77 | | |

| | R | D | Nd | vd |
|---|---|---|---|---|
| 1 | 254.1830 | 4.8000 | 1.77250 | 49.60 |
| 2 | −134.2602 | 0.1500 | | |
| 3 | 71.1795 | 7.5000 | 1.43700 | 95.10 |
| 4 | −79.7054 | 1.2000 | 1.84666 | 23.78 |
| 5 | −421.6392 | 0.1500 | | |
| 6 | 41.1357 | 4.7000 | 1.43700 | 95.10 |
| 7 | 576.7666 | D(7) | | |
| 8 | 739.6983 | 1.2000 | 1.81600 | 46.62 |
| 9 | 34.3150 | 4.9000 | | |
| 10 | −46.2414 | 1.0000 | 1.48749 | 70.24 |
| 11 | 40.2082 | 3.3500 | | |
| 12 | 61.0215 | 3.1000 | 1.84666 | 23.78 |
| 13 | −46509.4627 | D(13) | | |
| 14 STOP | 0.0000 | D(14) | | |
| 15 | 1251.2896 | 3.0000 | 1.59282 | 68.62 |
| 16 | −67.5178 | D(16) | | |
| 17 | 125.6845 | 0.9000 | 1.72825 | 28.46 |
| 18 | 28.6128 | 6.4000 | 1.67790 | 55.35 |
| 19 | −88.5026 | D(19) | | |
| 20 | −1118.2138 | 0.9000 | 1.58913 | 61.13 |
| 21 | 24.2117 | 2.7000 | 1.80518 | 25.42 |
| 22 | 33.4446 | 10.1000 | | |
| 23 | 44.9283 | 4.9000 | 1.74855 | 49.30 |
| 24 | −85.0423 | 6.8683 | | |
| 25 | −56.3145 | 1.2000 | 1.82888 | 24.26 |
| 26 | 180.1778 | 43.9135 | | |
| 27 | 0.0000 | D(27) | | |

Distance between Lens Groups

| F | INF | x0.5 | x1.00 |
|---|---|---|---|
| D(7) | 1.2697 | 9.5022 | 18.6884 |
| D(13) | 19.4222 | 11.1897 | 2.0035 |
| D(14) | 5.3937 | 5.3996 | 1.7000 |
| D(16) | 17.6444 | 5.3361 | 1.4213 |
| D(19) | 1.7913 | 14.0938 | 21.7081 |
| D(27) | 0.3666 | 0.3014 | 0.3444 |

EMBODIMENT 4

| | Magnification | | |
|---|---|---|---|
| | INF | X0.5 | X1.0 |
| Focal Length | 92.72 | 79.12 | 60.92 |
| Fno | 2.91 | 4.43 | 5.77 |
| Angle of View ω | 13.21 | 7.61 | 3.92 |
| Full Length of Optical Sys. | 159.32 | | |

| | R | D | Nd | vd |
|---|---|---|---|---|
| 1 | 223.2552 | 4.7637 | 1.72000 | 50.23 |
| 2 | −138.8568 | 0.1500 | | |
| 3 | 62.9082 | 6.7049 | 1.43700 | 95.10 |
| 4 | −130.6279 | 0.6371 | | |
| 5 | −107.5913 | 1.2000 | 1.84666 | 23.78 |
| 6 | 764.3555 | 0.1500 | | |
| 7 | 43.2163 | 4.1911 | 1.43700 | 95.10 |
| 8 | 190.2632 | D(8) | | |
| 9 | 246.6027 | 1.2000 | 1.78590 | 44.20 |
| 10 | 35.1355 | 4.7291 | | |
| 11 | −62.5547 | 1.2000 | 1.51680 | 64.20 |
| 12 | 43.8120 | 2.8770 | | |
| 13 | 60.1937 | 3.1977 | 1.84666 | 23.78 |
| 14 | −925.8319 | D(14) | | |
| 15 STOP | 0.0000 | D(15) | | |
| 16 | 14084.1113 | 3.3585 | 1.59282 | 68.62 |
| 17 | −66.7714 | 0.1500 | | |
| 18 | 81.9450 | 2.3761 | 1.80420 | 46.50 |
| 19 | 223.7411 | D(19) | | |
| 20 | 330.5910 | 0.9000 | 1.72825 | 28.46 |
| 21 | 31.7423 | 5.7994 | 1.67790 | 55.34 |
| 22 | −124.2344 | D(22) | | |
| 23 | 238.2568 | 1.0000 | 1.58913 | 61.13 |
| 24 | 23.4790 | 2.8000 | 1.80518 | 25.42 |
| 25 | 29.6486 | 6.0840 | | |
| 26 | 34.6732 | 5.4388 | 1.56883 | 56.04 |
| 27 | 3287.1127 | 8.7668 | | |
| 28 | −76.5882 | 1.2000 | 1.75520 | 27.51 |
| 29 | 163.2662 | 43.4173 | | |
| 30 | 0.0000 | D(30) | | |

| Distance between Lens Groups | | | |
|---|---|---|---|
| F | INF | x0.5 | x1.00 |
| D(8) | 1.5182 | 11.7639 | 23.2368 |
| D(14) | 23.5444 | 13.2987 | 1.8258 |
| D(15) | 18.7114 | 9.6578 | 1.3000 |
| D(19) | 1.9365 | 1.2273 | 3.0678 |
| D(22) | 0.9980 | 10.7608 | 17.2781 |
| D(30) | 0.3407 | 0.3239 | 0.4003 |

EMBODIMENT 5

| | Magnification | | |
|---|---|---|---|
| | INF | X0.5 | X1.0 |
| Focal Length | 91.04 | 76.80 | 59.26 |
| Fno | 2.88 | 4.43 | 5.77 |
| Angle of View ω | 13.39 | 8.03 | 4.29 |
| Full Length of Optical Sys. | 159.32 | | |

| | R | D | Nd | vd |
|---|---|---|---|---|
| 1 | 284.7106 | 4.5000 | 1.80400 | 46.57 |
| 2 | −140.7333 | 0.1500 | | |
| 3 | 61.5070 | 7.2000 | 1.43700 | 95.10 |
| 4 | −124.7925 | 0.6410 | | |
| 5 | −103.0978 | 1.1000 | 1.84666 | 23.78 |
| 6 | 575.2175 | 0.1500 | | |
| 7 | 46.6301 | 3.8000 | 1.48749 | 70.24 |
| 8 | 176.8825 | D(8) | | |
| 9 | 300.5047 | 1.2000 | 1.80400 | 46.58 |
| 10 | 32.3975 | 4.9040 | | |
| 11 | −57.5165 | 1.2000 | 1.58913 | 61.13 |
| 12 | 43.2503 | 1.3100 | | |
| 13 | 49.9091 | 4.0000 | 1.90366 | 31.31 |
| 14 | −183.4857 | D(14) | | |
| 15 STOP | 0.0000 | D(15) | | |
| 16 | 92.9466 | 4.0000 | 1.43700 | 95.10 |
| 17 | −84.2679 | 0.1500 | | |
| 18 | 77.8682 | 2.7000 | 1.80400 | 46.58 |
| 19 | −444.7632 | 0.9000 | 1.69895 | 30.13 |
| 20 | 47.5039 | D(20) | | |
| 21 | 79.7606 | 0.9000 | 1.80100 | 34.97 |
| 22 | 25.3773 | 5.7000 | 1.80400 | 46.58 |
| 23 | −146.6604 | D(23) | | |
| 24 | 277.1574 | 1.0000 | 1.58913 | 61.13 |
| 25 | 21.9868 | 2.6000 | 1.80518 | 25.42 |
| 26 | 28.4413 | 6.9090 | | |
| 27 | 33.6622 | 5.9000 | 1.54072 | 47.23 |
| 28 | −210.4395 | 7.2196 | | |
| 29 | −66.4288 | 1.2000 | 1.80518 | 25.42 |
| 30 | 188.1615 | 41.1714 | | |
| 31 | 0.0000 | D(31) | | |

| Distance between Lens Groups | | | |
|---|---|---|---|
| F | INF | x0.5 | x1.00 |
| D(8) | 1.6383 | 11.4319 | 23.2012 |
| D(14) | 23.3895 | 13.5959 | 1.8266 |
| D(15) | 20.1122 | 8.9005 | 1.3000 |
| D(20) | 2.4388 | 3.3226 | 2.0731 |
| D(23) | 0.9162 | 11.2441 | 20.0942 |
| D(31) | 0.3512 | 0.3718 | 0.3937 |

EMBODIMENT 6

| | Magnification | | |
|---|---|---|---|
| | INF | X0.5 | X1.0 |
| Focal Length | 92.69 | 80.06 | 62.06 |
| Fno | 2.88 | 4.43 | 5.77 |
| Angle of View ω | 13.22 | 7.66 | 4.30 |
| Full Length of Optical Sys. | 157.32 | | |

| | R | D | Nd | vd |
|---|---|---|---|---|
| 1 | −10695.9714 | 2.6000 | 1.84666 | 23.78 |
| 2 | −185.0122 | 0.1500 | | |
| 3 | 2033.0545 | 2.9000 | 1.69680 | 55.46 |
| 4 | −165.8964 | 0.1500 | | |
| 5 | 79.6036 | 6.5000 | 1.49700 | 81.54 |
| 6 | −73.7110 | 1.2000 | 1.84666 | 23.78 |
| 7 | 322.7500 | 0.1500 | | |
| 8 | 45.6156 | 4.4000 | 1.49700 | 81.54 |
| 9 | 406.0634 | D(9) | | |
| 10 | −438.4360 | 1.0000 | 1.80610 | 33.27 |
| 11 | 33.5997 | 5.0340 | | |
| 12 | −69.9448 | 1.0000 | 1.51633 | 64.14 |
| 13 | 42.0528 | 4.8000 | 1.84666 | 23.77 |
| 14 | −217.3633 | D(14) | | |
| 15 STOP | 0.0000 | D(15) | | |
| 16 | 456.8340 | 3.5000 | 1.71300 | 53.87 |
| 17 | −66.3109 | 0.1500 | | |
| 18 | 49.7031 | 5.0000 | 1.77250 | 49.62 |
| 19 | −76.4268 | 1.2000 | 1.67270 | 32.17 |
| 20 | 34.5837 | D(20) | | |
| 21 | 45.8319 | 2.2000 | 1.65844 | 50.85 |
| 22 | 92.5736 | D(22) | | |
| 23 | 265.4824 | 1.2000 | 1.69680 | 55.46 |
| 24 | 23.4249 | 2.6000 | 1.84666 | 23.77 |
| 25 | 31.8990 | 4.6717 | | |
| 26 | 35.6743 | 6.3000 | 1.71300 | 53.94 |
| 27 | −144.7707 | 2.8862 | | |

-continued

| | | | | |
|---|---|---|---|---|
| 28 | −70.1884 | 1.2000 | 1.84666 | 23.77 |
| 29 | 156.5485 | 45.3010 | | |
| 30 | 0.0000 | D(30) | | |

Distance between Lens Groups

| F | INF | x0.5 | x1.00 |
|---|---|---|---|
| D(9) | 2.0637 | 12.7391 | 23.8826 |
| D(14) | 23.6189 | 12.9435 | 1.8000 |
| D(15) | 20.2777 | 9.4223 | 1.5000 |
| D(20) | 3.4339 | 3.7352 | 2.0652 |
| D(22) | 1.5129 | 12.0671 | 21.6593 |
| D(30) | 0.3053 | 0.2968 | 0.3563 |

Parameters in the formulae of Embodiments 1 to 6 are given in TABLE 1.

TABLE 1

| | Num. of Embodiment | | | | | |
|---|---|---|---|---|---|---|
| | 1 | 2 | 3 | 4 | 5 | 6 |
| f | 92.735 | 92.734 | 90.032 | 92.724 | 91.042 | 92.687 |
| f1 | 51.173 | 53.814 | 47.772 | 57.711 | 58.705 | 57.748 |
| f2 | −37.255 | −41.651 | −33.201 | −43.912 | −47.560 | −49.035 |
| f3 | 116.218 | 105.491 | 108.153 | 65.707 | 158.259 | 86.862 |
| f4 | 81.567 | 83.429 | 86.517 | 165.093 | 64.772 | 135.331 |
| f5 | −108.031 | −69.595 | −155.150 | −78.887 | −78.019 | −116.734 |
| FR | −52.649 | −50.815 | −51.644 | −68.884 | −60.847 | −57.099 |
| D | 6.002 | 8.999 | 6.868 | 8.767 | 7.220 | 2.886 |
| Rn1 | −92.2729 | −92.5070 | −79.7054 | −107.5913 | −103.0978 | −73.7110 |
| Rn2 | 1612.2365 | 3566.5773 | −421.6392 | 764.3555 | 575.2175 | 322.7500 |
| nd1 | 1.5488 | 1.5313 | 1.5488 | 1.5313 | 1.5762 | 1.6344 |
| vd1 | 79.93 | 80.14 | 79.93 | 80.14 | 70.64 | 60.58 |
| nd3 | 1.5928 | 1.5928 | 1.5928 | 1.5928 | 1.4370 | 1.7130 |
| vd3 | 68.62 | 68.62 | 68.62 | 68.62 | 95.10 | 53.87 |
| (Rn1 − Rn2)/(Rn1 + Rn2) | −1.121 | −1.053 | −0.682 | −1.328 | −1.437 | −1.592 |
| f2/f | −0.402 | −0.449 | −0.369 | −0.474 | −0.522 | −0.529 |
| f4/f3 | 0.702 | 0.791 | 0.800 | 2.513 | 0.409 | 1.558 |
| D/FR | −0.114 | −0.177 | −0.133 | −0.127 | −0.119 | −0.051 |

EMBODIMENTS OF THE SECOND PRESENT INVENTION

Figure 25:
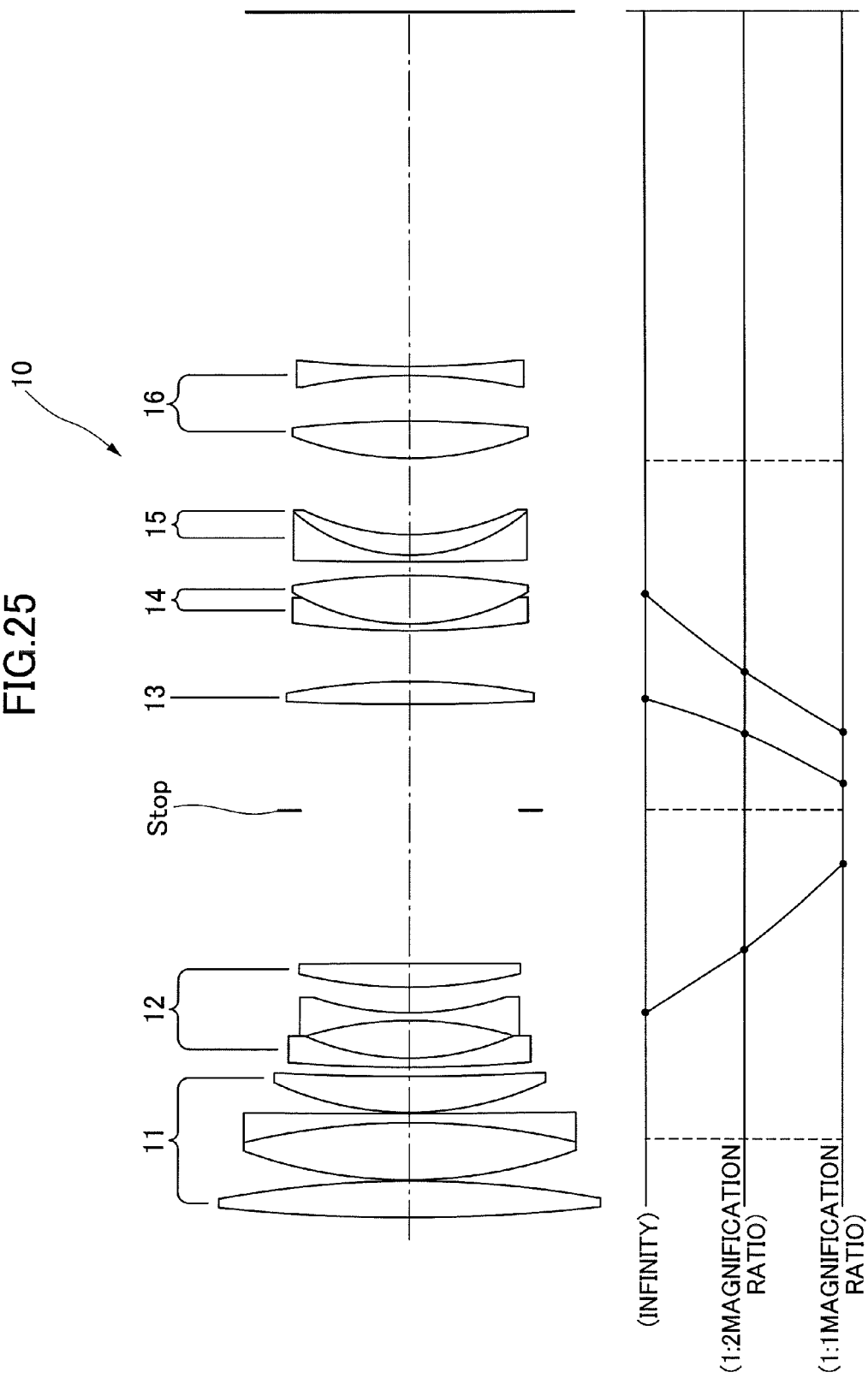
FIG. 25 is a sectional view illustrating a seventh embodiment of an imaging lens according to the present invention in focus at infinity where the trajectory of each of lens groups from the closest range to the macro in photo shooting is depicted by solid line.
Figure 33:
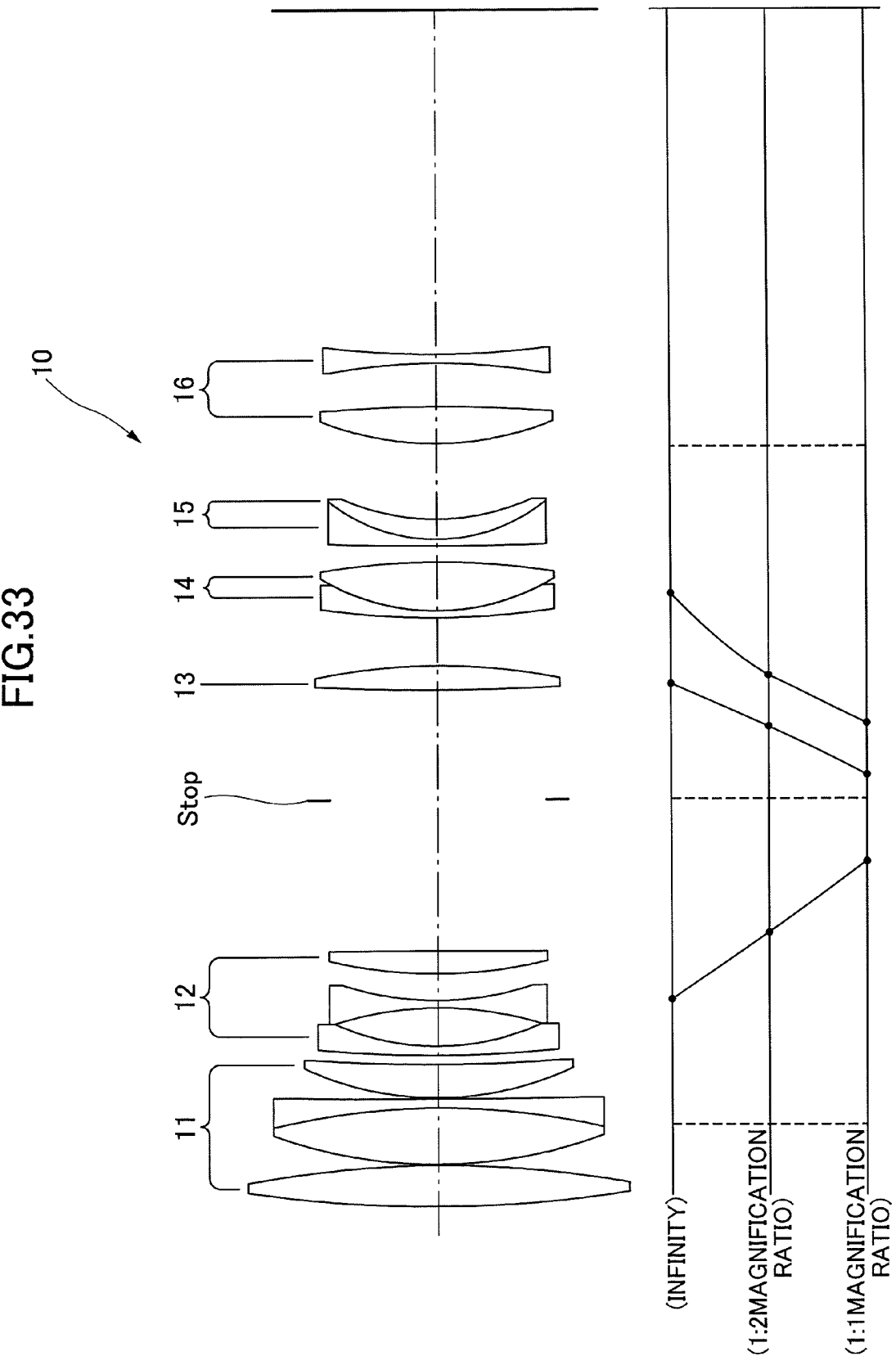
FIG. 33 is a sectional view illustrating a eighth embodiment of an imaging lens according to the present invention in focus at infinity where the trajectory of each of lens groups from the closest range to the macro in photo shooting is depicted by solid line.
Figure 34:
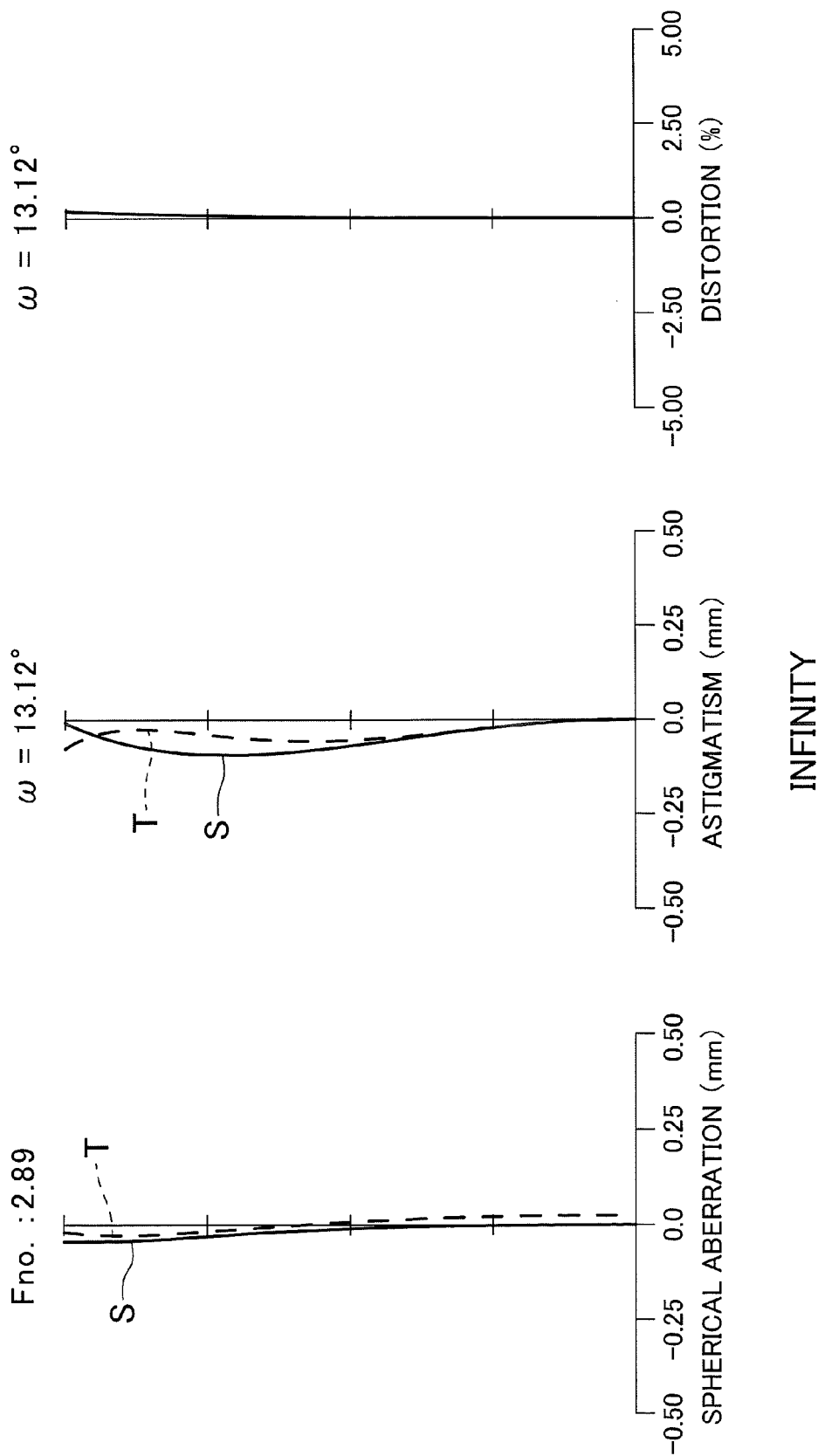
FIG. 34 depicts graphs illustrating longitudinal aberration the eighth embodiment of the imaging lens suffers from in focus at infinity.
Figure 35:
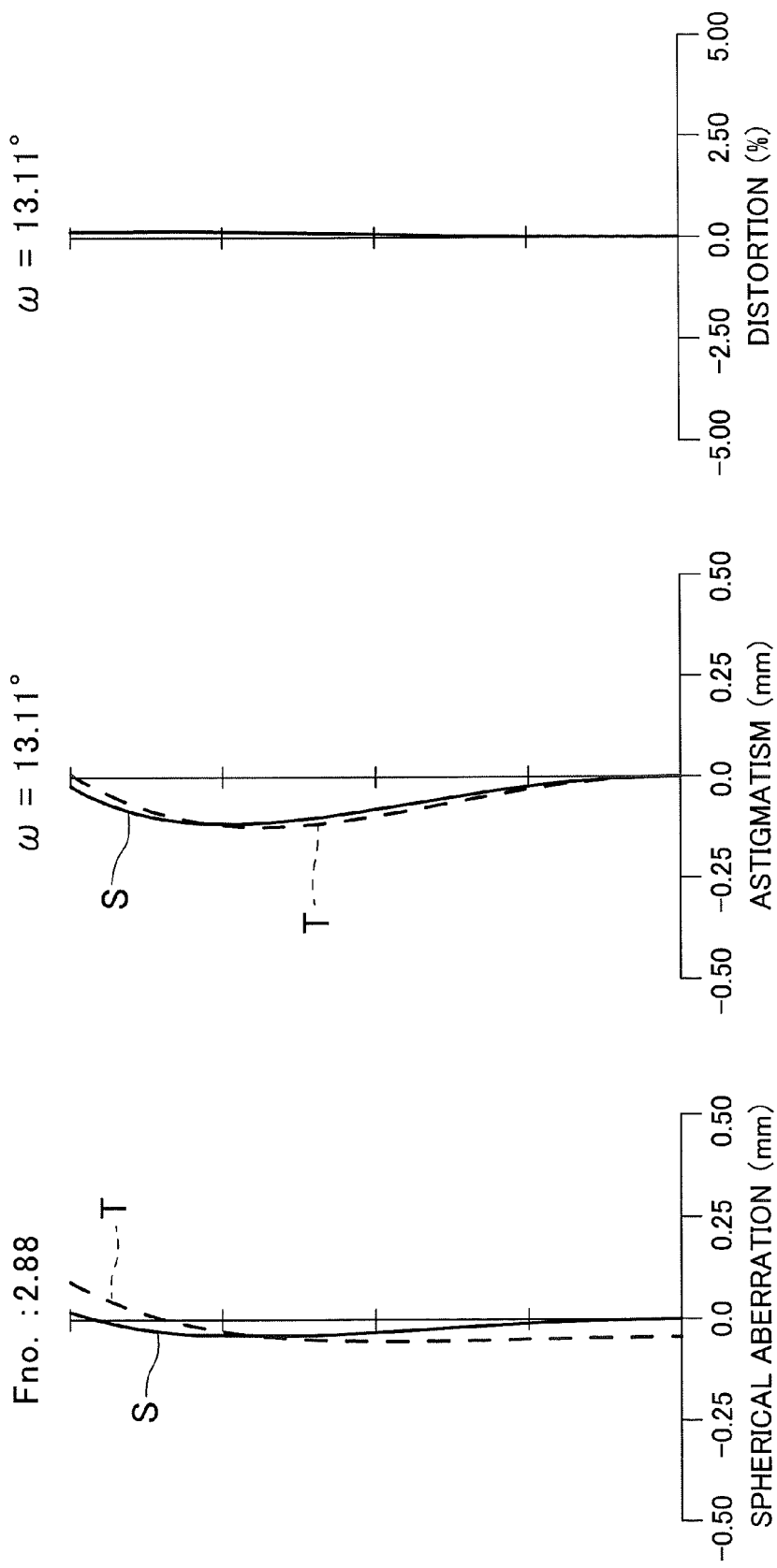
FIG. 35 depicts graphs illustrating longitudinal aberration the eighth embodiment of the imaging lens suffers from with 1:2 magnification ratio.
Figure 36:
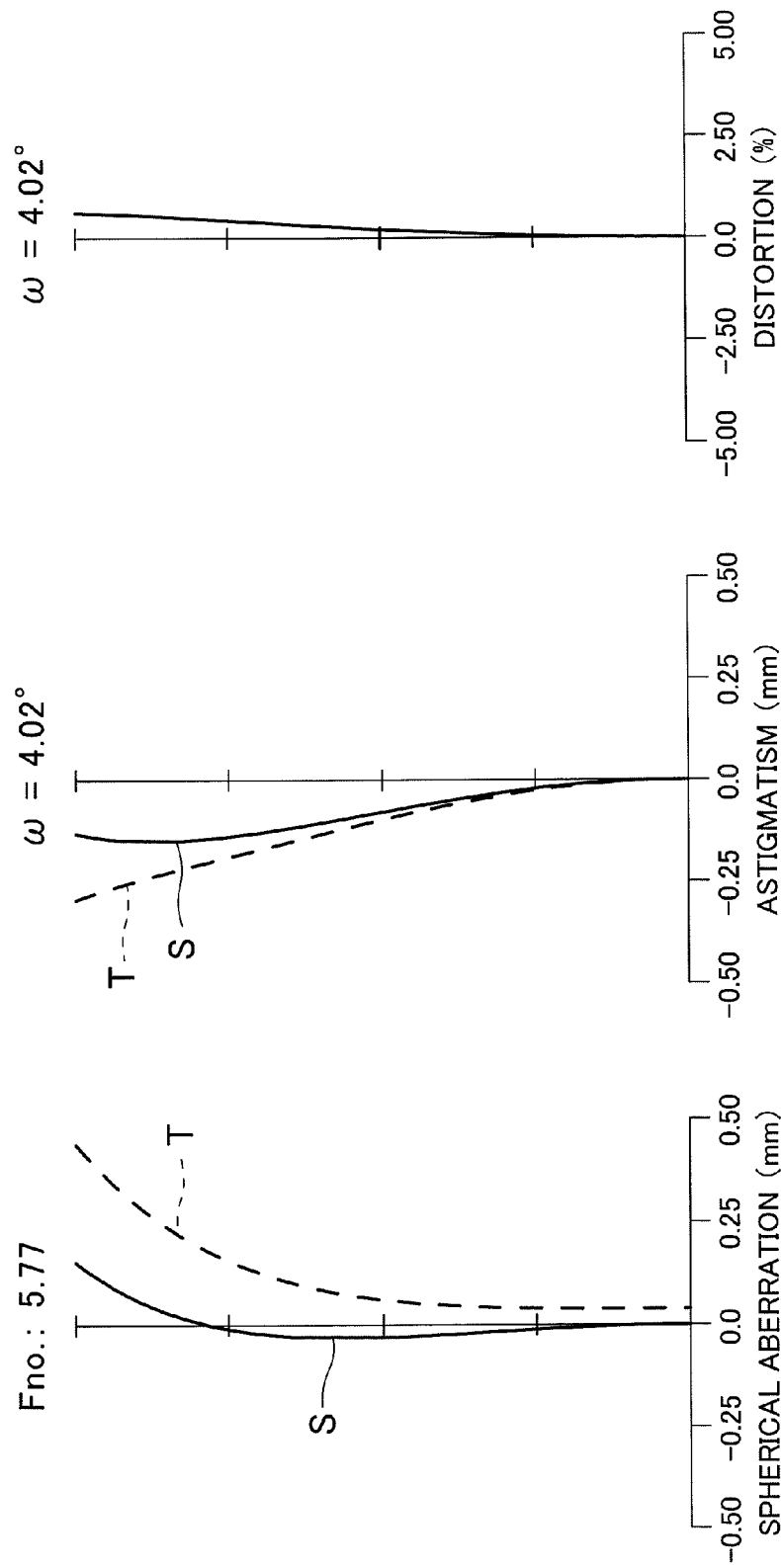
FIG. 36 depicts graphs illustrating longitudinal aberration the eighth embodiment of the imaging lens suffers from with 1:1 magnification ratio.
Figure 37:
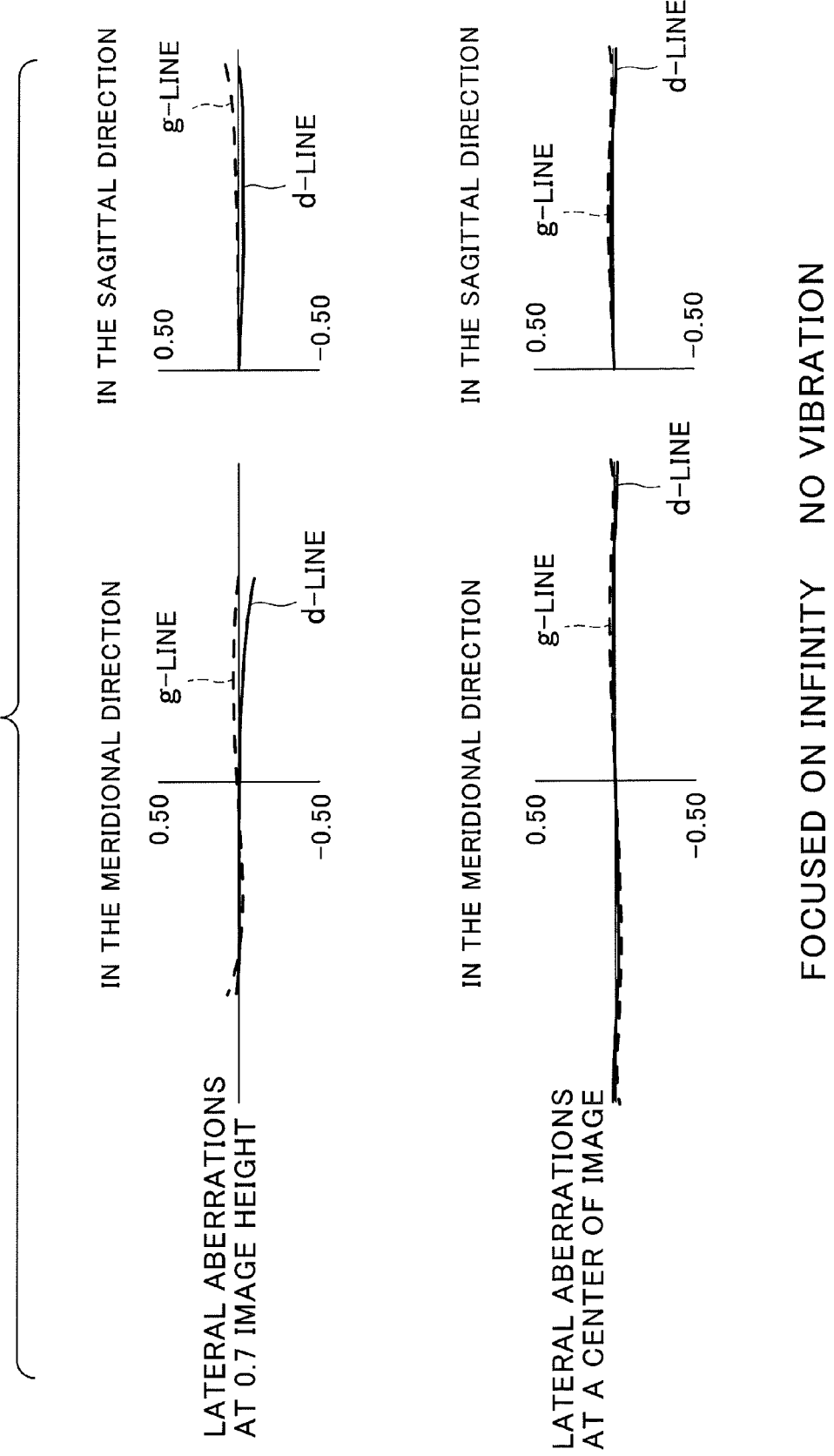
FIG. 37 depicts graphs illustrating lateral aberration the eighth embodiment of the imaging lens suffers from in focus at infinity.
Figure 38:
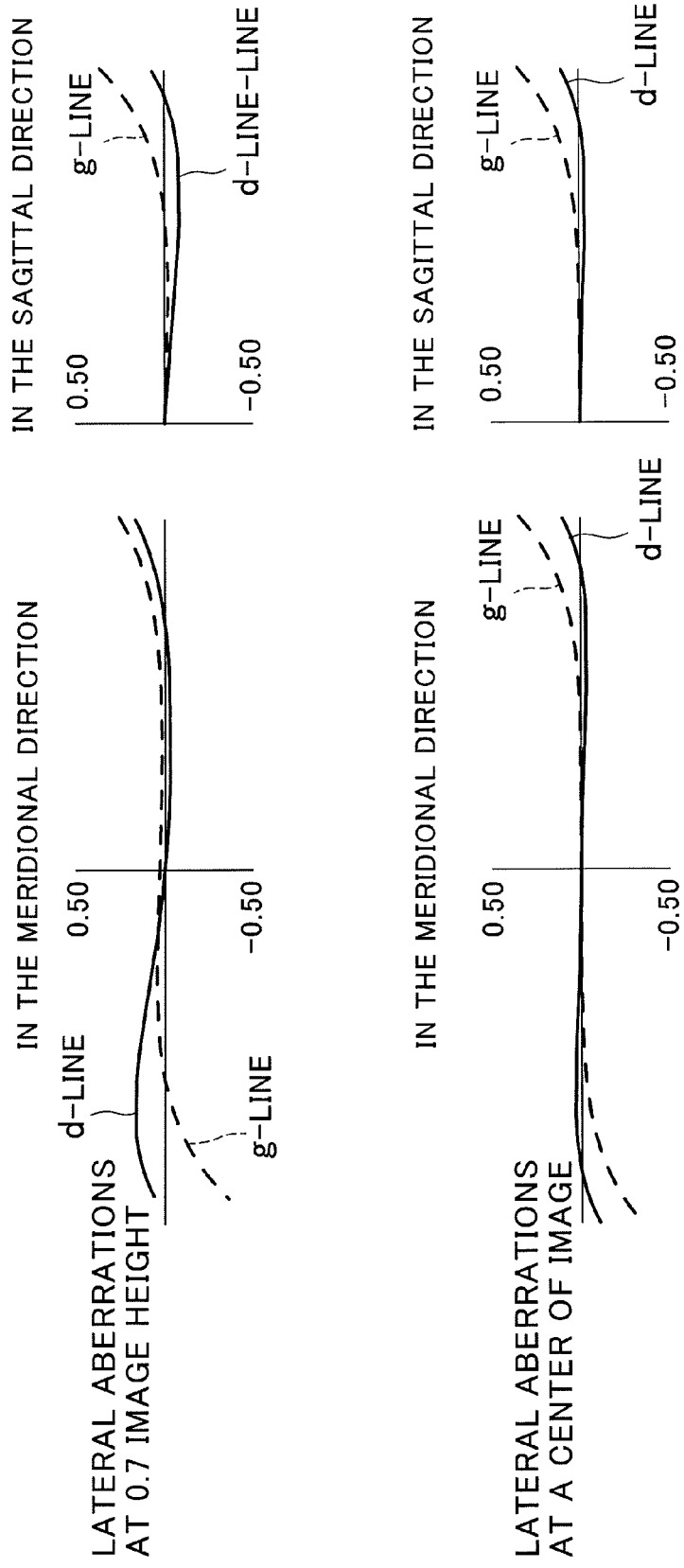
FIG. 38 depicts graphs illustrating lateral aberration the eighth embodiment of the imaging lens suffers from at the closest range in photo shooting.
Figure 39:
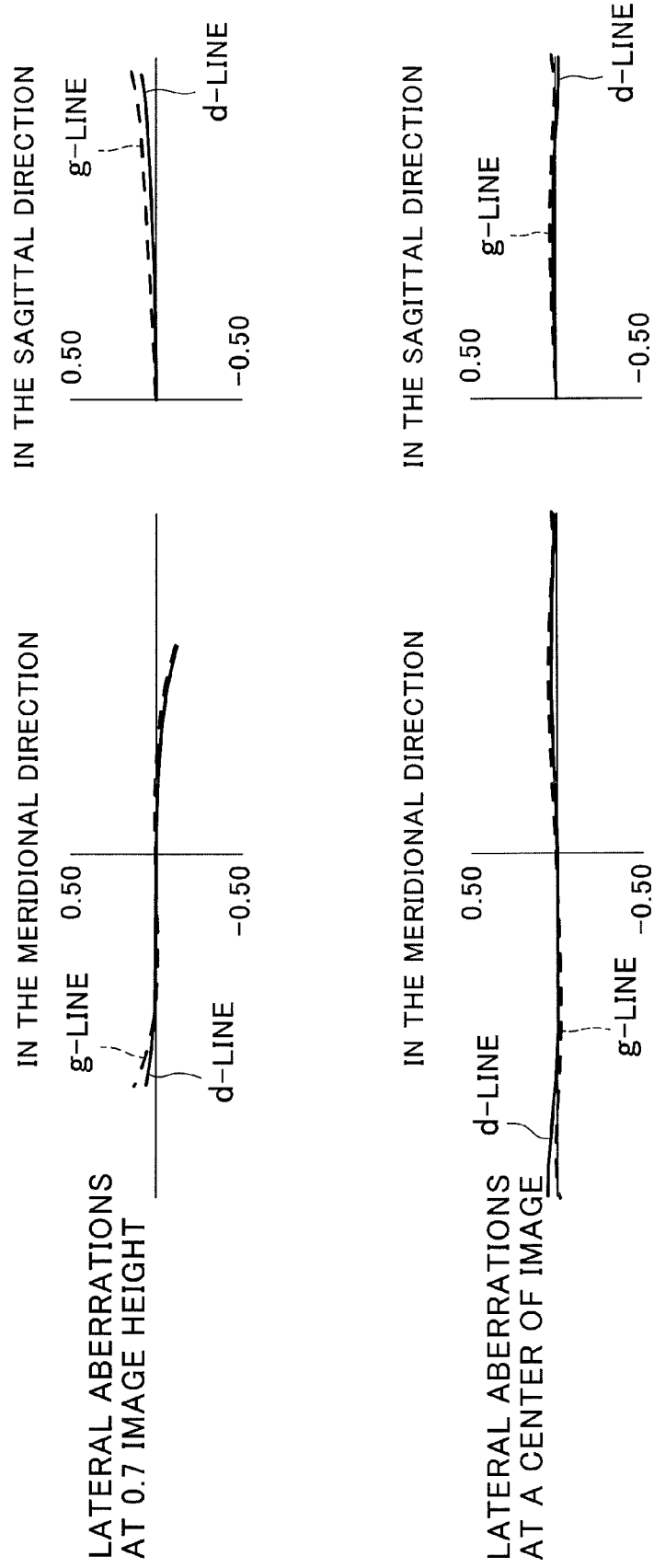
FIG. 39 depicts graphs illustrating lateral aberration the eighth embodiment of the imaging lens suffers from in focus at infinity with vibration in +direction.
Figure 40:
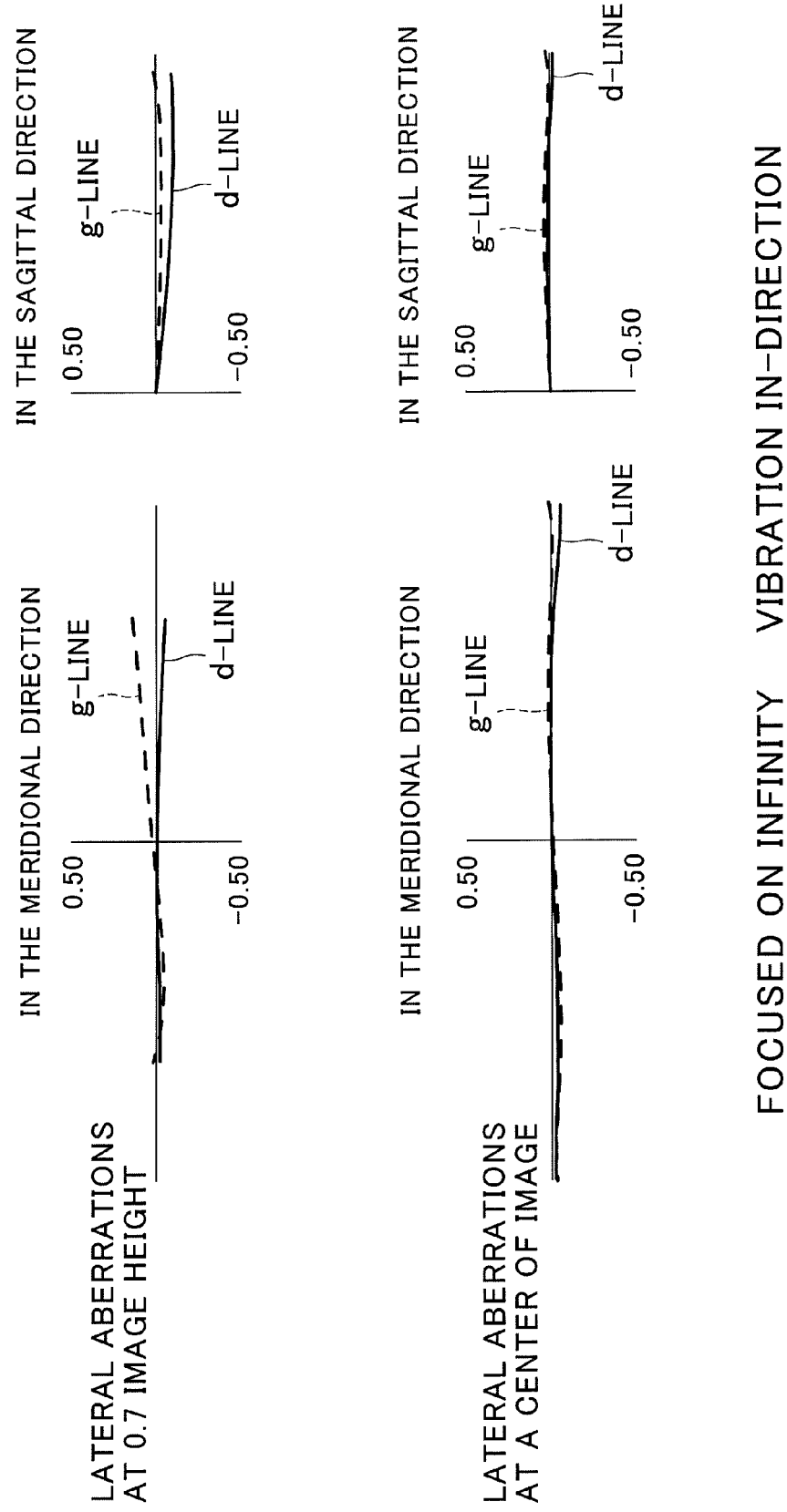
FIG. 40 depicts graphs illustrating lateral aberration the eighth embodiment of the imaging lens suffers from in focus at infinity with vibration in −direction.
Figure 41:
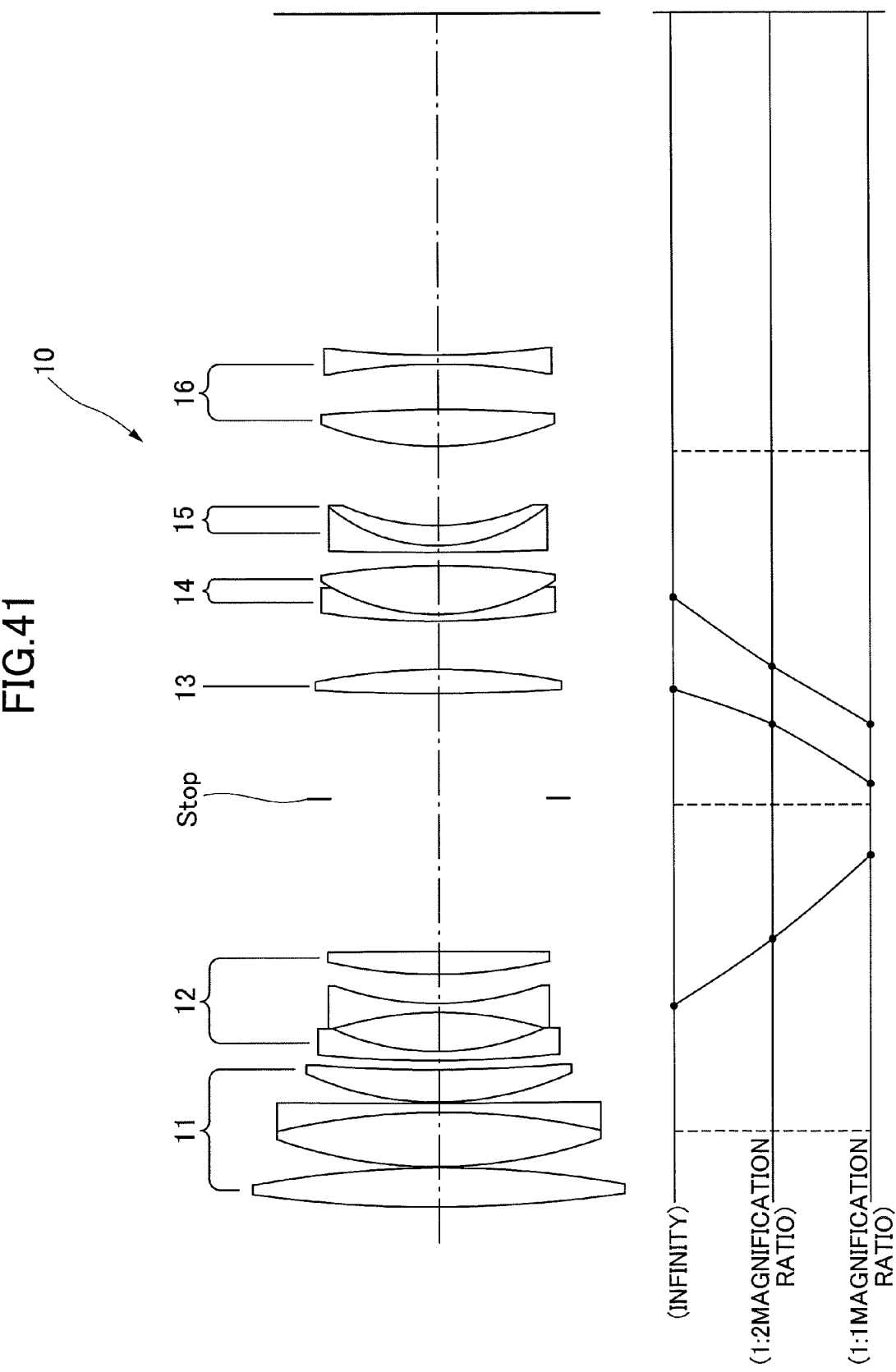
FIG. 41 is a sectional view illustrating a ninth embodiment of an imaging lens according to the present invention in focus at infinity where the trajectory of each of lens groups from the closest range to the macro in photo shooting is depicted by solid line.
Figure 42:
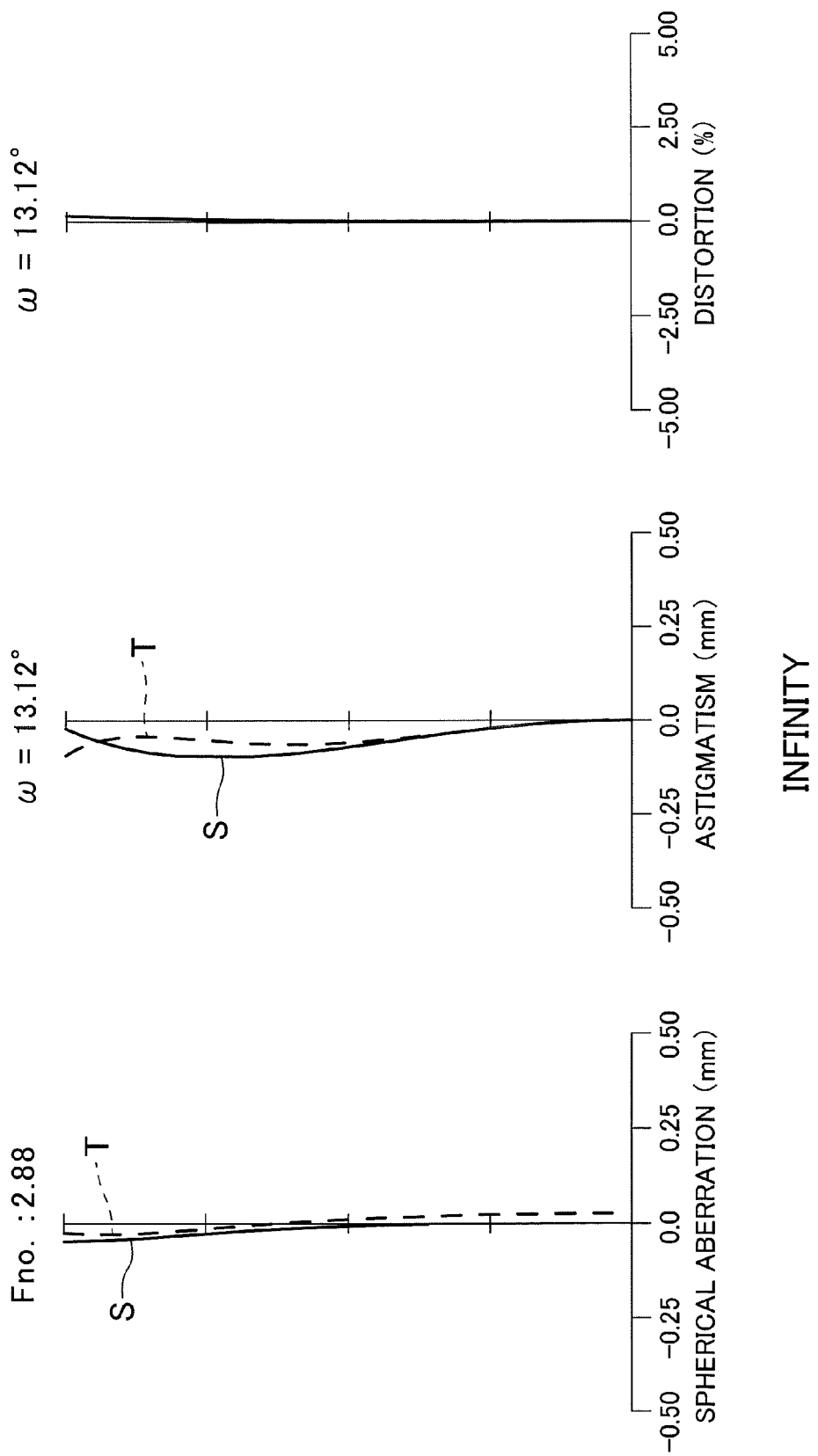
FIG. 42 depicts graphs illustrating longitudinal aberration the ninth embodiment of the imaging lens suffers from in focus at infinity.
Figure 43:
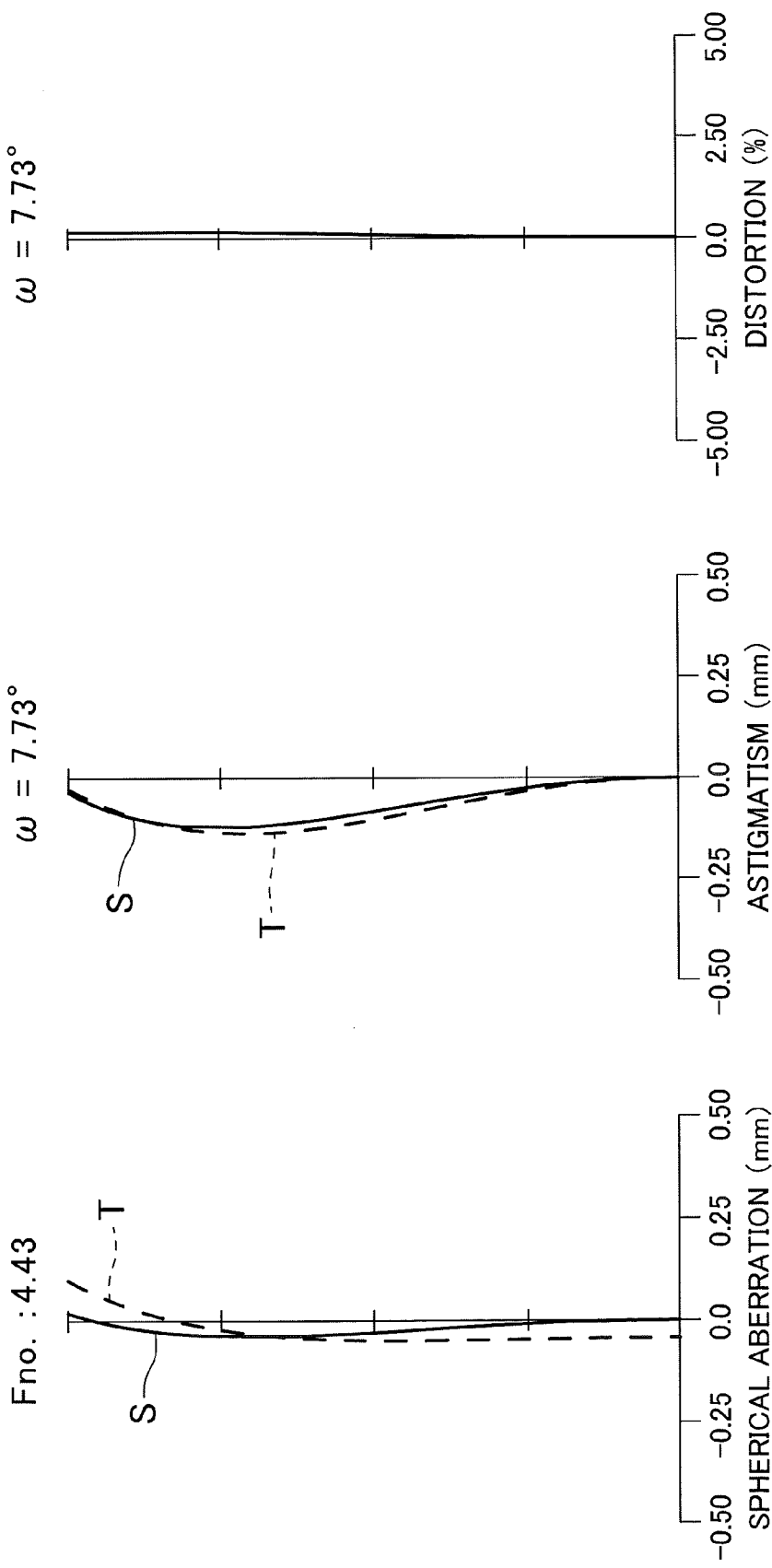
FIG. 43 depicts graphs illustrating longitudinal aberration the ninth embodiment of the imaging lens suffers from with 1:2 magnification ratio.
Figure 44:
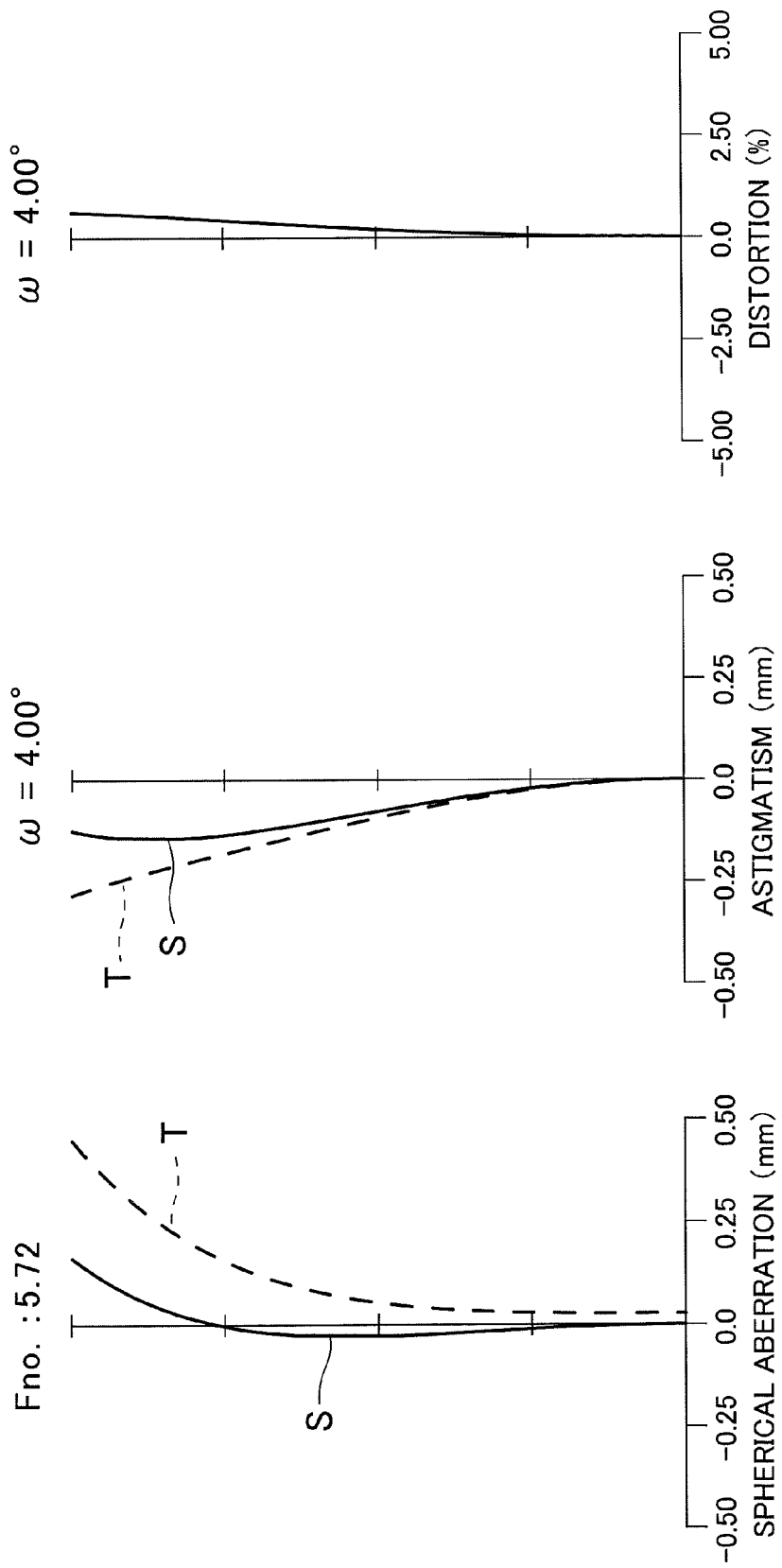
FIG. 44 depicts graphs illustrating longitudinal aberration the ninth embodiment of the imaging lens suffers from with 1:1 magnification ratio.
Figure 45:
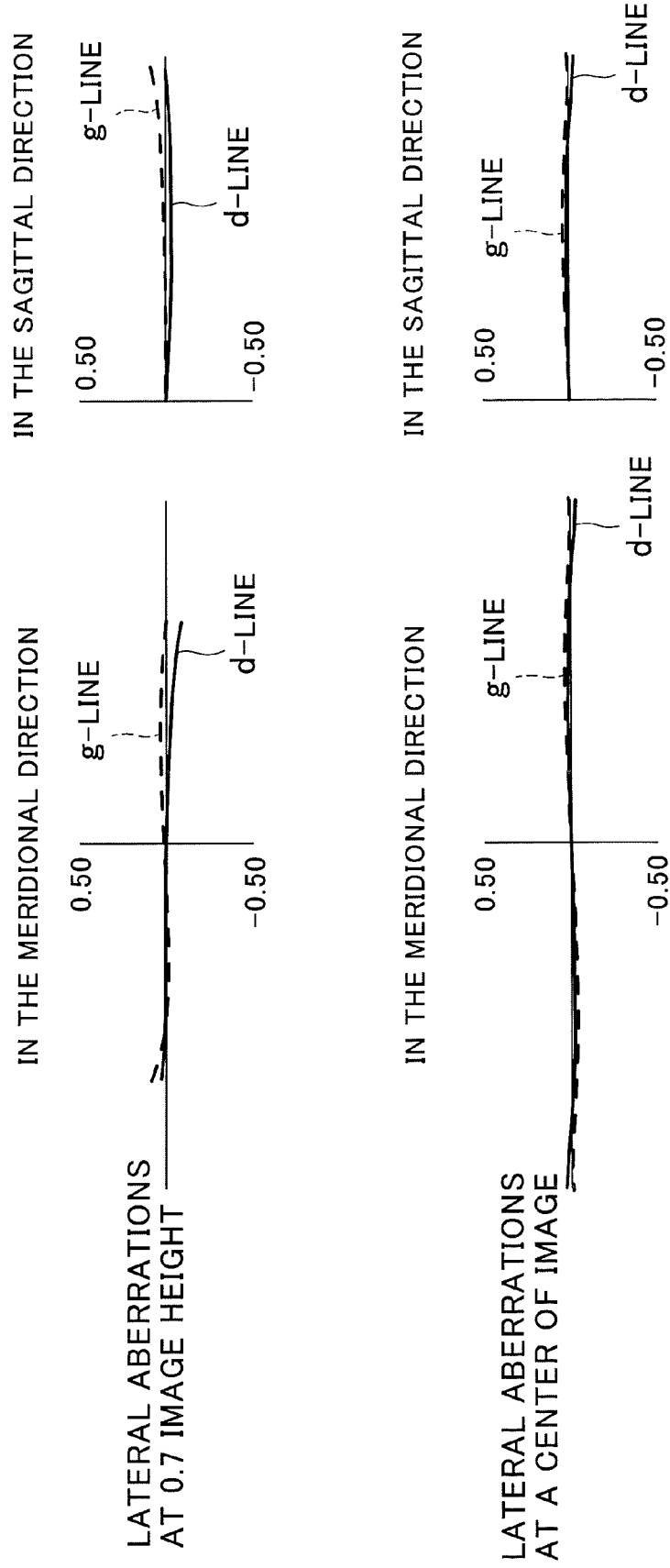
FIG. 45 depicts graphs illustrating lateral aberration the ninth embodiment of the imaging lens suffers from in focus at infinity.
Figure 46:
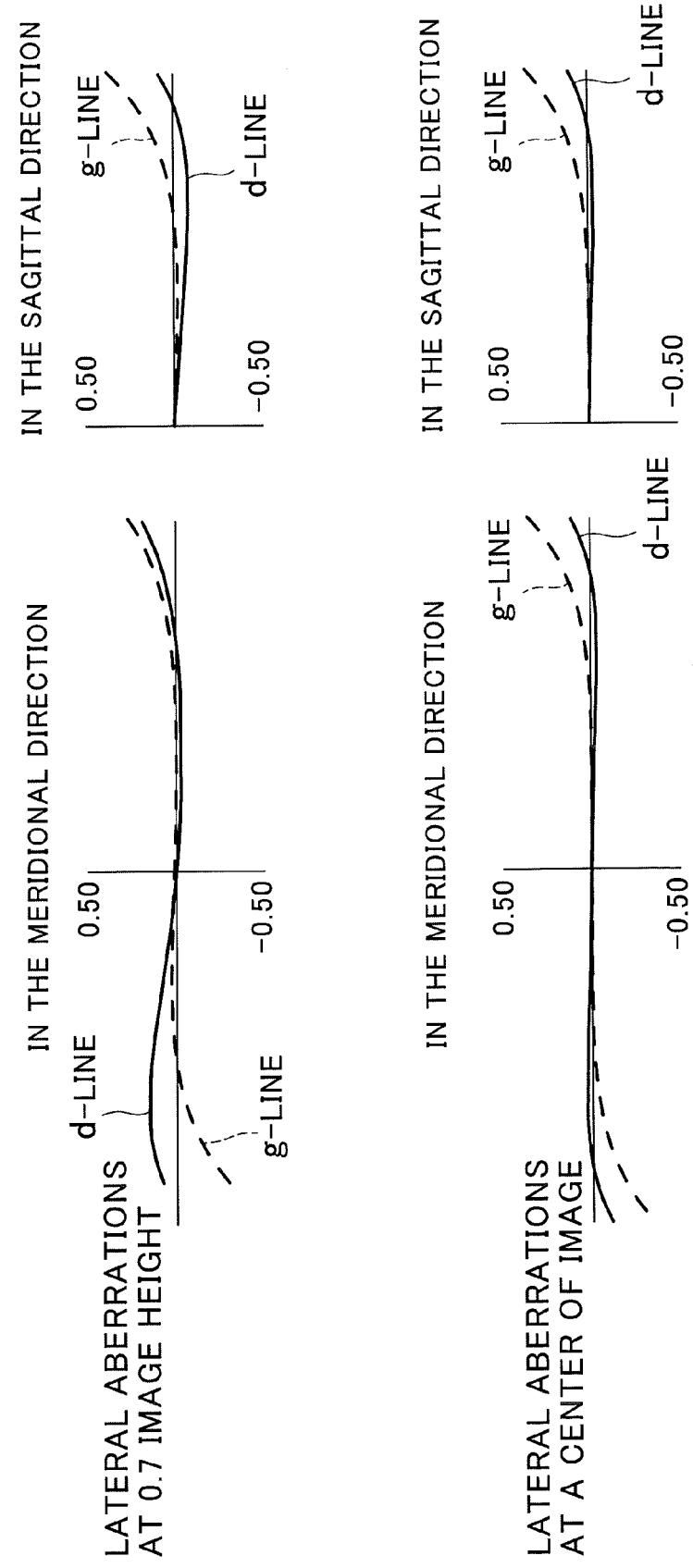
FIG. 46 depicts graphs illustrating lateral aberration the ninth embodiment of the imaging lens suffers from at the closest range in photo shooting.
Figure 47:
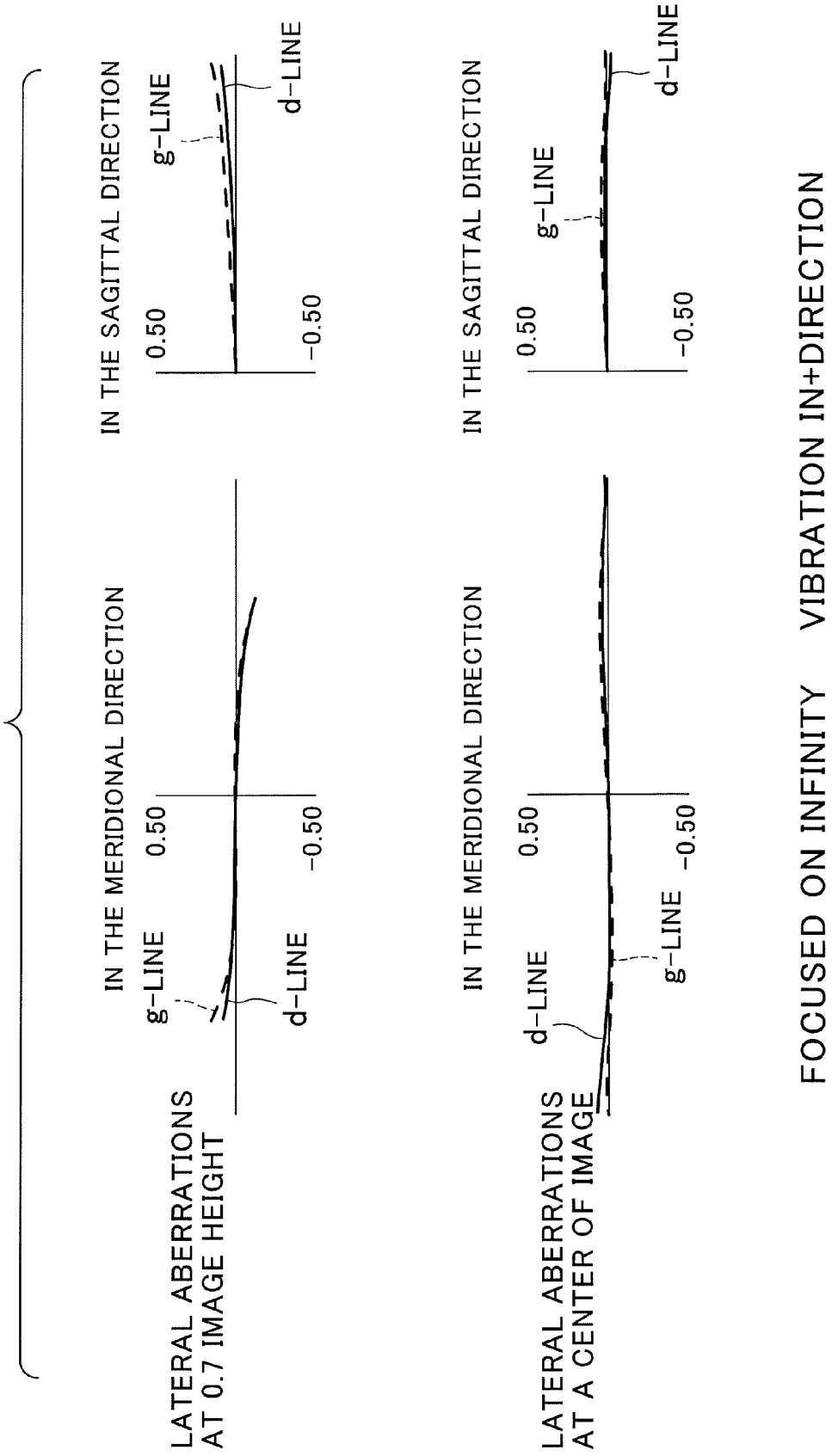
FIG. 47 depicts graphs illustrating lateral aberration the ninth embodiment of the imaging lens suffers from in focus at infinity with vibration in +direction.
Figure 48:
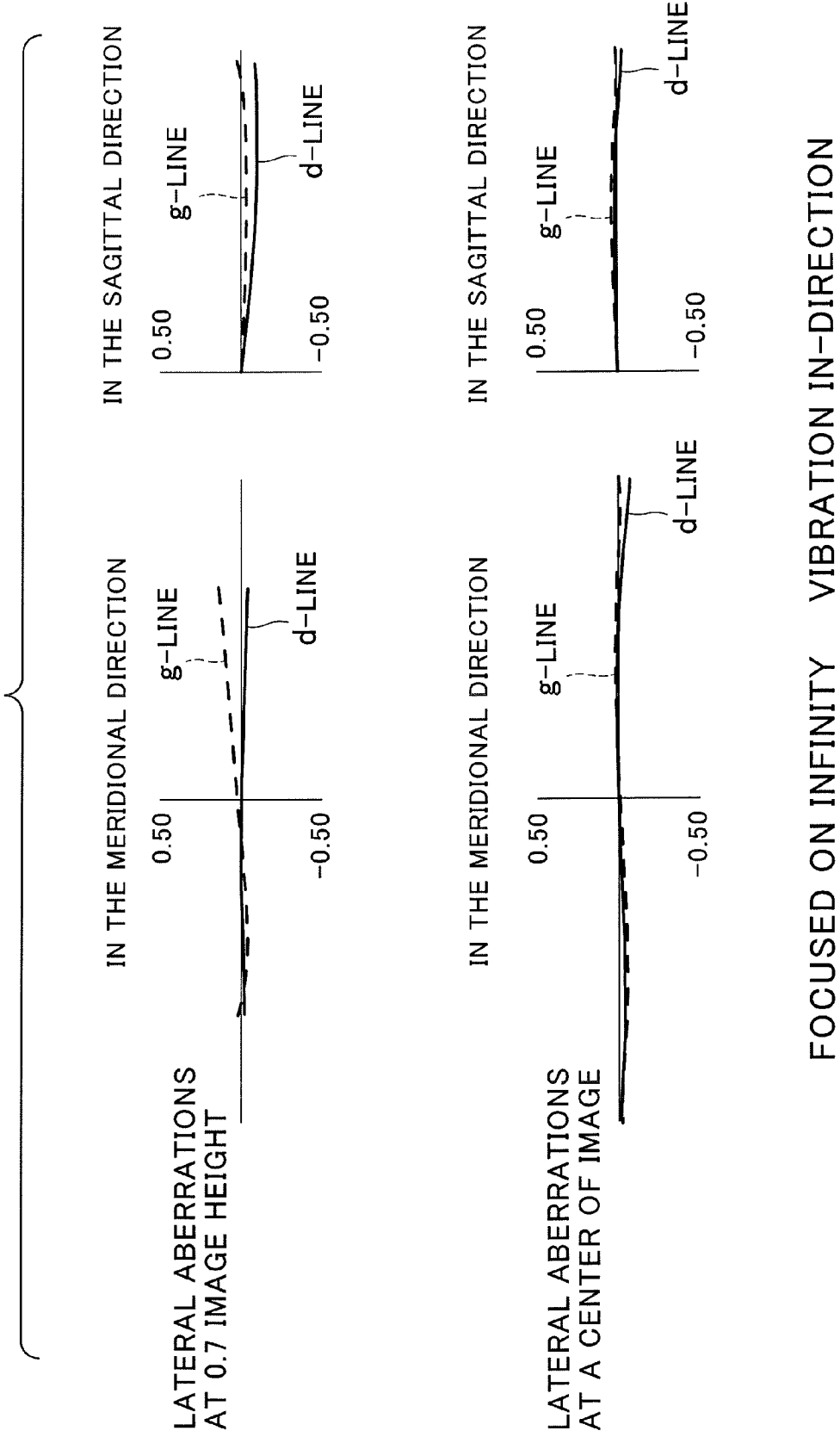
FIG. 48 depicts graphs illustrating lateral aberration the ninth embodiment of the imaging lens suffers from in focus at infinity with vibration in −direction.
Figure 49:
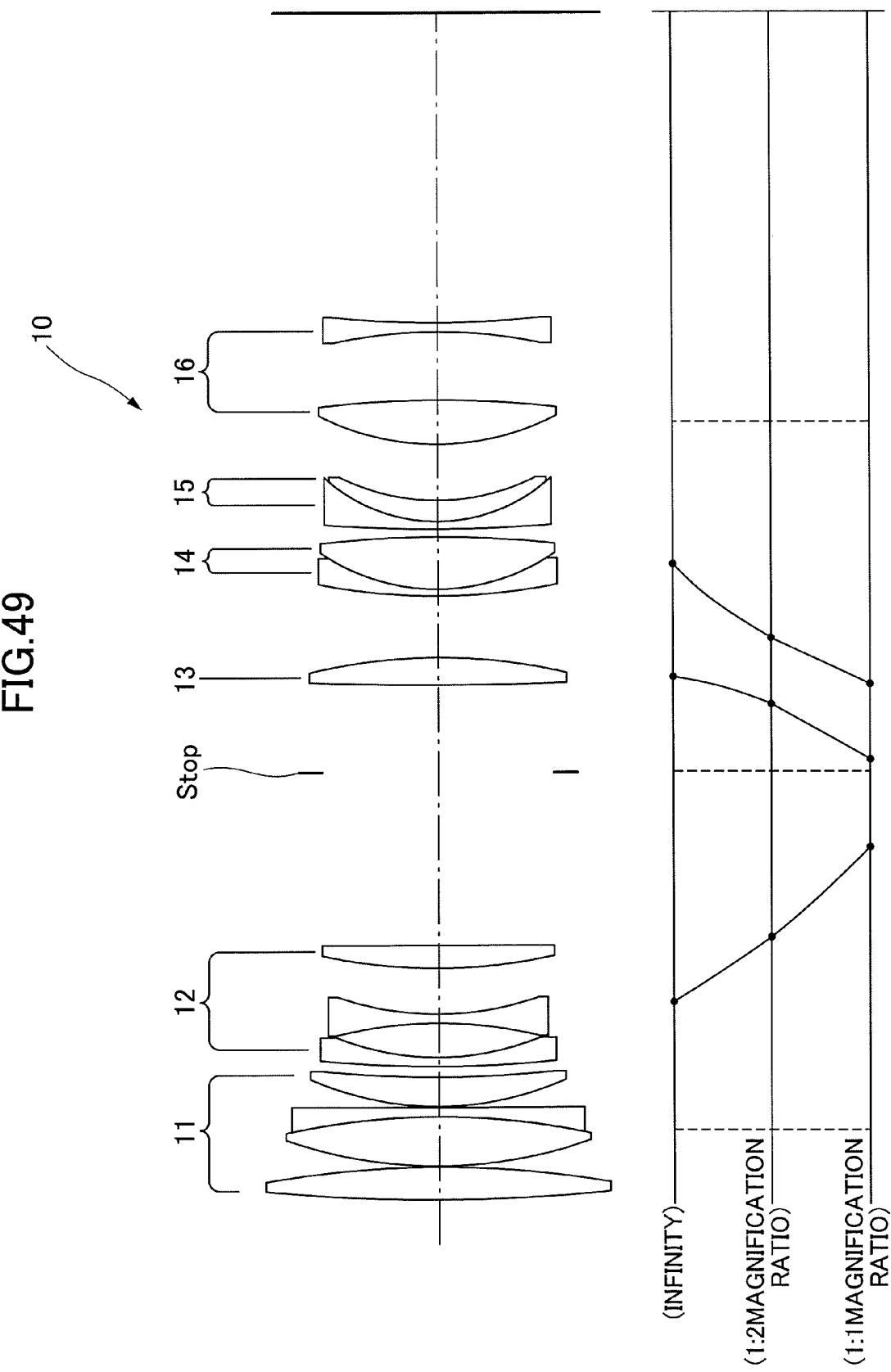
FIG. 49 is a sectional view illustrating a tenth embodiment of an imaging lens according to the present invention in focus at infinity where the trajectory of each of lens groups from the closest range to the macro in photo shooting is depicted by solid line.
Figure 51:
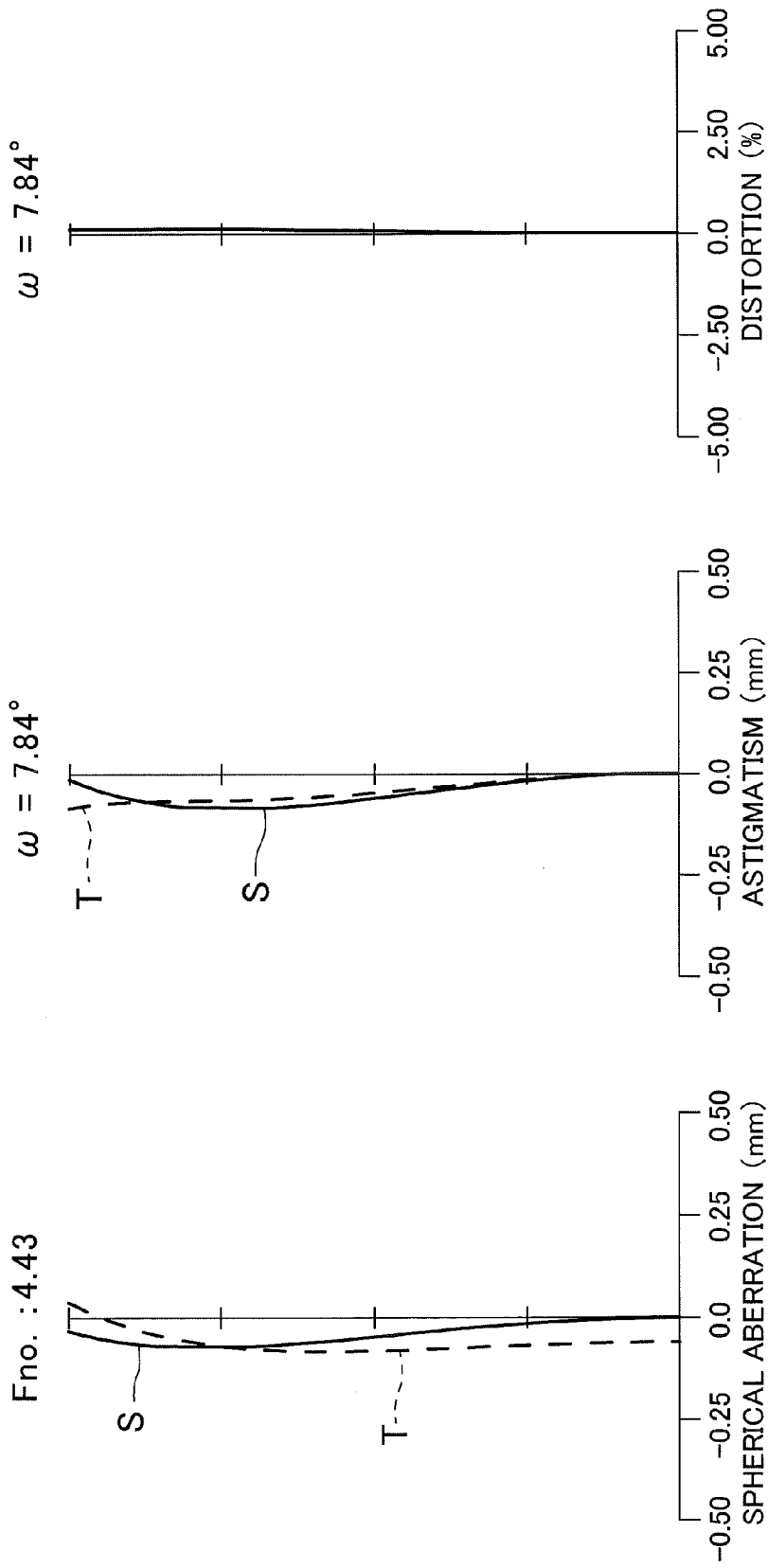
FIG. 51 depicts graphs illustrating longitudinal aberration the tenth embodiment of the imaging lens suffers from with 1:2 magnification ratio.
Figure 52:
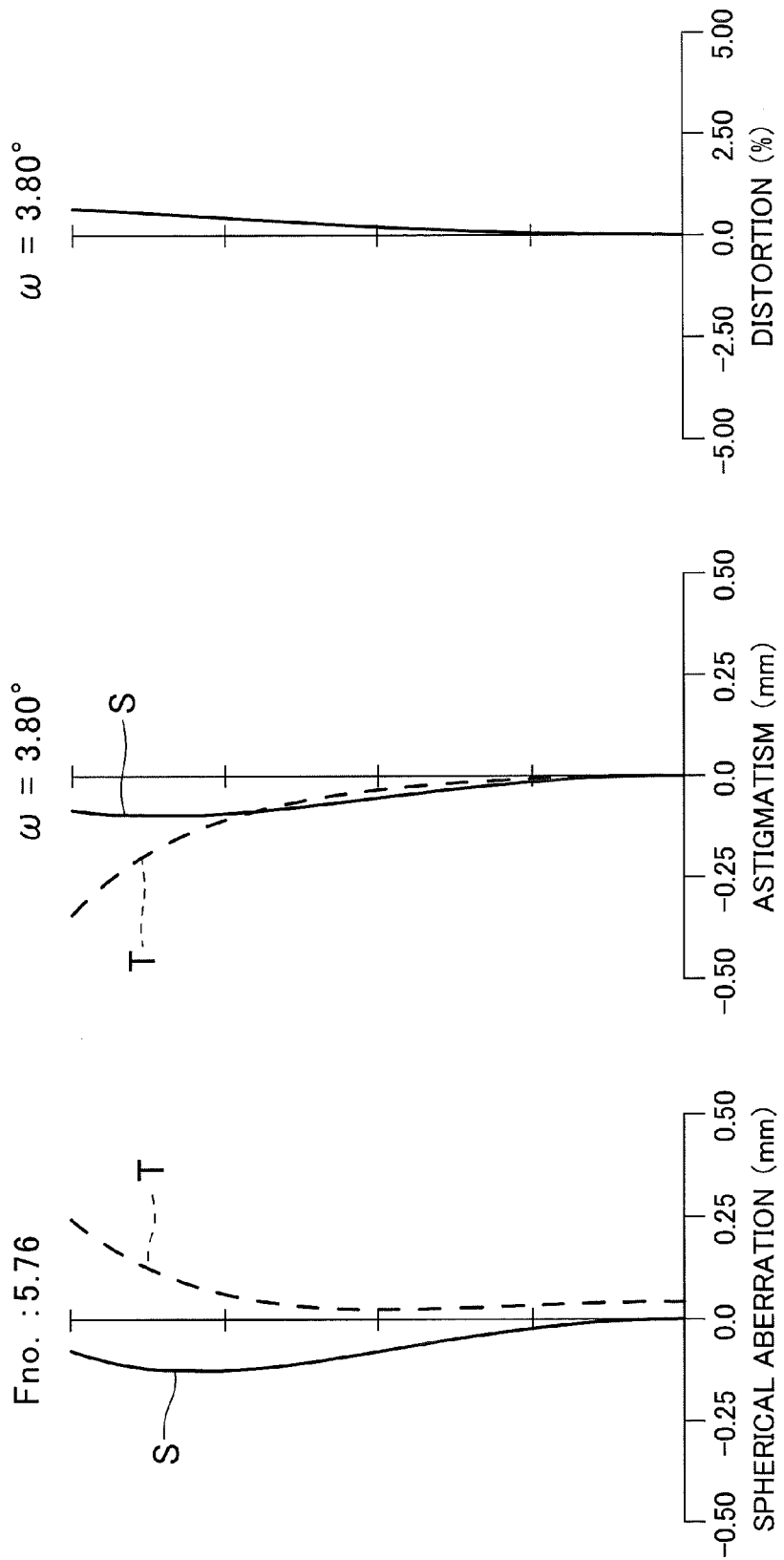
FIG. 52 depicts graphs illustrating longitudinal aberration the tenth embodiment of the imaging lens suffers from with 1:1 magnification ratio.
Figure 55:
FIG. 55 depicts graphs illustrating lateral aberration the tenth embodiment of the imaging lens suffers from in focus at infinity with vibration in +direction.
Figure 56:
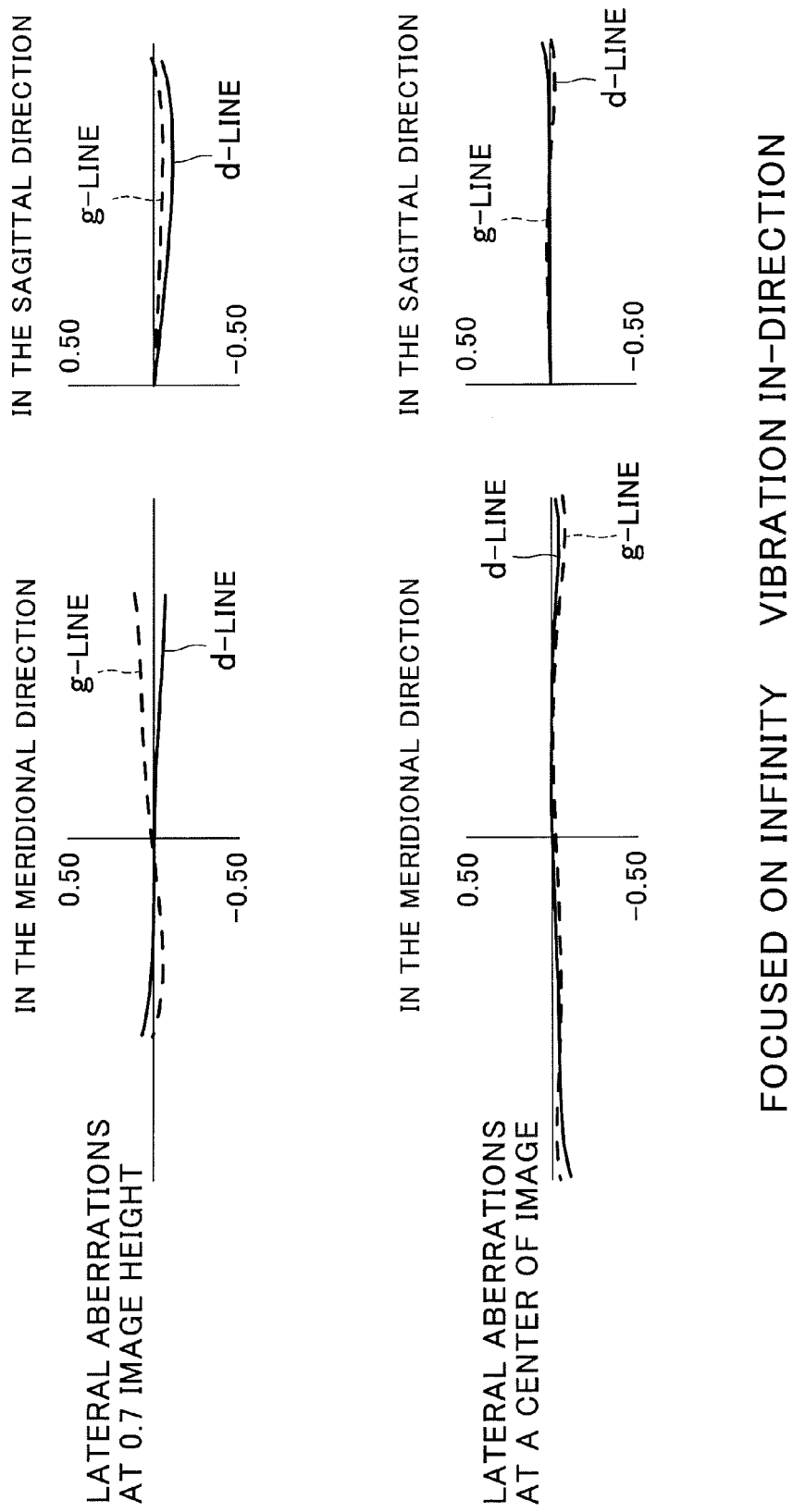
FIG. 56 depicts graphs illustrating lateral aberration the tenth embodiment of the imaging lens suffers from in focus at infinity with vibration in −direction.
Figure 57:
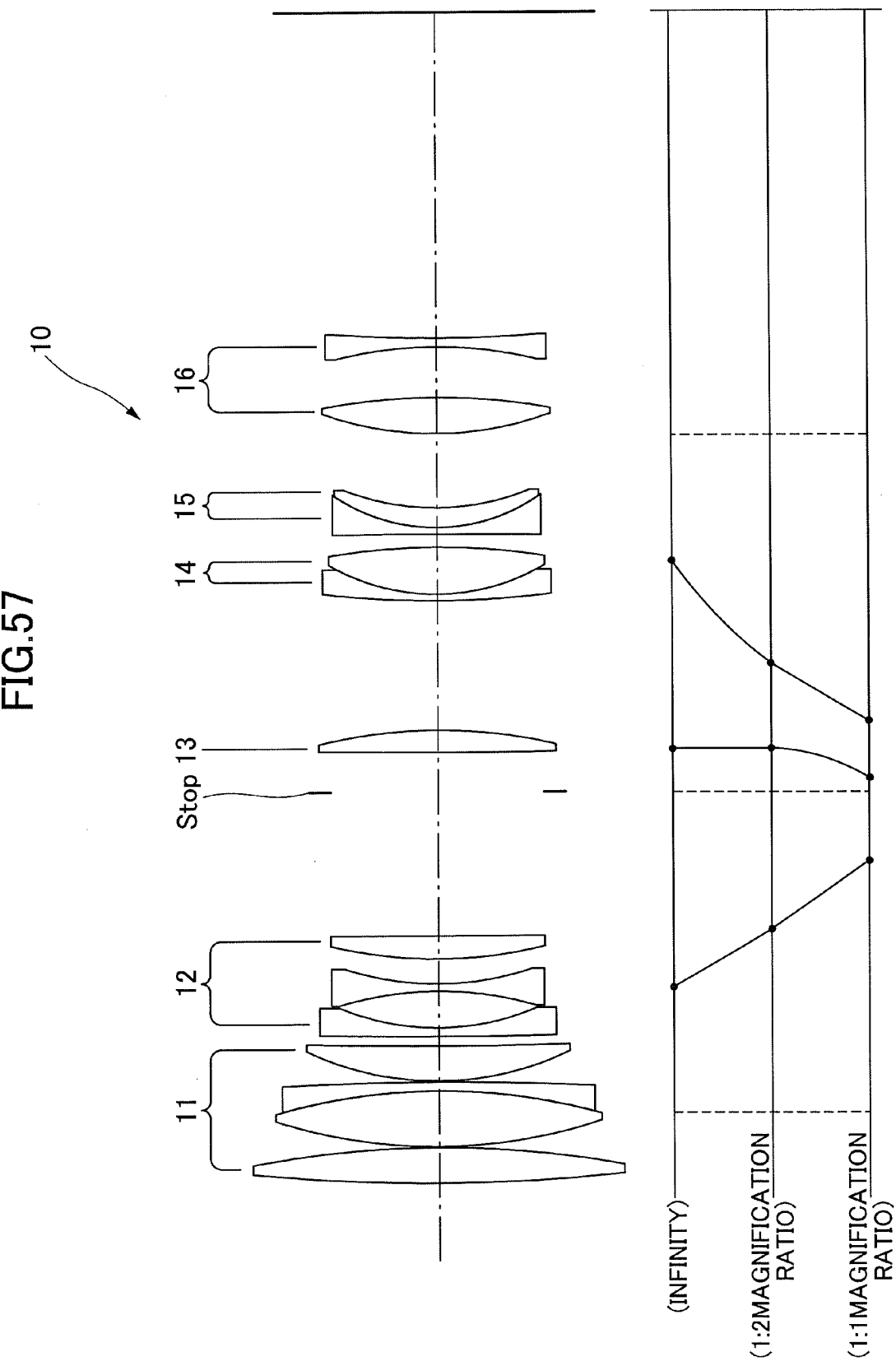
FIG. 57 is a sectional view illustrating an eleventh embodiment of an imaging lens according to the present invention in focus at infinity where the trajectory of each of lens groups from the closest range to the macro in photo shooting is depicted by solid line.
Figure 58:
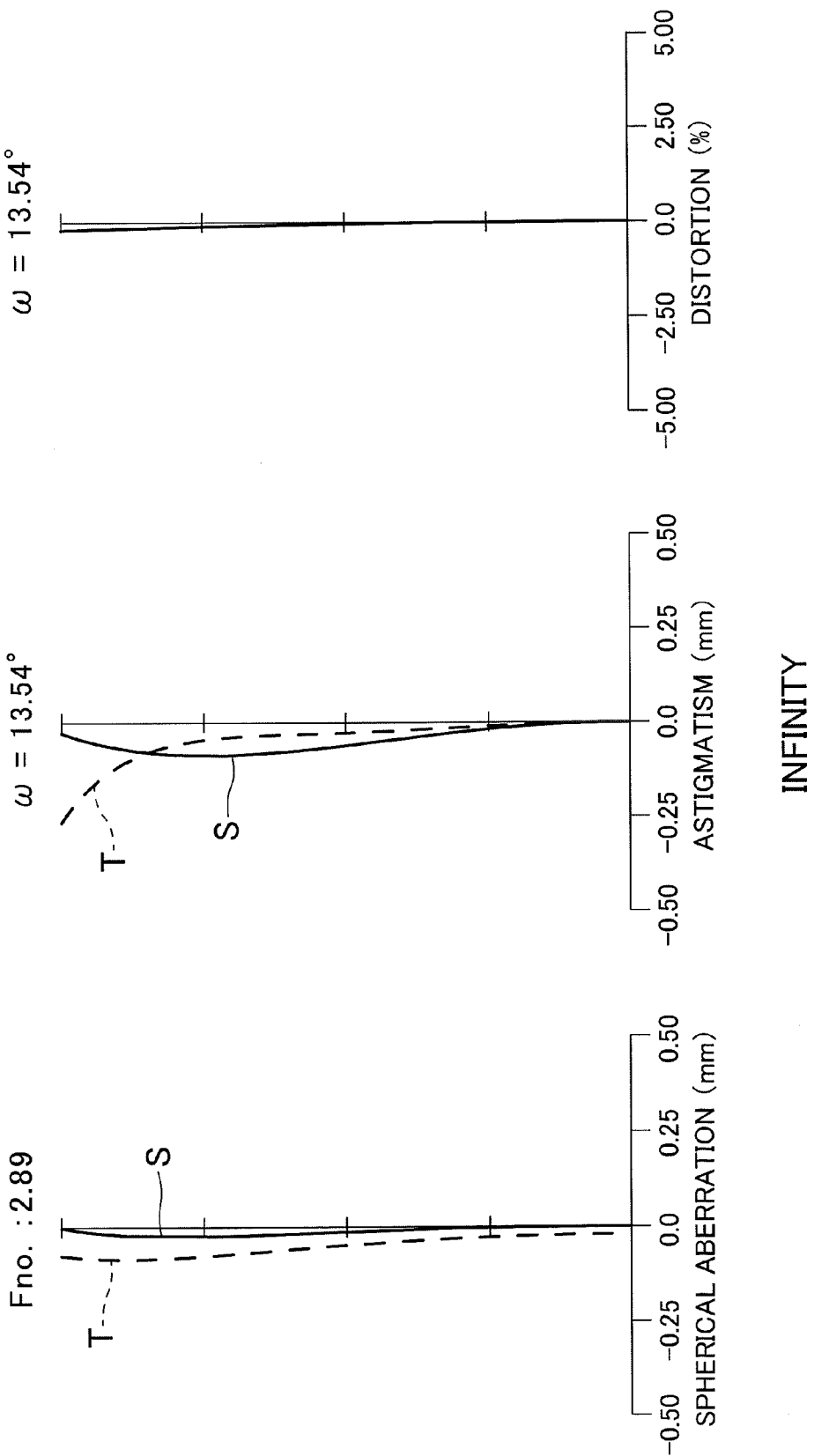
FIG. 58 depicts graphs illustrating longitudinal aberration the eleventh embodiment of the imaging lens suffers from in focus at infinity.
Figure 59:
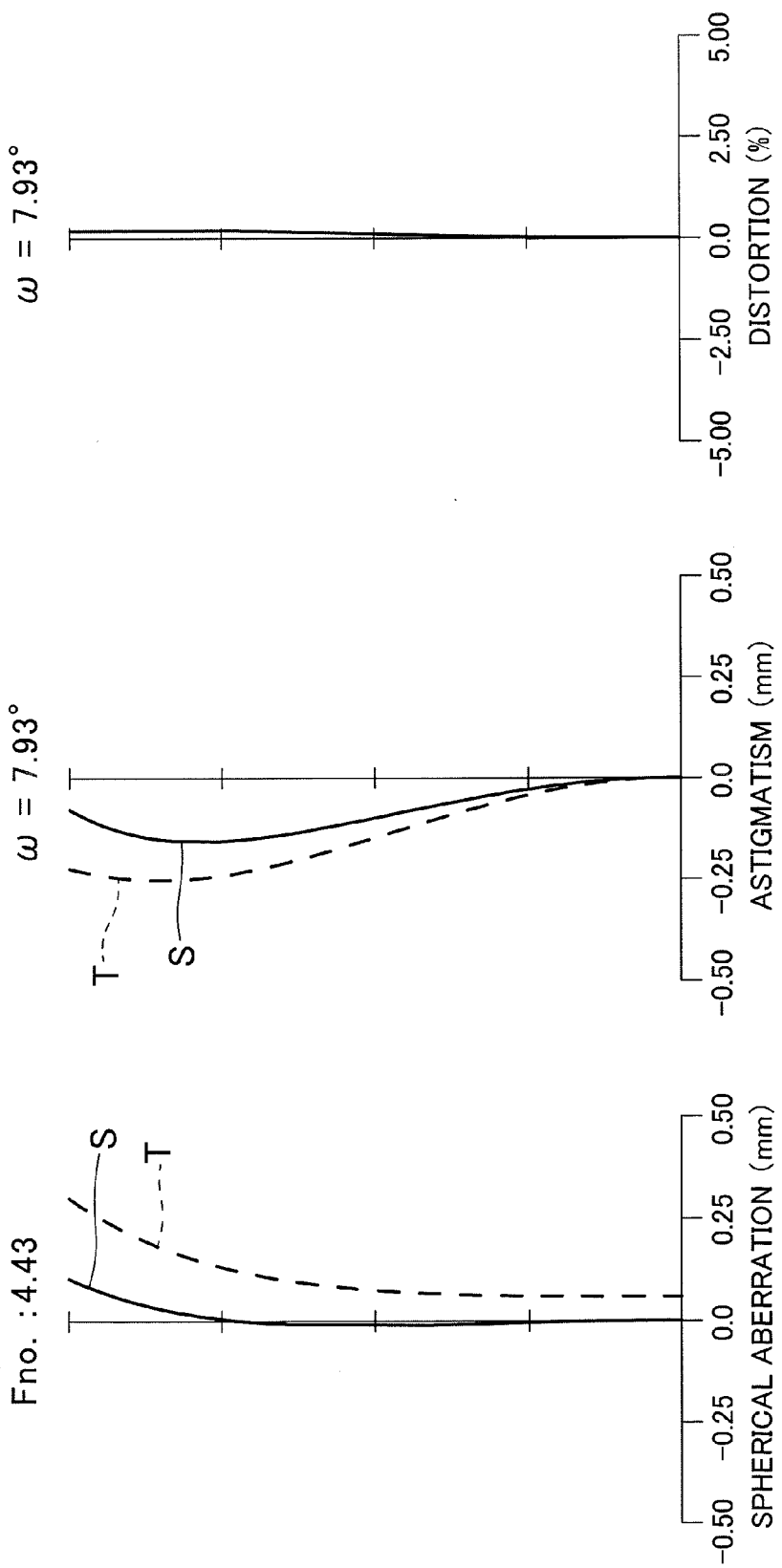
FIG. 59 depicts graphs illustrating longitudinal aberration the eleventh embodiment of the imaging lens suffers from with 1:2 magnification ratio.
Figure 60:
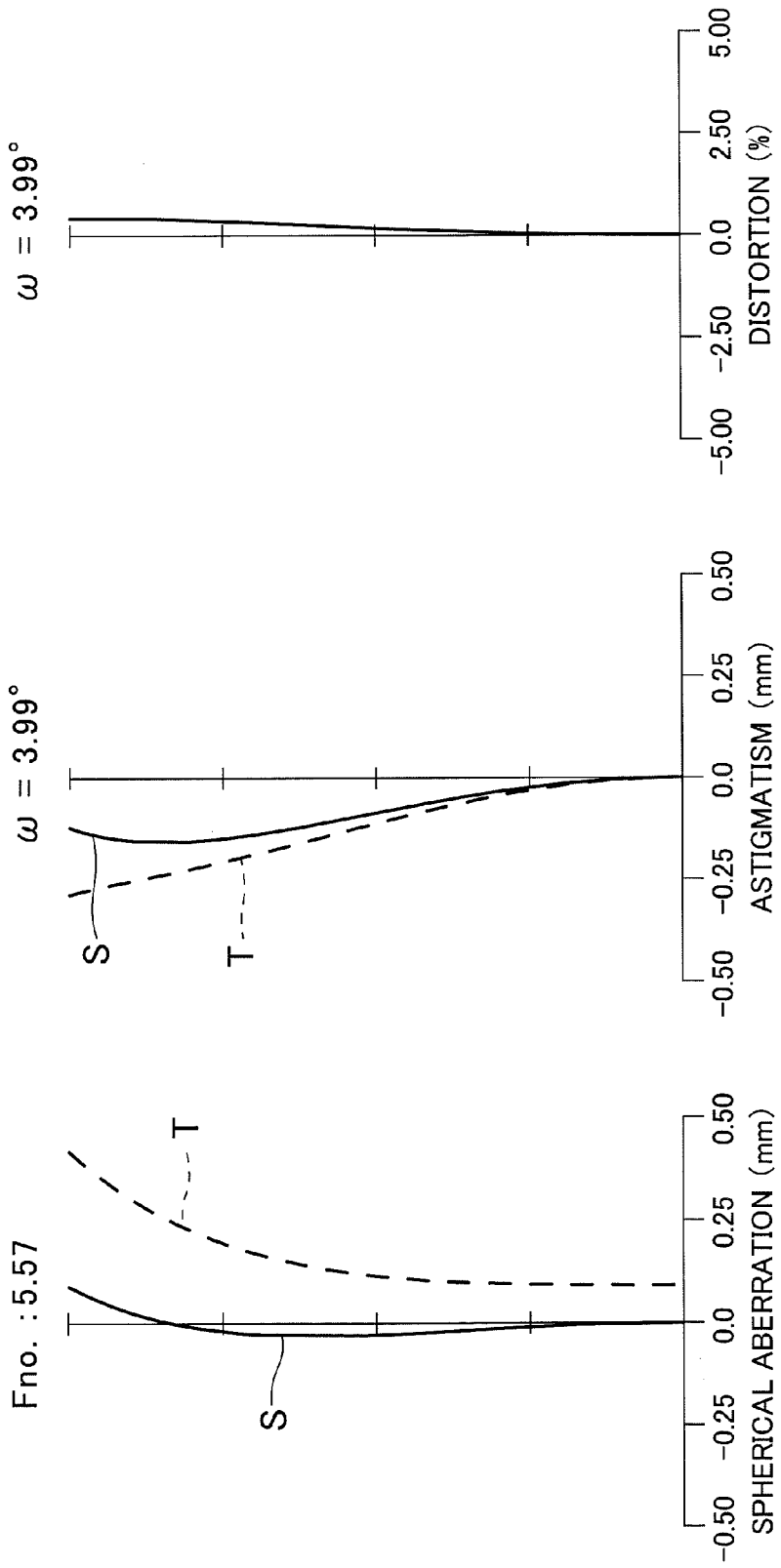
FIG. 60 depicts graphs illustrating longitudinal aberration the eleventh embodiment of the imaging lens suffers from with 1:1 magnification ratio.
Figure 61:
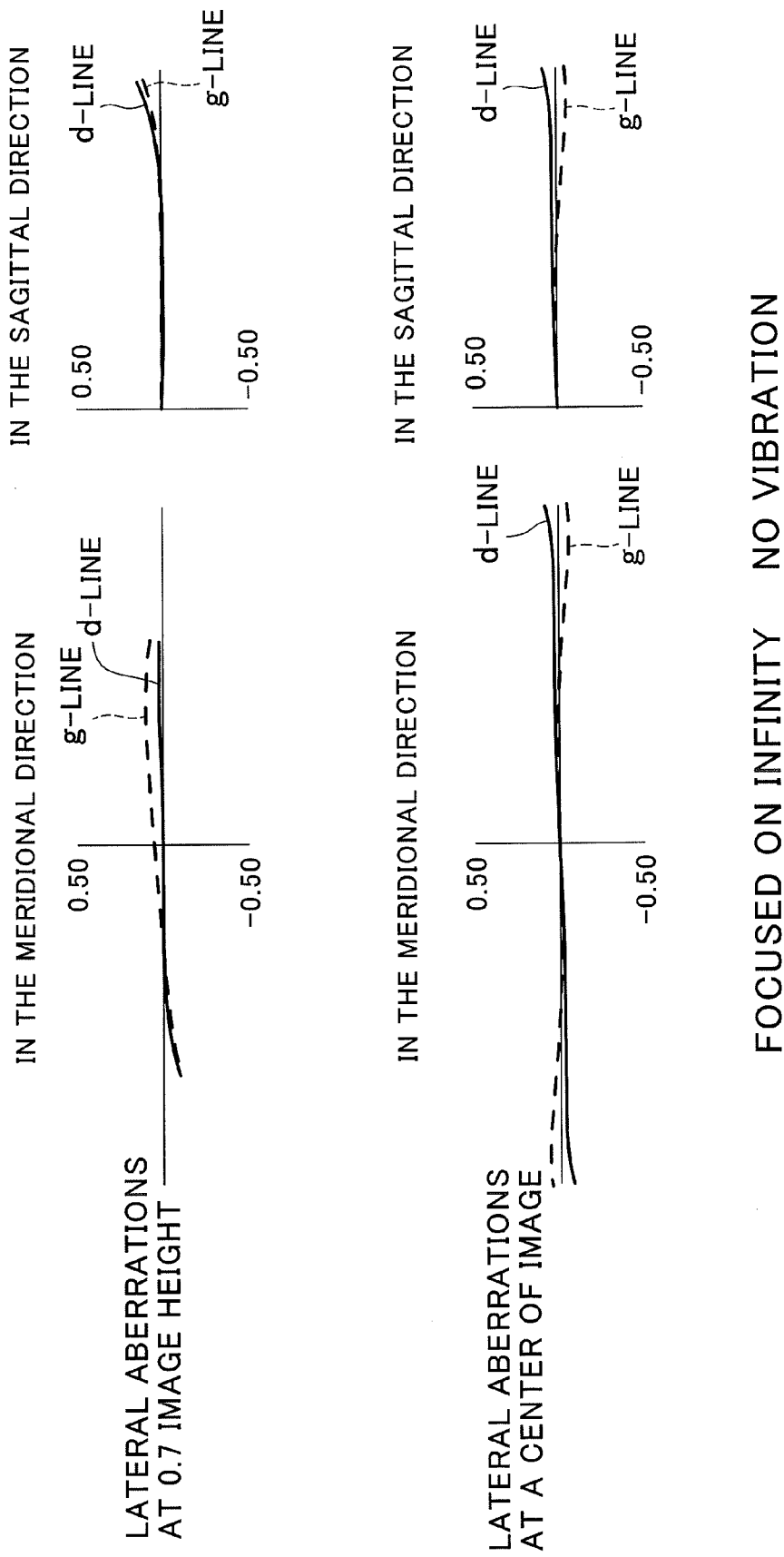
FIG. 61 depicts graphs illustrating lateral aberration the eleventh embodiment of the imaging lens suffers from in focus at infinity.
Figure 63:
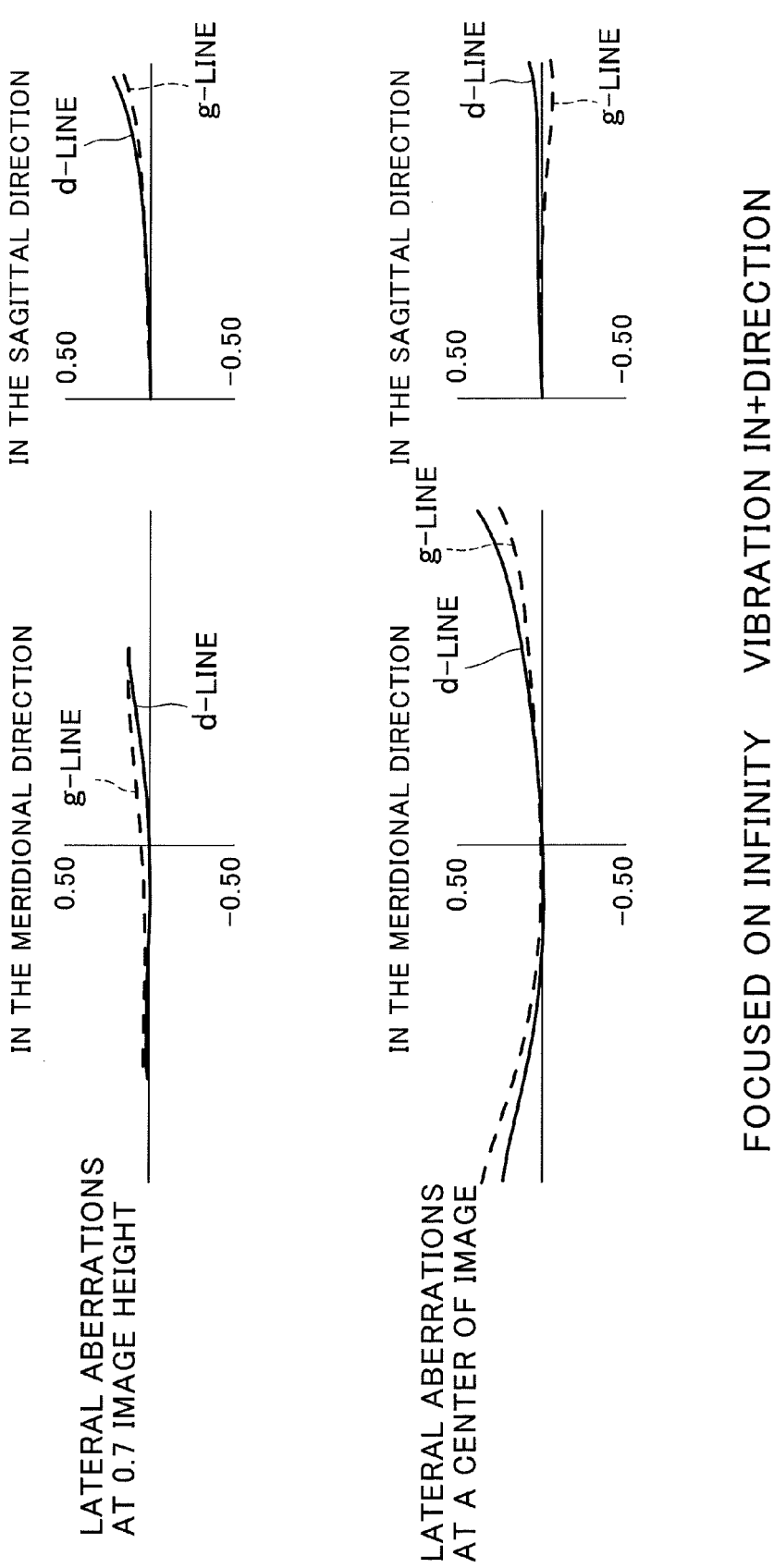
FIG. 63 depicts graphs illustrating lateral aberration the eleventh embodiment of the imaging lens suffers from in focus at infinity with vibration in +direction.
Figure 64:
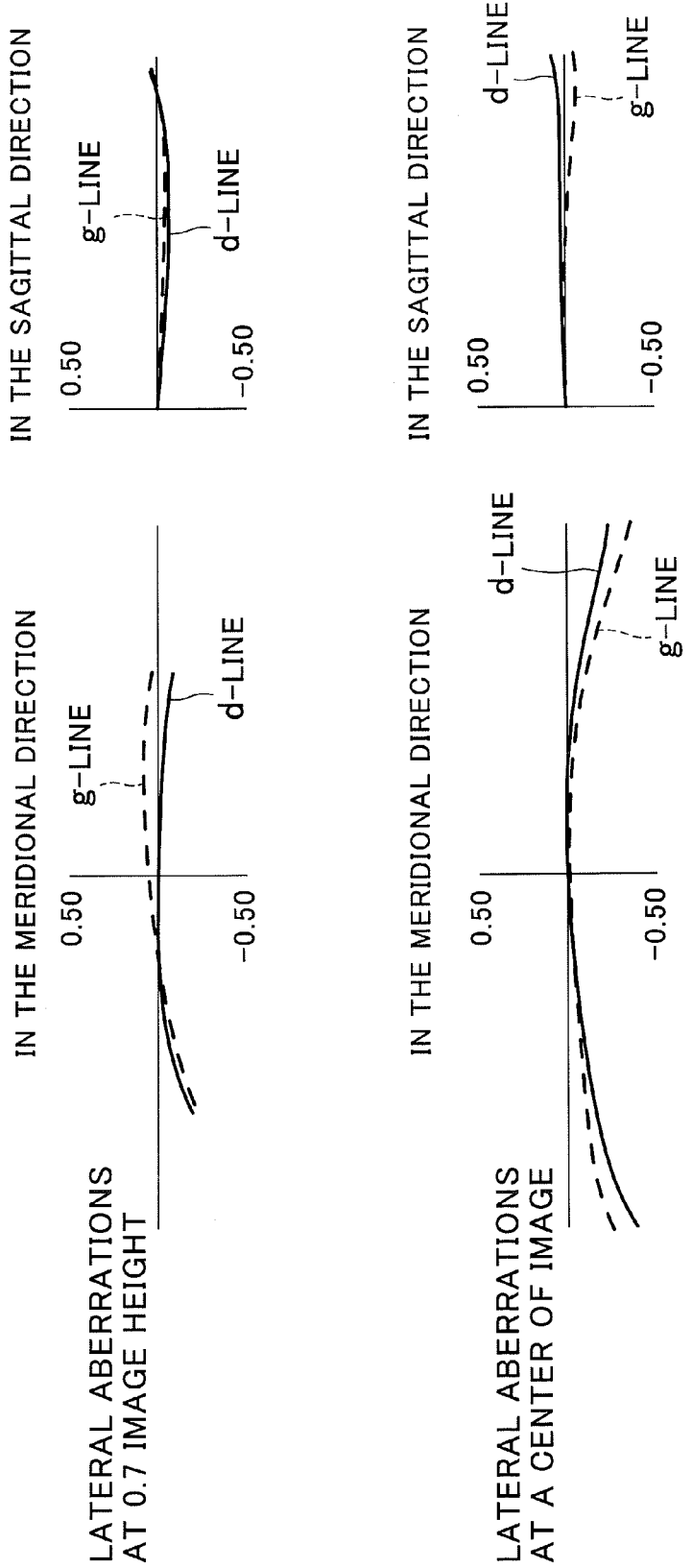
FIG. 64 depicts graphs illustrating lateral aberration the eleventh embodiment of the imaging lens suffers from in focus at infinity with vibration in −direction.
Figure 65:
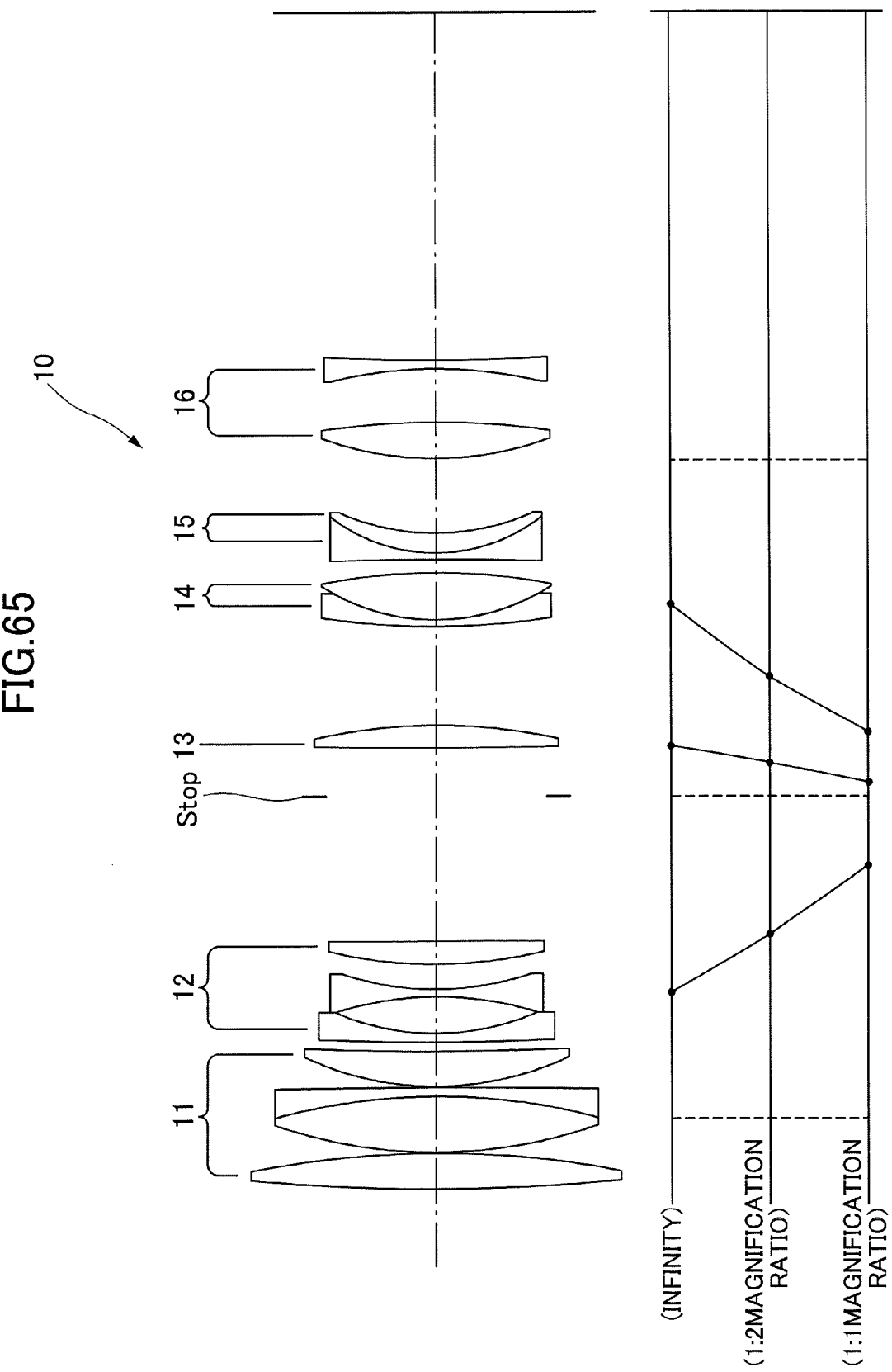
FIG. 65 is a sectional view illustrating a twelfth embodiment of an imaging lens according to the present invention in focus at infinity where the trajectory of each of lens groups from the closest range to the macro in photo shooting is depicted by solid line.
Figure 66:
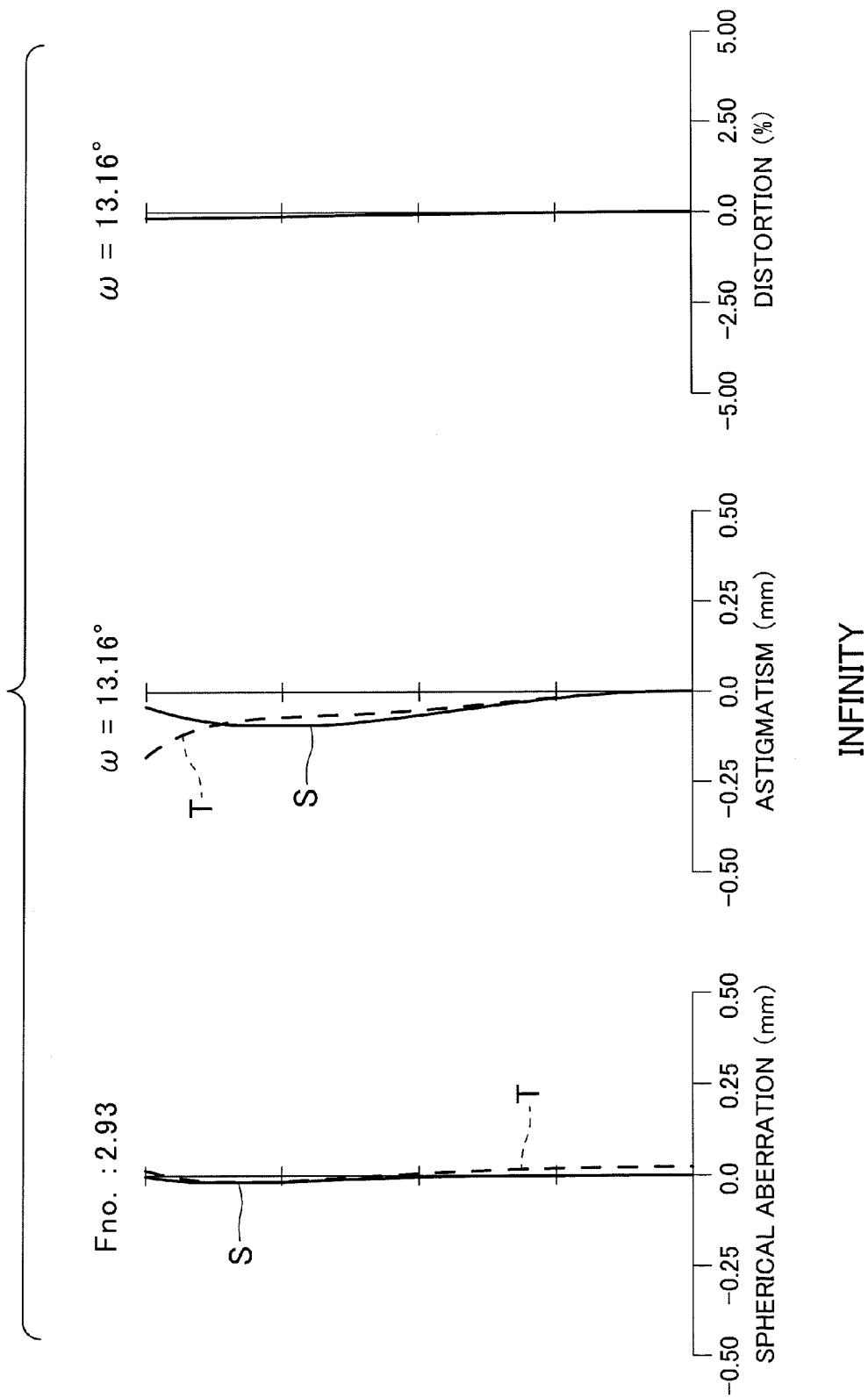
FIG. 66 depicts graphs illustrating longitudinal aberration the twelfth embodiment of the imaging lens suffers from in focus at infinity.
Figure 67:
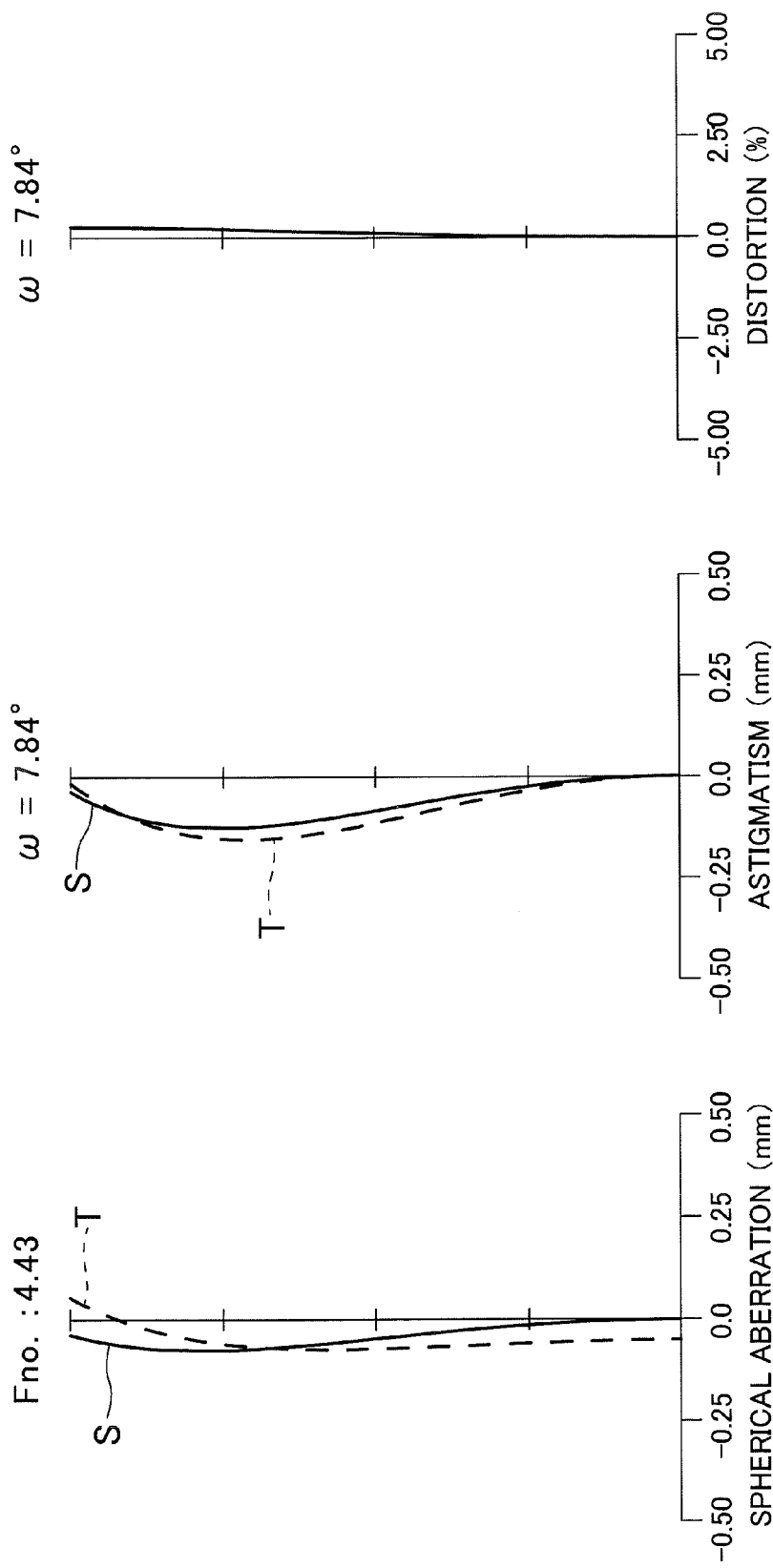
FIG. 67 depicts graphs illustrating longitudinal aberration the twelfth embodiment of the imaging lens suffers from with 1:2 magnification ratio.
Figure 68:
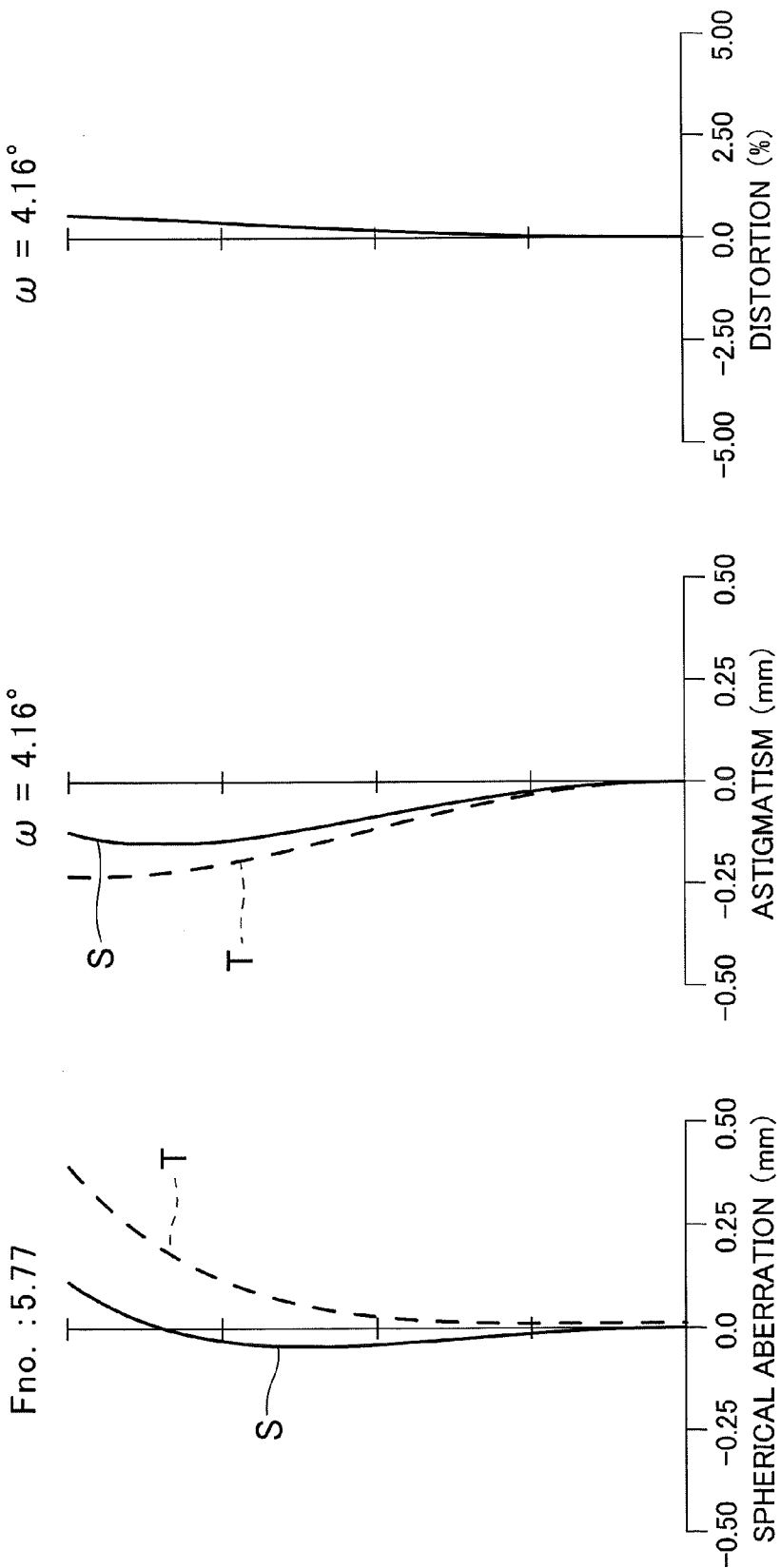
FIG. 68 depicts graphs illustrating longitudinal aberration the twelfth embodiment of the imaging lens suffers from with 1:1 magnification ratio.
Figure 69:
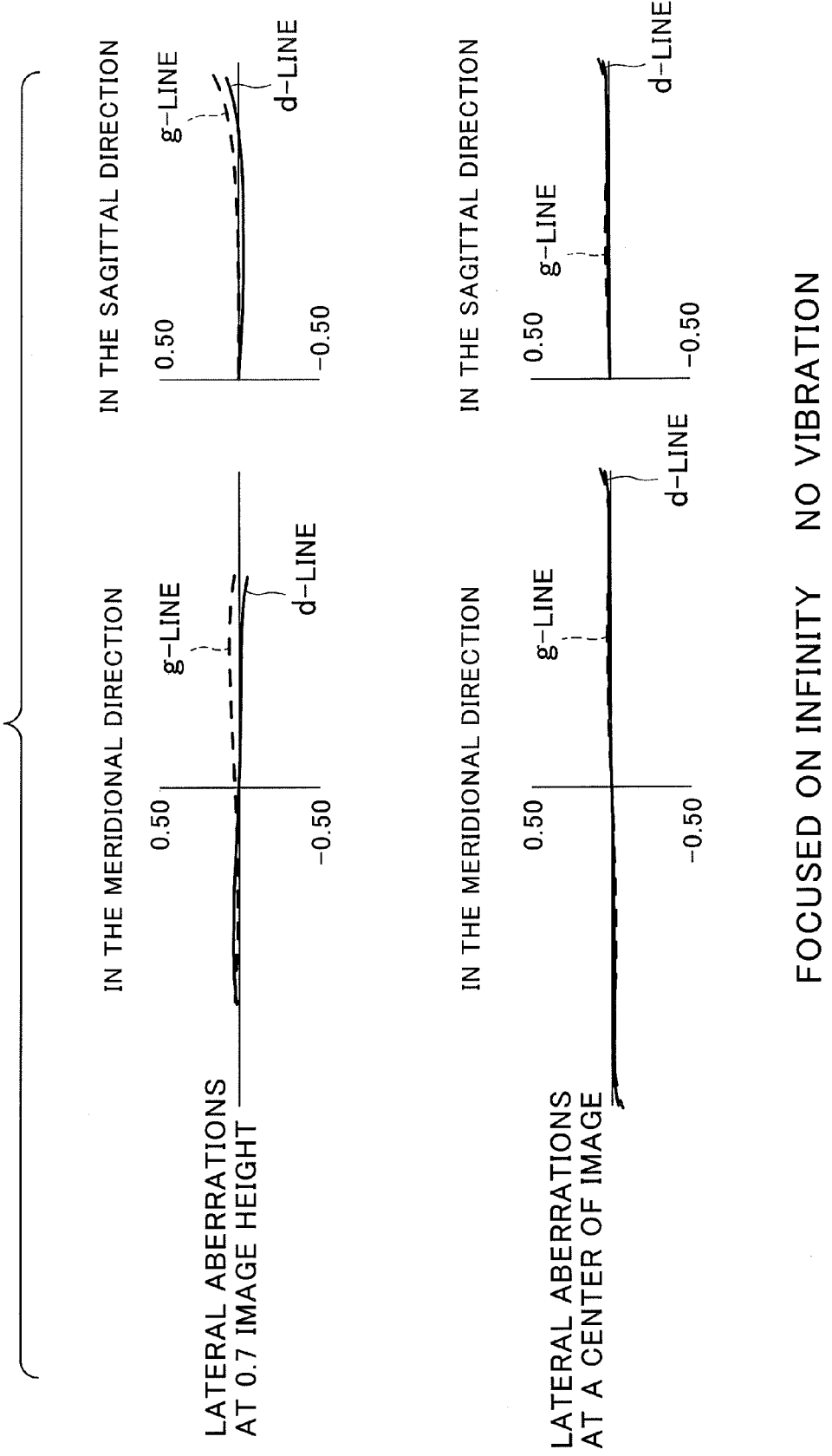
FIG. 69 depicts graphs illustrating lateral aberration the twelfth embodiment of the imaging lens suffers from in focus at infinity.
Figure 70:
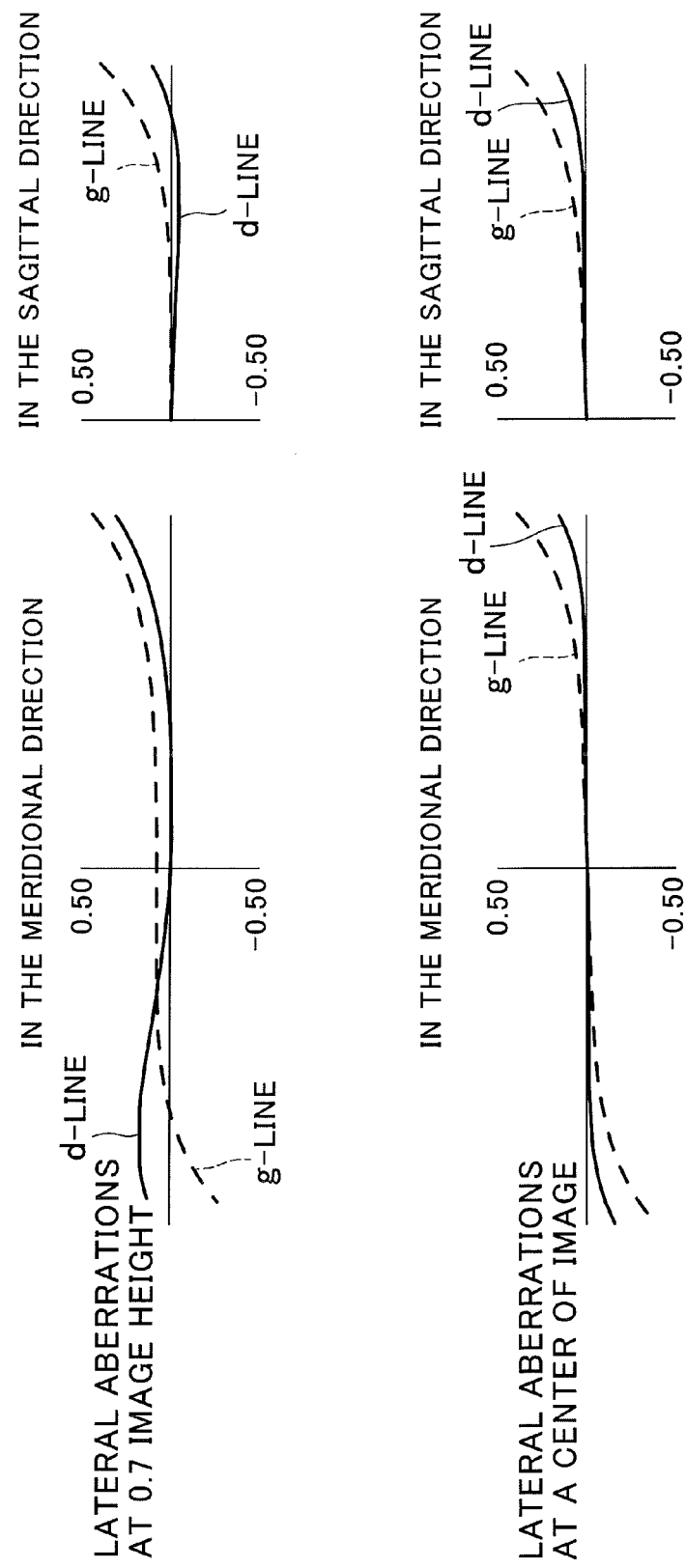
FIG. 70 depicts graphs illustrating lateral aberration the twelfth embodiment of the imaging lens suffers from at the closest range in photo shooting.
Figure 71:
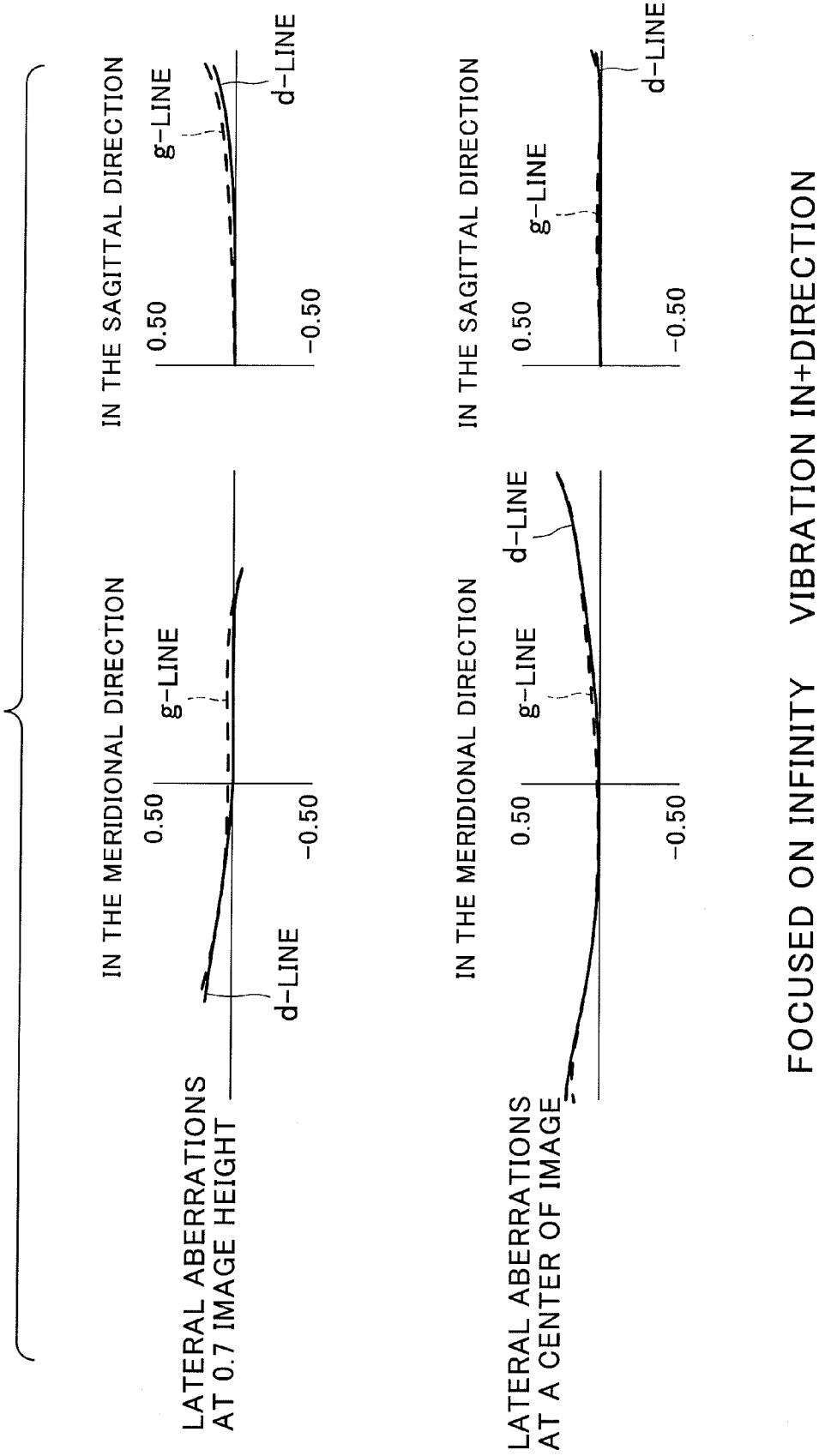
FIG. 71 depicts graphs illustrating lateral aberration the twelfth embodiment of the imaging lens suffers from in focus at infinity with vibration in +direction.

An imaging lens 10 embodying the present invention in the second aspect, as depicted in sectional views of FIGS. 25, 33, 41, 49, 57 and 65, comprises the foremost or first lens group 11 the closest to an object and of positive refractivity, the succeeding or second lens group 12 of negative refractivity, the third lens group 13 of positive refractivity, the fourth lens group 14 of positive refractivity, the fifth lens group of negative refractivity moved in directions perpendicular to the optical axis for effecting image stabilization, and the rearmost sixth lens group 16 the closest to an image plane and of positive refractivity. During focusing, the first, fifth, and six lens groups 11, 15, and 16 stay still while, as the object distance is varied from a point of infinity to the closest range in photo shooting, the second lens group 12 is moved axially along the optical axis from a position closer to the object toward the image plane, the third lens group 13 is moved axially along the optical axis forward and backward, and the fourth lens group 14 is moved axially along the optical axis from a position closer to the image plane toward the object. The first lens group 11 has at least three or more convex lens pieces and at least a single concave lens piece, and the third lens group 13 has a single convex lens piece.

Any of the lens groups/subgroups depicted in the sectional views of FIGS. 25, 33, 41, 49, 57, and 65 has its trajectory illustrated by broken line when it stay still during focusing and illustrated by solid line when it is moved during focusing.

EMBODIMENT 7

| | Magnification | | |
|---|---|---|---|
| | INF | X0.5 | X1.0 |
| Focal Length | 92.74 | 81.62 | 64.66 |
| Fno | 2.89 | 4.06 | 5.75 |
| Angle of View ω | 13.12 | 7.72 | 4.03 |
| Full Length of Optical Sys. | 158.72 | | |

| Surface # | R | D | Nd | vd |
|---|---|---|---|---|
| 1 | 236.1724 | 4.7932 | 1.77250 | 49.60 |
| 2 | −134.3107 | 0.1500 | | |
| 3 | 63.0015 | 7.5198 | 1.43700 | 95.10 |
| 4 | −90.2962 | 1.1920 | 1.84666 | 23.78 |
| 5 | 1612.2365 | 0.1500 | | |
| 6 | 41.7672 | 4.6981 | 1.43700 | 95.10 |
| 7 | 305.1013 | D(7) | | |
| 8 | 192.1000 | 1.2000 | 1.81600 | 46.62 |
| 9 | 33.5120 | 4.9120 | | |
| 10 | −46.9417 | 1.0000 | 1.48749 | 70.24 |
| 11 | 39.8523 | 3.3499 | | |
| 12 | 60.8772 | 3.1000 | 1.84666 | 23.78 |
| 13 | −1857.9250 | D(13) | | |
| 14 STOP | 0.0000 | D(14) | | |
| 15 | 344.4750 | 3.0050 | 1.59282 | 68.62 |
| 16 | −85.8423 | D(16) | | |
| 17 | 110.2146 | 0.9000 | 1.72825 | 28.46 |
| 18 | 30.5835 | 6.4230 | 1.67790 | 55.35 |
| 19 | −90.2521 | D(19) | | |
| 20 | 541.4261 | 0.8952 | 1.58913 | 61.13 |
| 21 | 23.2442 | 2.7112 | 1.80518 | 25.42 |
| 22 | 31.7632 | 10.1125 | | |
| 23 | 42.0889 | 4.9125 | 1.72000 | 50.23 |
| 24 | −136.0043 | 6.0015 | | |
| 25 | −67.7129 | 1.2000 | 1.84666 | 23.78 |
| 26 | 131.5116 | 44.5749 | | |
| 27 | 0.0000 | D(27) | | |

Lens Thickness, Distance between Lens Pieces

| F | INF | x0.5 | x1.0 |
|---|---|---|---|
| D(7) | 1.2000 | 9.8415 | 19.2488 |
| D(13) | 20.0500 | 11.4085 | 2.0012 |

-continued

| | | | |
|---|---|---|---|
| D(14) | 14.0000 | 9.2987 | 1.7000 |
| D(16) | 6.7201 | 1.0992 | 1.4506 |
| D(19) | 1.7996 | 12.1217 | 19.3690 |
| D(27) | 2.1644 | 2.2044 | 2.1892 |

EMBODIMENT 8

| | Magnification | | |
|---|---|---|---|
| | INF | X0.5 | X1.0 |
| Focal Length | 92.73 | 81.26 | 64.27 |
| Fno | 2.88 | 4.43 | 5.77 |
| Angle of View ω | 13.11 | 7.73 | 4.02 |
| Full Length of Optical Sys. | 158.82 | | |

| Surface # | R | D | Nd | Vd |
|---|---|---|---|---|
| 1 | 165.2099 | 5.4500 | 1.72000 | 50.23 |
| 2 | −137.3248 | 0.1500 | | |
| 3 | 63.1705 | 7.4500 | 1.43700 | 95.10 |
| 4 | −94.5340 | 1.2000 | 1.84666 | 23.78 |
| 5 | 1050.8885 | 0.1500 | | |
| 6 | 41.6835 | 4.4000 | 1.43700 | 95.10 |
| 7 | 221.2241 | D(7) | | |
| 8 | 162.6250 | 1.2000 | 1.81600 | 46.62 |
| 9 | 32.8151 | 5.0267 | | |
| 10 | −46.0876 | 1.0000 | 1.48749 | 70.24 |
| 11 | 40.0762 | 3.5037 | | |
| 12 | 61.5513 | 3.0000 | 1.84666 | 23.78 |
| 13 | −2237.7282 | D(13) | | |
| 14 STOP | 0.0000 | D(14) | | |
| 15 | 317.4338 | 3.2000 | 1.59282 | 68.62 |
| 16 | −80.7160 | D(16) | | |
| 17 | 105.2920 | 0.9000 | 1.72825 | 28.46 |
| 18 | 29.5764 | 6.5000 | 1.67790 | 55.35 |
| 19 | −95.3679 | D(19) | | |
| 20 | 388.5153 | 0.9000 | 1.58913 | 61.13 |
| 21 | 22.7413 | 2.7000 | 1.80518 | 25.42 |
| 22 | 30.5439 | 10.0791 | | |
| 23 | 41.1691 | 4.9000 | 1.72000 | 50.23 |
| 24 | −190.2840 | 5.7513 | | |
| 25 | −79.9676 | 1.2000 | 1.84666 | 23.78 |
| 26 | 117.6040 | 43.4987 | | |
| 27 | 0.0000 | D(27) | | |
| 28 | 0.0000 | 0.0000 | | |

| Lens Thickness, Distance between Lens Pieces | | | |
|---|---|---|---|
| F | INF | x0.5 | x1.0 |
| D(7) | 1.2001 | 9.6636 | 19.0827 |
| D(13) | 19.9758 | 11.5123 | 2.0933 |
| D(14) | 14.5889 | 9.1257 | 1.7000 |
| D(16) | 6.4281 | 1.4208 | 1.3855 |
| D(19) | 2.1476 | 12.6181 | 20.0790 |
| D(27) | 2.3520 | 2.3642 | 2.2847 |

EMBODIMENT 9

| | Magnification | | |
|---|---|---|---|
| | IFN | X0.5 | X1.0 |
| Focal Length | 92.73 | 80.79 | 63.81 |
| Fno | 2.88 | 4.43 | 5.72 |
| Angle of View ω | 13.12 | 7.73 | 4.00 |
| Full Length of Optical Sys. | 158.63 | | |

| Surface # | R | D | Nd | Vd |
|---|---|---|---|---|
| 1 | 177.3150 | 5.2000 | 1.72000 | 5.023 |
| 2 | −134.2410 | 0.1500 | | |
| 3 | 64.2256 | 7.2000 | 1.43700 | 95.10 |
| 4 | −93.7743 | 1.2000 | 1.84666 | 23.78 |
| 5 | 1465.3158 | 0.1500 | | |
| 6 | 41.9997 | 4.3000 | 1.43700 | 95.10 |
| 7 | 209.1412 | D(7) | | |
| 8 | 163.0969 | 1.2000 | 1.81600 | 46.62 |
| 9 | 33.8188 | 5.1284 | | |
| 10 | −47.0686 | 1.2000 | 1.48749 | 70.24 |
| 11 | 40.9292 | 3.8339 | | |
| 12 | 64.9263 | 3.0210 | 1.84666 | 23.78 |
| 13 | −1266.1412 | D(13) | | |
| 14 STOP | 0.0000 | D(14) | | |
| 15 | 293.0070 | 3.2000 | 1.59282 | 68.62 |
| 16 | −83.0329 | D(16) | | |
| 17 | 103.6721 | 0.9000 | 1.72825 | 28.46 |
| 18 | 29.1996 | 6.5000 | 1.67790 | 55.35 |
| 19 | −96.9183 | D(19) | | |
| 20 | 398.4147 | 0.9000 | 1.58913 | 61.13 |
| 21 | 22.6202 | 2.7000 | 1.80518 | 25.42 |
| 22 | 30.5119 | 10.5827 | | |
| 23 | 41.3634 | 4.9000 | 1.72000 | 50.23 |
| 24 | −181.0634 | 6.0518 | | |
| 25 | −77.8745 | 1.2000 | 1.84666 | 23.78 |
| 26 | 113.8858 | 43.1242 | | |
| 27 | 0.0000 | D(27) | | |

| Lens Thickness, Distance between Lens Pieces | | | |
|---|---|---|---|
| F | INF | x0.5 | x1.0 |
| D(7) | 1.2002 | 9.9245 | 19.6705 |
| D(13) | 20.2628 | 11.5385 | 1.7926 |
| D(14) | 13.9612 | 8.6518 | 1.3000 |
| D(16) | 6.4549 | 12.0374 | 19.4231 |
| D(27) | 2.3505 | 2.3618 | 2.2837 |

EMBODIMENT 10

| | Magnification | | |
|---|---|---|---|
| | IFN | X0.5 | X1.0 |
| Focal Length | 92.73 | 74.97 | 57.92 |
| Fno | 2.91 | 4.43 | 5.76 |
| Angle of View ω | 13.13 | 7.84 | 3.80 |
| Full Length of Optical Sys. | 156.32 | | |

| Surface # | R | D | Nd | Vd |
|---|---|---|---|---|
| 1 | 241.5144 | 4.2726 | 1.72000 | 50.23 |
| 2 | −129.6424 | 0.1500 | | |
| 3 | 59.9675 | 6.4700 | 1.43700 | 95.10 |
| 4 | −92.5070 | 1.2000 | 1.84666 | 23.78 |
| 5 | 3566.5773 | 0.1500 | | |
| 6 | 41.0671 | 3.8356 | 1.43700 | 95.10 |
| 7 | 147.1464 | D(7) | | |
| 8 | 154.7009 | 1.2000 | 1.81600 | 46.62 |
| 9 | 35.6258 | 4.4490 | | |
| 10 | −55.5172 | 1.2000 | 1.48749 | 70.24 |
| 11 | 40.2303 | 6.0000 | | |
| 12 | 72.1068 | 2.9819 | 1.84666 | 23.78 |
| 13 | −2112.6158 | D(13) | | |
| 14 STOP | 0.0000 | D(14) | | |
| 15 | 523.1207 | 3.6276 | 1.59282 | 68.62 |
| 16 | −70.8459 | D(16) | | |
| 17 | 80.6914 | 0.9000 | 1.72825 | 28.46 |
| 18 | 26.9485 | 6.9234 | 1.67790 | 55.34 |
| 19 | −135.8048 | D(19) | | |
| 20 | 200.3439 | 1.0000 | 1.58913 | 61.13 |
| 21 | 21.9232 | 2.8000 | 1.80518 | 25.42 |
| 22 | 28.4436 | 7.4243 | | |
| 23 | 34.0850 | 5.8369 | 1.51742 | 52.43 |
| 24 | −131.4842 | 8.9993 | | |
| 25 | −63.6030 | 1.2000 | 1.84666 | 23.78 |
| 26 | 134.1138 | 40.5142 | | |
| 27 | 0.0000 | D(27) | | |

EMBODIMENT 11

|  | Magnification | | |
|---|---|---|---|
|  | IFN | X0.5 | X1.0 |
| Focal Length | 90.03 | 80.99 | 65.94 |
| Fno | 2.89 | 4.43 | 5.77 |
| Angle of View ω | 13.54 | 7.93 | 3.99 |
| Full Length of Optical Sys. | 158.77 | | |

| Surface # | R | D | Nd | vd |
|---|---|---|---|---|
| 1 | 254.1830 | 4.8000 | 1.77250 | 49.60 |
| 2 | −134.2602 | 0.1500 | | |
| 3 | 71.1795 | 7.5000 | 1.43700 | 95.10 |
| 4 | −79.7054 | 1.2000 | 1.84666 | 23.78 |
| 5 | −421.6392 | 0.1500 | | |
| 6 | 41.1357 | 4.7000 | 1.43700 | 95.10 |
| 7 | 576.7666 | D(7) | | |
| 8 | 739.6983 | 1.2000 | 1.81600 | 46.62 |
| 9 | 34.3150 | 4.9000 | | |
| 10 | −46.2414 | 1.0000 | 1.48749 | 70.24 |
| 11 | 40.2082 | 3.3500 | | |
| 12 | 61.0215 | 3.1000 | 1.84666 | 23.78 |
| 13 | −46509.4627 | D(13) | | |
| 14 STOP | 0.0000 | D(14) | | |
| 15 | 1251.2896 | 3.0000 | 1.59282 | 68.62 |
| 16 | −67.5178 | D(16) | | |
| 17 | 125.6845 | 0.9000 | 1.72825 | 28.46 |
| 18 | 28.6128 | 6.4000 | 1.67790 | 55.35 |
| 19 | −88.5026 | D(19) | | |
| 20 | −1118.2138 | 0.9000 | 1.58913 | 61.13 |
| 21 | 24.2117 | 2.7000 | 1.80518 | 25.42 |
| 22 | 33.4446 | 10.1000 | | |
| 23 | 44.9283 | 4.9000 | 1.74855 | 49.30 |
| 24 | −85.0423 | 6.8683 | | |
| 25 | −56.3145 | 1.2000 | 1.82888 | 24.26 |
| 26 | 180.1778 | 43.9135 | | |
| 27 | 0.0000 | D(27) | | |

| Lens Thickness, Distance between Lens Pieces | | | |
|---|---|---|---|
| F | INF | x0.5 | x1.0 |
| D(7) | 1.2697 | 9.5022 | 18.6884 |
| D(13) | 19.4222 | 11.1897 | 2.0035 |
| D(14) | 11.5705 | 7.9380 | 1.3000 |
| D(16) | 8.1557 | 2.0183 | 2.0219 |
| D(19) | 1.0481 | 10.8182 | 17.4525 |
| D(27) | 0.3526 | 0.4017 | 0.4082 |

EMBODIMENT 12

|  | Magnification | | |
|---|---|---|---|
|  | IFN | X0.5 | X1.0 |
| Focal Length | 92.72 | 81.70 | 65.33 |
| Fno | 2.93 | 4.43 | 5.77 |
| Angle of View ω | 13.16 | 7.84 | 4.16 |
| Full Length of Optical Sys. | 158.82 | | |

| Surface # | R | D | Nd | Vd |
|---|---|---|---|---|
| 1 | 270.9036 | 4.8000 | 1.77250 | 49.62 |
| 2 | −128.6509 | 0.1500 | | |
| 3 | 66.5181 | 7.5000 | 1.43700 | 95.10 |
| 4 | −82.4895 | 1.2000 | 1.84666 | 23.78 |
| 5 | −973.3204 | 0.1500 | | |
| 6 | 41.9449 | 4.7000 | 1.43700 | 95.10 |
| 7 | 420.3979 | D(7) | | |
| 8 | 354.5857 | 1.2000 | 1.80420 | 46.50 |
| 9 | 34.1059 | 4.9000 | | |
| 10 | −45.1558 | 1.0000 | 1.48749 | 70.44 |
| 11 | 39.6707 | 3.3500 | | |
| 12 | 61.4169 | 3.1000 | 1.84666 | 23.78 |
| 13 | −3689.2708 | D(13) | | |
| 14 STOP | 0.0000 | D(14) | | |
| 15 | 1219.8635 | 3.0000 | 1.61800 | 63.39 |
| 16 | −74.9000 | D(16) | | |
| 17 | 100.8707 | 0.9000 | 1.72825 | 28.46 |
| 18 | 28.2958 | 6.4000 | 1.67790 | 55.35 |
| 19 | −78.7023 | D(19) | | |
| 20 | −491.8258 | 0.9000 | 1.58913 | 61.13 |
| 21 | 22.9260 | 2.7000 | 1.80518 | 25.42 |
| 22 | 31.9313 | 10.1220 | | |
| 23 | 44.6037 | 4.9000 | 1.69680 | 55.46 |
| 24 | −107.3554 | 7.2003 | | |
| 25 | −60.3891 | 1.2000 | 1.84666 | 23.78 |
| 26 | 290.3053 | 46.6888 | | |
| 27 | 0.0000 | D(27) | | |

| Lens Thickness, Distance between Lens Pieces | | | |
|---|---|---|---|
| F | INF | x0.5 | x1.0 |
| D(7) | 1.1998 | 9.5772 | 18.6257 |
| D(13) | 19.4374 | 11.0599 | 2.0115 |
| D(14) | 6.6108 | 5.1702 | 1.7000 |
| D(16) | 13.4020 | 5.4592 | 1.4274 |
| D(19) | 1.7889 | 11.1724 | 18.6743 |
| D(27) | 0.3437 | 0.4221 | 0.3877 |

Parameters in the formulae of Embodiments 7 to 12 are given in TABLE 2.

TABLE 2

|  | Num. of Embodiment | | | | | |
|---|---|---|---|---|---|---|
|  | 7 | 8 | 9 | 10 | 11 | 12 |
| f | 92.735 | 92.727 | 92.727 | 92.734 | 90.032 | 92.718 |
| f1 | 51.173 | 51.484 | 52.148 | 53.814 | 47.772 | 49.712 |
| f2 | −37.255 | −37.152 | −38.401 | −41.651 | −33.201 | −34.459 |
| f3 | 116.218 | 108.878 | 109.483 | 105.491 | 108.153 | 114.288 |
| f4 | 81.567 | 82.243 | 82.429 | 83.429 | 86.517 | 72.207 |
| f5 | −68.674 | −67.1314 | −67.0691 | −67.036 | −65.017 | −59.915 |
| f6 | 149.42 | 156.303 | 161.459 | 264.719 | 100 | 120.071 |
| FR | −52.649 | −56.065 | −54.469 | −50.815 | −51.644 | −58.951 |

TABLE 2-continued

| | Num. of Embodiment | | | | | |
|---|---|---|---|---|---|---|
| | 7 | 8 | 9 | 10 | 11 | 12 |
| D | 6.002 | 5.751 | 6.052 | 8.999 | 6.868 | 7.200 |
| Rn1 | −92.2729 | −94.5340 | −93.7743 | −92.5070 | −79.7054 | −82.4895 |
| Rn2 | 1612.2365 | 1050.8885 | 1465.3158 | 3566.5773 | −421.6392 | −973.3204 |
| nd1 | 1.5488 | 1.5313 | 1.5313 | 1.5313 | 1.5488 | 1.5488 |
| vd1 | 79.93 | 80.14 | 80.14 | 80.14 | 79.93 | 79.94 |
| nd3 | 1.5928 | 1.5928 | 1.5928 | 1.5928 | 1.5928 | 1.6180 |
| vd3 | 68.62 | 68.62 | 68.62 | 68.62 | 68.62 | 63.39 |
| (Rn1 − Rn2)/(Rn1 + Rn2) | −1.12 | −1.20 | −1.14 | −1.05 | −0.68 | −0.84 |
| f2/f | −0.40 | −0.40 | −0.41 | −0.45 | −0.37 | −0.37 |
| f4/f3 | 0.70 | 0.76 | 0.75 | 0.79 | 0.80 | 0.63 |
| D/FR | −0.11 | −0.10 | −0.11 | −0.18 | −0.13 | −0.12 |
| f6/f | 1.61 | 1.69 | 1.74 | 2.85 | 1.11 | 1.30 |
| Chromatic Aberration of Magnification (with 1:1 Magnification) | 0.018 | 0.017 | 0.016 | 0.014 | 0.020 | 0.020 |
| Displacement of Lens Group for Image Stabilization, in Focus at Infinity | 0.490 | 0.490 | 0.485 | 0.480 | 0.473 | 0.424 |

The invention claimed is:

1. An imaging lens with an optical system comprising the foremost lens group closest to an object and of positive refractivity, the succeeding middle lens group, and the rearmost lens group closest to an image plane and of negative refractivity; the middle lens group, with the first, second, and third lens subgroups disposed in series, being moved axially along the optical axis for focusing;

the foremost lens group having at least three or more convex lens pieces and a single concave lens piece;

the imaging lens with the optical system meeting the requirements as defined in the following formulae:

$$(Rn1-Rn2)/(Rn1+Rn2)<0 \quad (1)$$

$$nd1<1.6, vd1>67.5 \quad (2)$$

$$55<vd3<75 \quad (3)$$

$$1.55<nd3<1.65 \quad (4)$$

where Rn1 is a curvature of radius of a front surface of a concave lens piece the closest to the object of all in the foremost lens group, Rn2 is a curvature of radius of a rear surface of the concave lens piece the closest to the object of all in the foremost lens group, nd1 is the average of refractive indices of convex lens pieces in the foremost lens group relative to d-line, nd3 is a refractive index of the convex lens piece of the second lens subgroup in the middle lens group relative to d-line, vd1 is the average of Abbe numbers of the convex lens pieces in the foremost lens group, and vd3 is an Abbe number of the convex lens piece of the second lens subgroup in the middle lens group.

2. The imaging lens according to claim 1, wherein the imaging lens further meets the requirements as defined in the following formula:

$$-0.58<f2/f<-0.36 \quad (5)$$

where f is a focal length of the entire optical system, and f2 is a focal length of the first lens subgroup in the middle lens group.

3. The imaging lens according to claim 1, wherein the imaging lens further meets the requirements as defined in the following formula:

$$0.28<f4/f3<1.95 \quad (6)$$

where f3 is a focal length of the second lens subgroup in the middle lens group, and f4 is a focal length of the third lens subgroup in the middle lens group.

4. The imaging lens according to claim 1, wherein the rearmost lens group includes a concave lens piece the closest to the image plane of all, and a convex lens piece adjacent to the concave lens piece on the side closer to the object; and the imaging lens meets the requirements as defined in the following formula:

$$-0.23<D/FR<-0.01 \quad (7)$$

where FR is a focal length of the concave lens piece the closest to the image plane, and D is a distance between the concave lens piece the closest to the image plane and the convex lens piece adjacent to it on the side closer to the object; the distance being filled with air without any lens medium.

5. An imaging lens comprising the foremost or first lens group closest to an object and of positive refractivity, the succeeding or second lens group of negative refractivity, the third lens group of positive refractivity, the fourth lens group of positive refractivity, the fifth lens group of negative refractivity moved in directions almost perpendicular to the optical axis for image stabilization, and the rearmost or sixth lens group closest to an image plane and of positive refractivity; during focusing, the first, fifth, and sixth lens groups stay still while, as an object distance is varied from a point of infinity to the closest range in photo shooting, the second lens group is moved from a position closer to the object toward the image plane, the third lens group is moved axially along the optical axis forward and backward, and the fourth lens group is moved axially from a position closer to the image plane toward the object; the first lens group including at least three or more convex lens pieces and at least a single concave lens piece, the third lens group including a single convex lens piece, and the fourth lens group including a pair of cemented lens pieces; the imaging lens meeting the requirements as defined in the following formulae:

$$(Rn1-Rn2)/(Rn1+Rn2)<0 \quad (1)$$

$$nd1<1.6, vd1<67.5 \quad (2)$$

where Rn1 is a curvature of radius of a front surface of a concave lens piece the closest to the object of all in the foremost lens group, Rn2 is a curvature of radius of a rear surface of the concave lens piece the closest to the object in the first lens group, nd1 is the average of refractive indices of convex lens pieces in the first lens group relative to d-line, and vd1 is the average of Abbe numbers of the convex lens pieces in the first lens group.

6. The imaging lens according to claim 5, wherein the imaging lens further meets the requirements as defined in the following formulae:

$$55 < vd3 < 75 \quad (3)$$

$$1.55 < nd3 < 1.65 \quad (4)$$

where nd3 is a refractive index of the convex lens piece of the second lens subgroup in the middle lens group relative to d-line, and vd3 is an Abbe number of the convex lens piece of the second lens subgroup in the middle lens group.

7. The imaging lens according to claim 5, wherein the imaging lens further meets the requirements as defined in the following formula:

$$-0.58 < f2/f < -0.36 \quad (5)$$

where f is a focal length of the entire optical system, and f2 is a focal length of the first lens subgroup in the middle lens group.

8. The imaging lens according to claim 5, wherein the imaging lens further meets the requirements as defined in the following formula:

$$0.28 < f4/f3 < 1.95 \quad (6)$$

where f3 is a focal length of the second lens subgroup in the middle lens group, and f4 is a focal length of the third lens subgroup in the middle lens group.

9. The imaging lens according to claim 5, wherein the rearmost lens group includes a concave lens piece the closest to the image plane of all, and a convex lens piece adjacent to the concave lens piece on the side closer to the object; and the imaging lens meets the requirements as defined in the following formula:

$$-0.23 < D/FR < -0.01 \quad (7)$$

where FR is a focal length of the concave lens piece the closest to the image plane, and D is a distance between the concave lens piece the closest to the image plane and the convex lens piece adjacent to it on the side closer to the object; the distance being filled with air without any lens medium.

10. An imaging lens with an optical system comprising the foremost lens group closest to an object and of positive refractivity, the succeeding middle lens group, and the rearmost lens group closest to an image plane and of negative refractivity; the middle lens group, with the first, second, and third lens subgroups disposed in series, being moved axially along the optical axis for focusing;

the foremost lens group having at least three or more convex lens pieces and a single concave lens piece;

the imaging lens with the optical system meeting the requirements as defined in the following formulae:

$$(Rn1-Rn2)/(Rn1+Rn2) < 0 \quad (1)$$

$$nd1 < 1.6, vd1 > 67.5 \quad (2)$$

where Rn1 is a curvature of radius of a front surface of a concave lens piece the closest to the object of all in the foremost lens group, Rn2 is a curvature of radius of a rear surface of the concave lens piece the closest to the object of all in the foremost lens group, nd1 is the average of refractive indices of convex lens pieces in the foremost lens group relative to d-line, and vd1 is the average of Abbe numbers of the convex lens pieces in the foremost lens group, and wherein the rearmost lens group includes a concave lens piece the closest to the image plane of all, and a convex lens piece adjacent to the concave lens piece on the side closer to the object; and the imaging lens meets the requirements as defined in the following formula:

$$-0.23 < D/FR < -0.01 \quad (7)$$

where FR is a focal length of the concave lens piece the closest to the image plane, and D is a distance between the concave lens piece the closest to the image plane and the convex lens piece adjacent to it on the side closer to the object; the distance being filled with air without any lens medium.

\* \* \* \* \*